United States Patent [19]
Lichti, Sr. et al.

[11] Patent Number: 5,238,351
[45] Date of Patent: Aug. 24, 1993

[54] ORGANIZER SYSTEM AND METHOD FOR A ROTATABLE STORAGE STRUCTURE

[75] Inventors: Robert Lichti, Sr., Lake Almanor Peninsula; Clay Bernard, II, Pt. Richmond, both of Calif.

[73] Assignee: Computer Aided Systems, Inc., Hayward, Calif.

[21] Appl. No.: 789,258

[22] Filed: Nov. 7, 1991

Related U.S. Application Data

[60] Division of Ser. No. 482,317, Feb. 16, 1990, Pat. No. 5,090,863, which is a division of Ser. No. 192,419, Apr. 29, 1988, Pat. No. 4,983,091, which is a continuation-in-part of Ser. No. 31,989, Mar. 30, 1987, abandoned, and Ser. No. 824,718, Jan. 31, 1986, abandoned, and Ser. No. 821,257, Jan. 22, 1989, Pat. No. 4,752,175, said Ser. No. 31,989, is a continuation-in-part of Ser. No. 732,927, May 13, 1985, abandoned.

[51] Int. Cl.$^5$ .............................................. B65G 1/10
[52] U.S. Cl. ................................ 414/331; 211/1.51; 198/803.01; 198/435; 364/478; 414/273
[58] Field of Search ............... 414/787, 331, 273, 274, 414/268, 269, 270, 278, 285; 198/803.01, 854, 465.1, 839.1, 435, 510, 469.1, 832; 211/1.5, 122; 364/478

[56] References Cited

U.S. PATENT DOCUMENTS

| | | |
|---|---|---|
| 844,808 | 2/1907 | Jones . |
| 931,570 | 8/1909 | Courtney . |
| 1,135,316 | 4/1918 | Olson . |
| 1,525,870 | 2/1925 | Lee . |
| 1,889,497 | 5/1928 | Steegmuller . |
| 2,226,742 | 12/1940 | Raymond . |
| 2,707,548 | 5/1955 | Fürst . |
| 2,734,617 | 2/1958 | Temple . |
| 2,736,419 | 2/1956 | Ferro . |
| 3,088,987 | 12/1962 | Franklin . |
| 3,148,785 | 9/1964 | Fauconnier . |
| 3,184,032 | 5/1965 | Jansson . |
| 3,278,052 | 10/1966 | Licht . |
| 3,288,055 | 8/1966 | Stein et al. . |
| 3,368,888 | 2/1968 | Weiss et al. . |
| 3,402,835 | 9/1968 | Saul . |
| 3,402,836 | 9/1968 | Debrey et al. . |
| 3,415,353 | 12/1968 | Certle, Jr. . |

(List continued on next page.)

FOREIGN PATENT DOCUMENTS

| | | | |
|---|---|---|---|
| 140393 | 5/1985 | European Pat. Off. . | |
| 242409 | 10/1987 | European Pat. Off. . | |
| 272340 | 8/1988 | European Pat. Off. . | |
| 424919 | 9/1924 | Fed. Rep. of Germany . | |
| 2607796 | 9/1977 | Fed. Rep. of Germany . | |
| 2817732 | 10/1979 | Fed. Rep. of Germany | 198/435 |
| 1427294 | 4/1966 | France . | |
| 2132575 | 11/1972 | France . | |
| 2193760 | 2/1974 | France . | |
| 59-48306 | 3/1984 | Japan . | |
| 59-48308 | 3/1984 | Japan . | |
| 212304 | 12/1984 | Japan | 414/331 |
| 82509 | 5/1985 | Japan | 414/331 |
| 60-93007 | 5/1985 | Japan . | |
| 7108 | 1/1986 | Japan | 414/331 |
| 61-81302 | 4/1986 | Japan . | |
| 131845 | 6/1986 | Japan . | |
| 1617 | 1/1988 | Japan . | |
| 37843 | 11/1935 | Netherlands . | |
| 449198 | 4/1968 | Switzerland . | |
| 755693 | 8/1980 | U.S.S.R. . | |

OTHER PUBLICATIONS

*Patent Abstracts of Japan*, vol. 12, No. 73 (M-674)[2920], Mar. 18, 1988, JP A 62 215410, Sep. 22, 1987.

*Primary Examiner*—Frank E. Werner
*Attorney, Agent, or Firm*—Heller, Ehrman, White & McAuliffe

[57] ABSTRACT

A storage system for storage and retrieval of material goods, including a lift having a vertically traveling endless lop and inserter assemblies for inserting containers onto a storage carousel while the carousel remains in continuous motion.

1 Claim, 41 Drawing Sheets

U.S. PATENT DOCUMENTS

| | | |
|---|---|---|
| 3,424,321 | 1/1969 | Lichti . |
| 3,448,870 | 8/1969 | Galio et al. . |
| 3,534,880 | 8/1969 | Rogers et al. . |
| 3,547,281 | 1/1970 | Lichti . |
| 3,571,892 | 3/1971 | Levy . |
| 3,593,862 | 7/1971 | Pierson . |
| 3,627,110 | 12/1971 | Lichti . |
| 3,633,726 | 1/1972 | Cartier . |
| 3,656,608 | 4/1972 | Lichti . |
| 3,672,485 | 6/1972 | Walters . |
| 3,719,288 | 3/1973 | Schmitt et al. . |
| 3,750,804 | 8/1973 | Lamelson . |
| 3,780,852 | 12/1973 | Weiss et al. . |
| 3,785,474 | 1/1974 | Nakomoto . |
| 3,805,974 | 4/1974 | Andersson et al. . |
| 3,809,263 | 5/1974 | Dodd et al. . |
| 3,883,203 | 5/1973 | Lexe . |
| 3,902,427 | 9/1975 | Kastenbein ............... 198/803.01 X |
| 3,903,810 | 9/1975 | Jones . |
| 3,954,165 | 5/1978 | Snyder . |
| 3,989,090 | 11/1978 | Kawai . |
| 4,018,325 | 4/1977 | Rajsa . |
| 4,033,450 | 7/1977 | Paddock et al. . |
| 4,071,150 | 1/1978 | Thompson et al. . |
| 4,110,214 | 8/1978 | Pfeffer . |
| 4,168,009 | 9/1979 | Ide . |
| 4,227,607 | 10/1980 | Malavenda . |
| 4,232,779 | 11/1980 | Khoylian et al. . |
| 4,239,436 | 12/1980 | Wildenaur . |
| 4,307,988 | 12/1981 | Page et al. . |
| 4,379,671 | 4/1983 | Cochran . |
| 4,389,157 | 6/1983 | Bernard, II et al. . |
| 4,394,104 | 7/1983 | Camerini et al. . |
| 4,422,884 | 12/1973 | Lichti . |
| 4,505,378 | 3/1985 | Kuster . |
| 4,509,893 | 4/1985 | Nashimoto . |
| 4,547,343 | 10/1985 | Takano et al. ............ 198/803.01 X |
| 4,561,820 | 12/1985 | Matheny, III et al. . |
| 4,618,932 | 10/1986 | Sauer . |
| 4,651,863 | 3/1987 | Reuter et al. ................... 414/331 X |
| 4,752,175 | 6/1988 | Lichti . |
| 4,909,697 | 3/1990 | Bernard, II et al. . |
| 4,968,207 | 11/1990 | Lichti . |

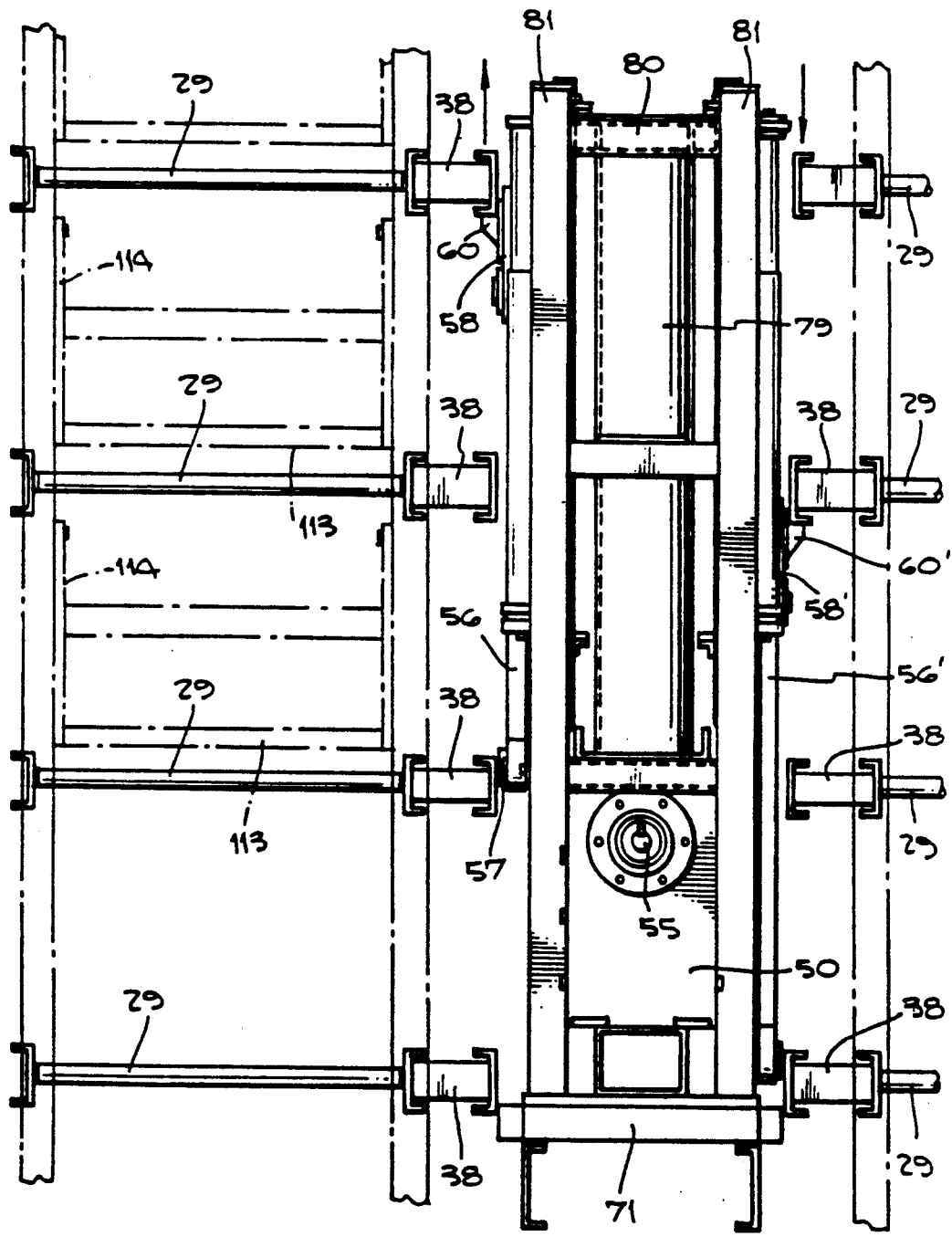

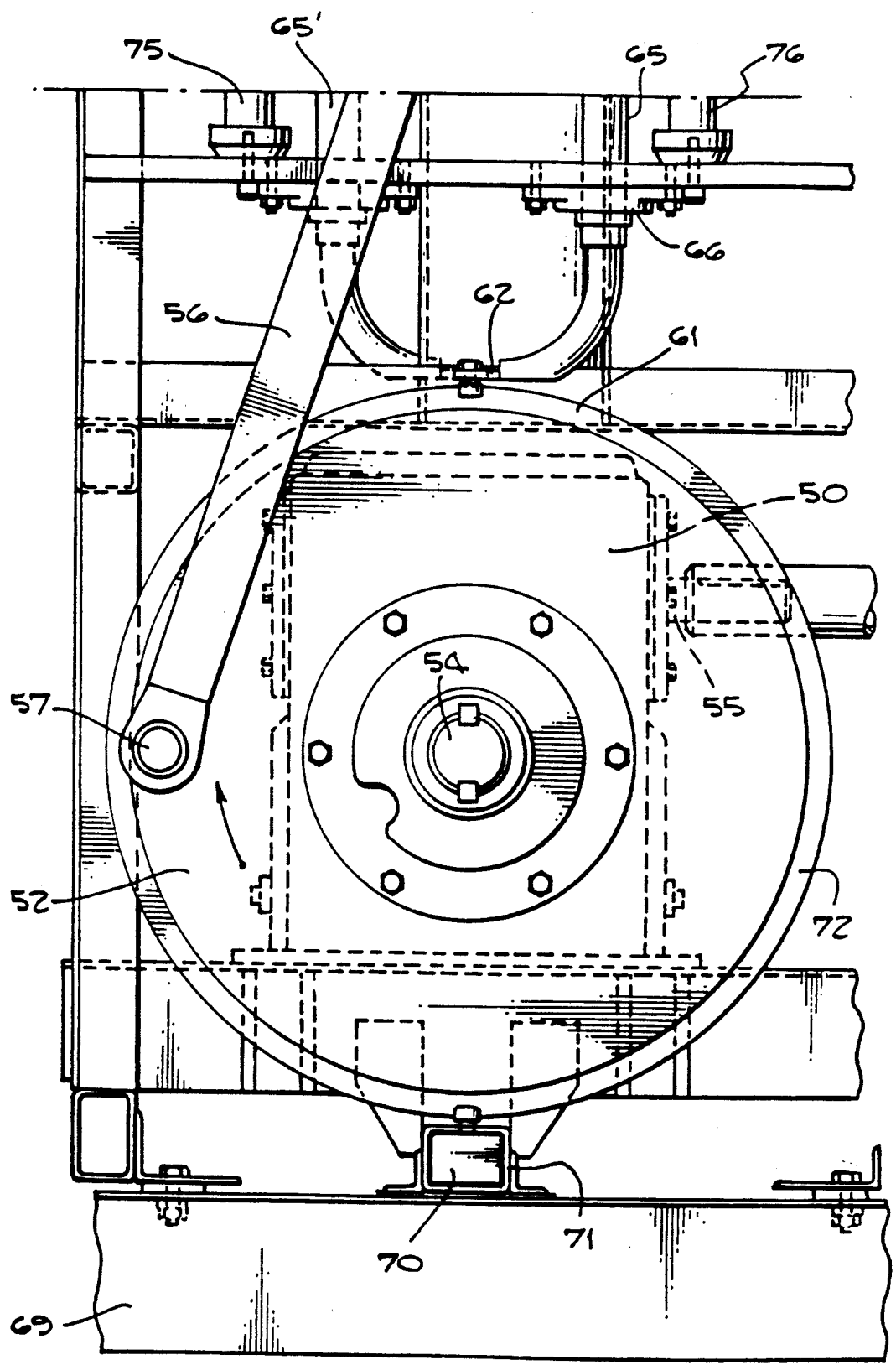
FIG._7a

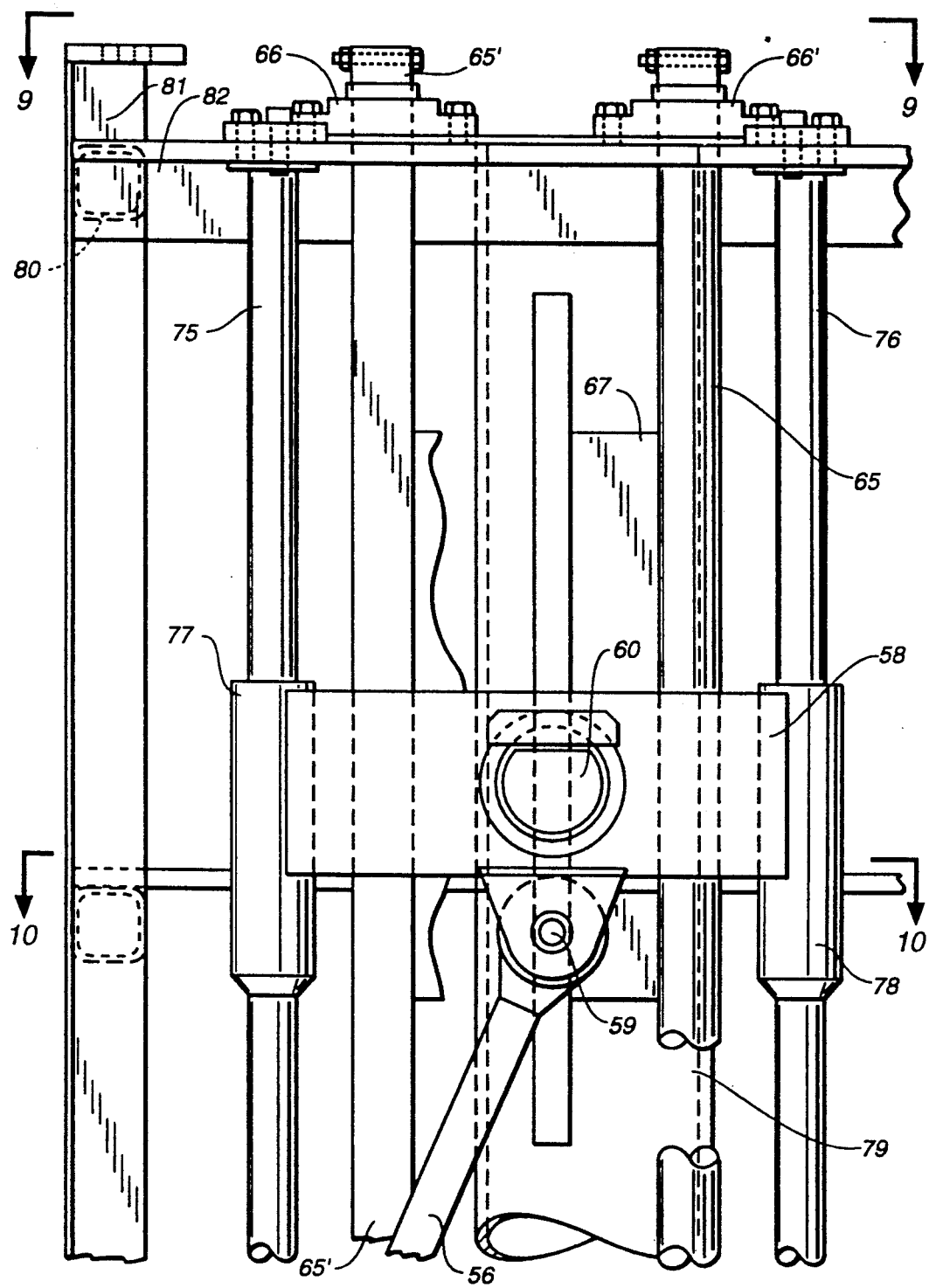
FIG._7b

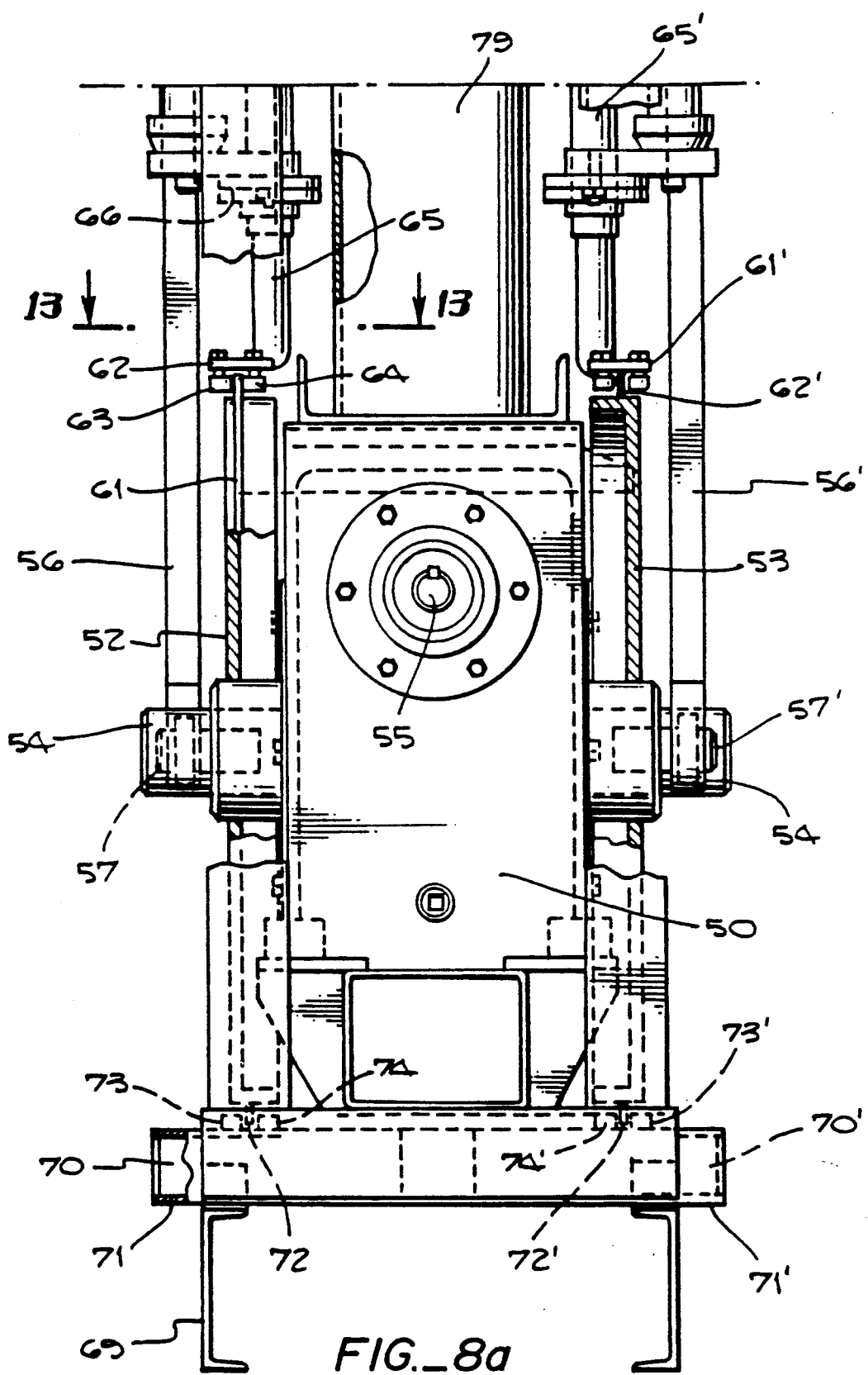
FIG._8a

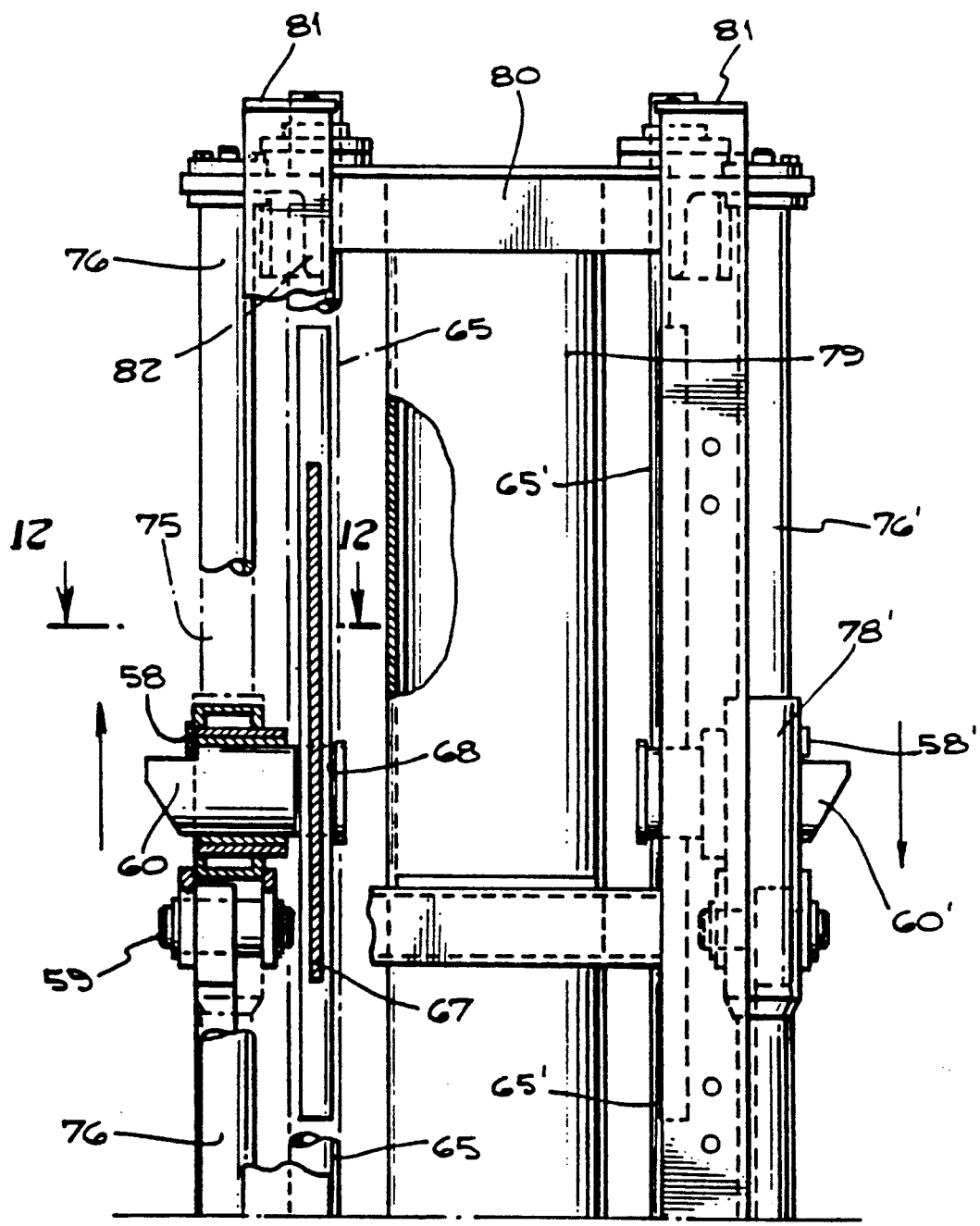

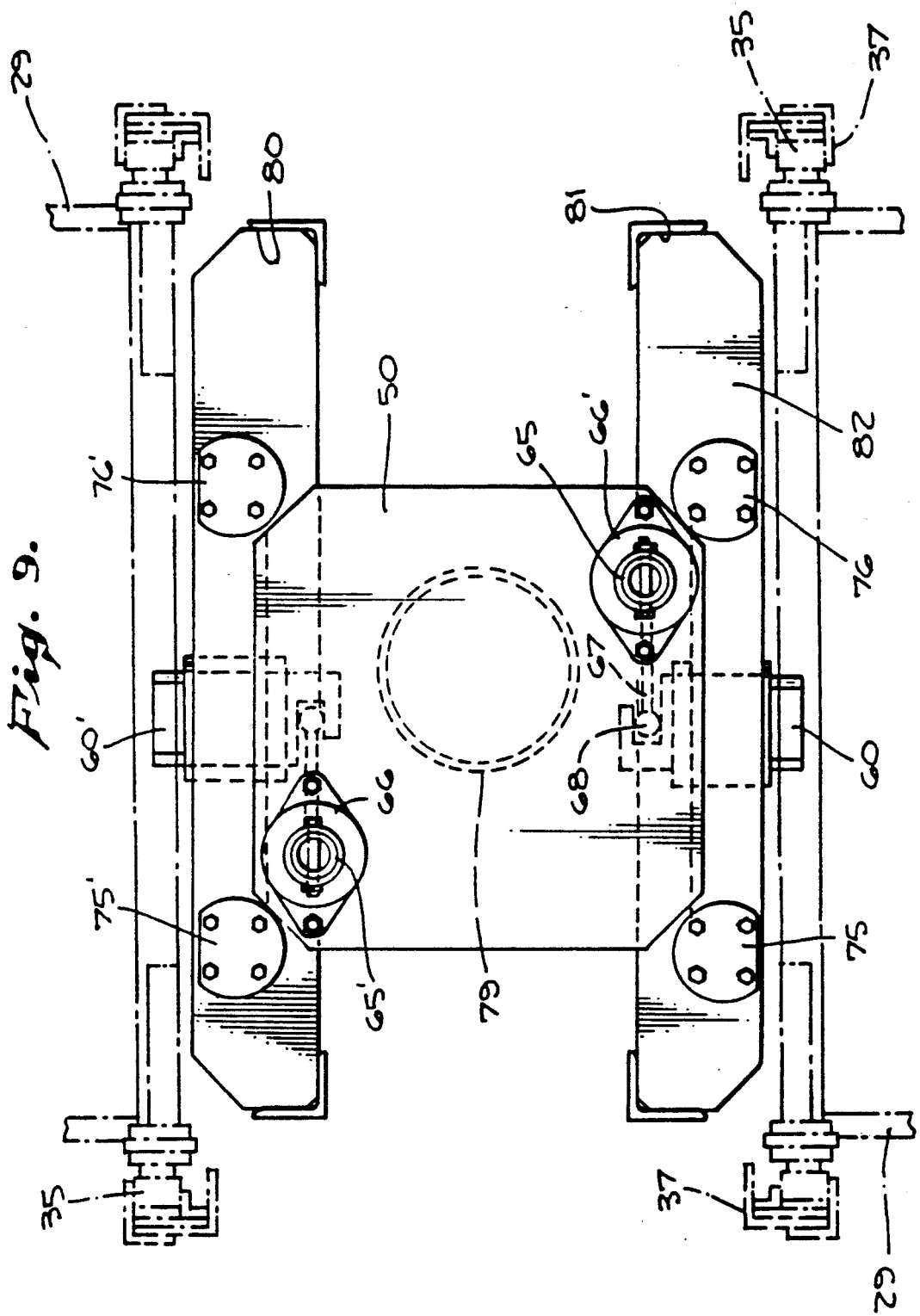

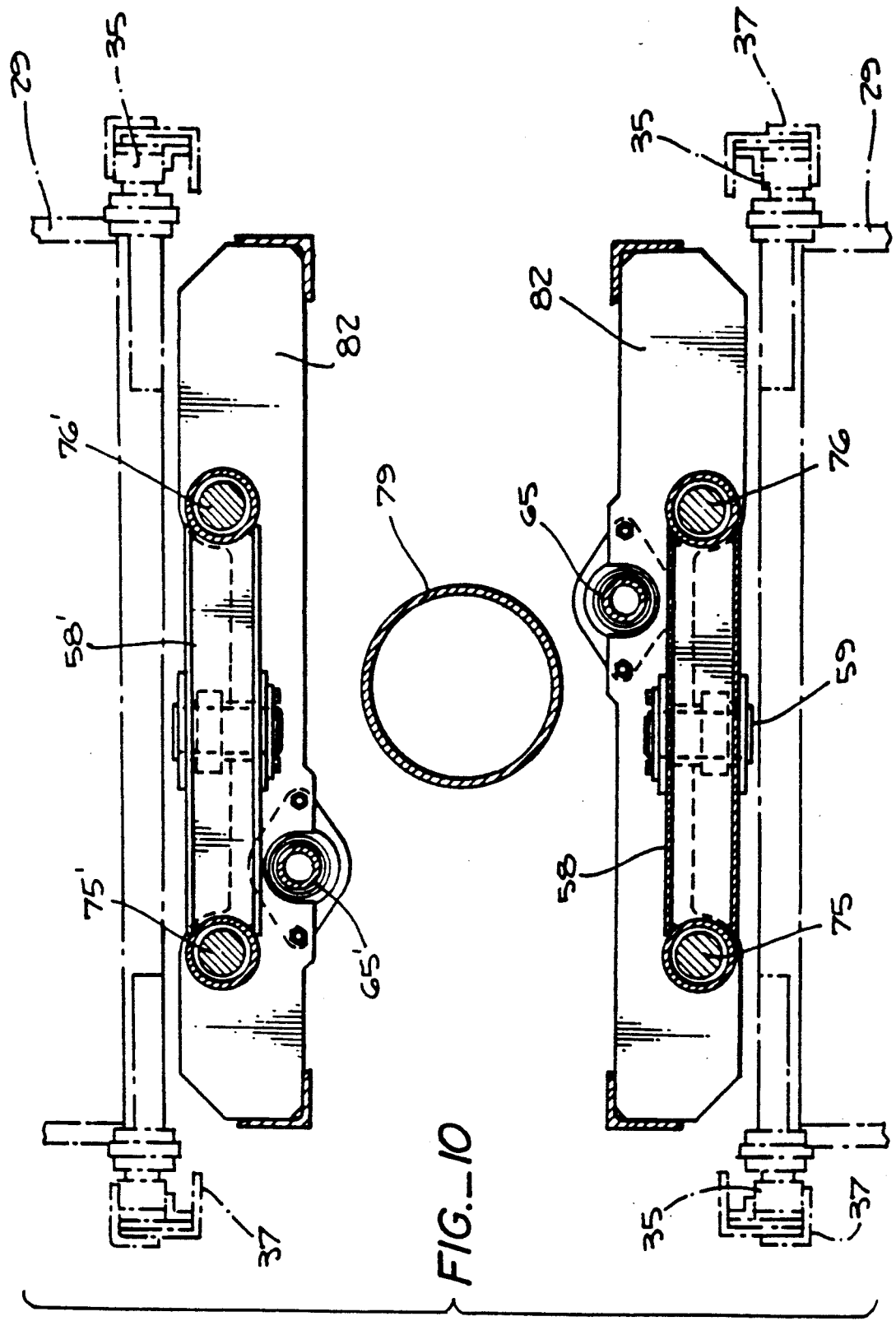
FIG._10

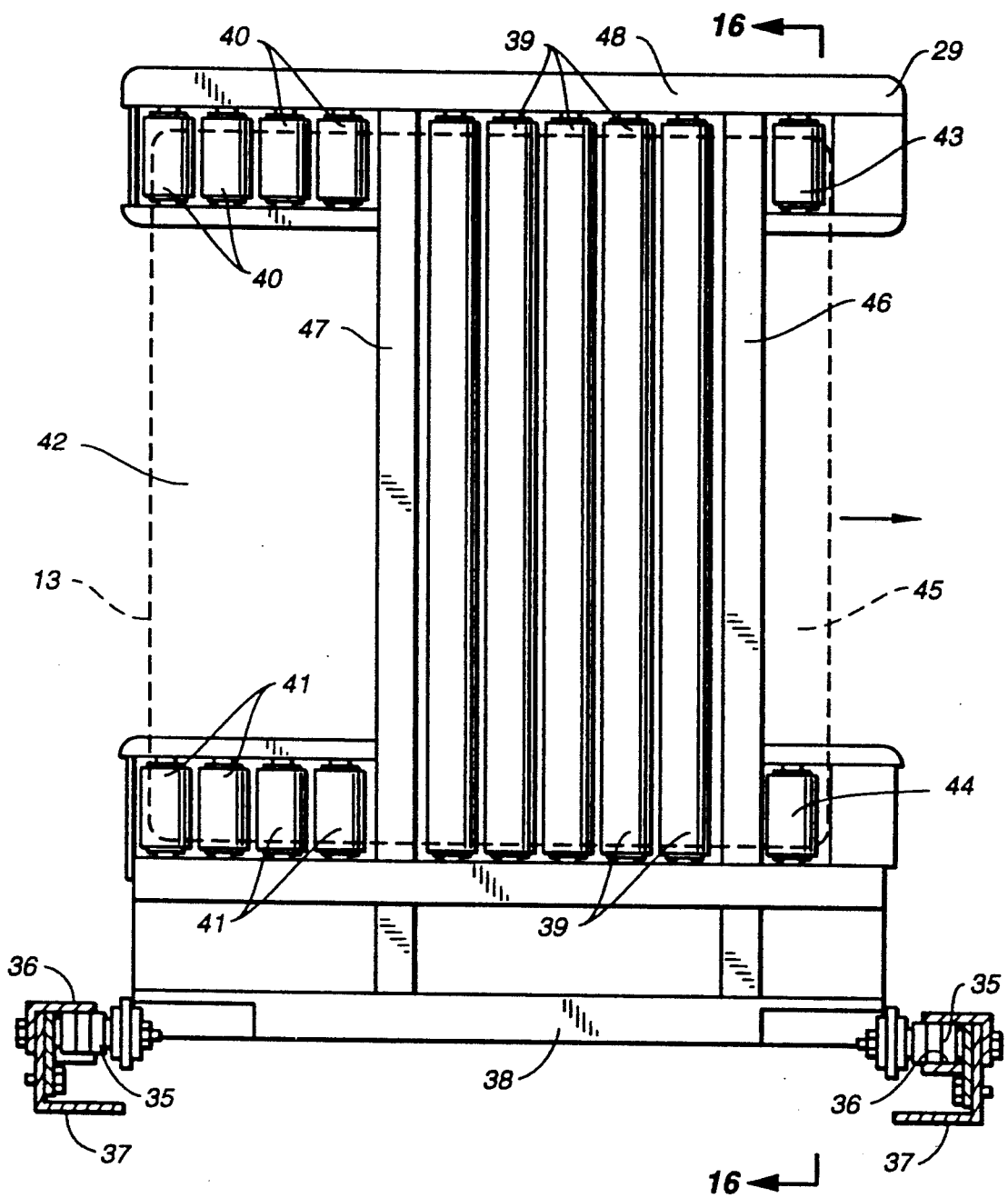
FIG._15

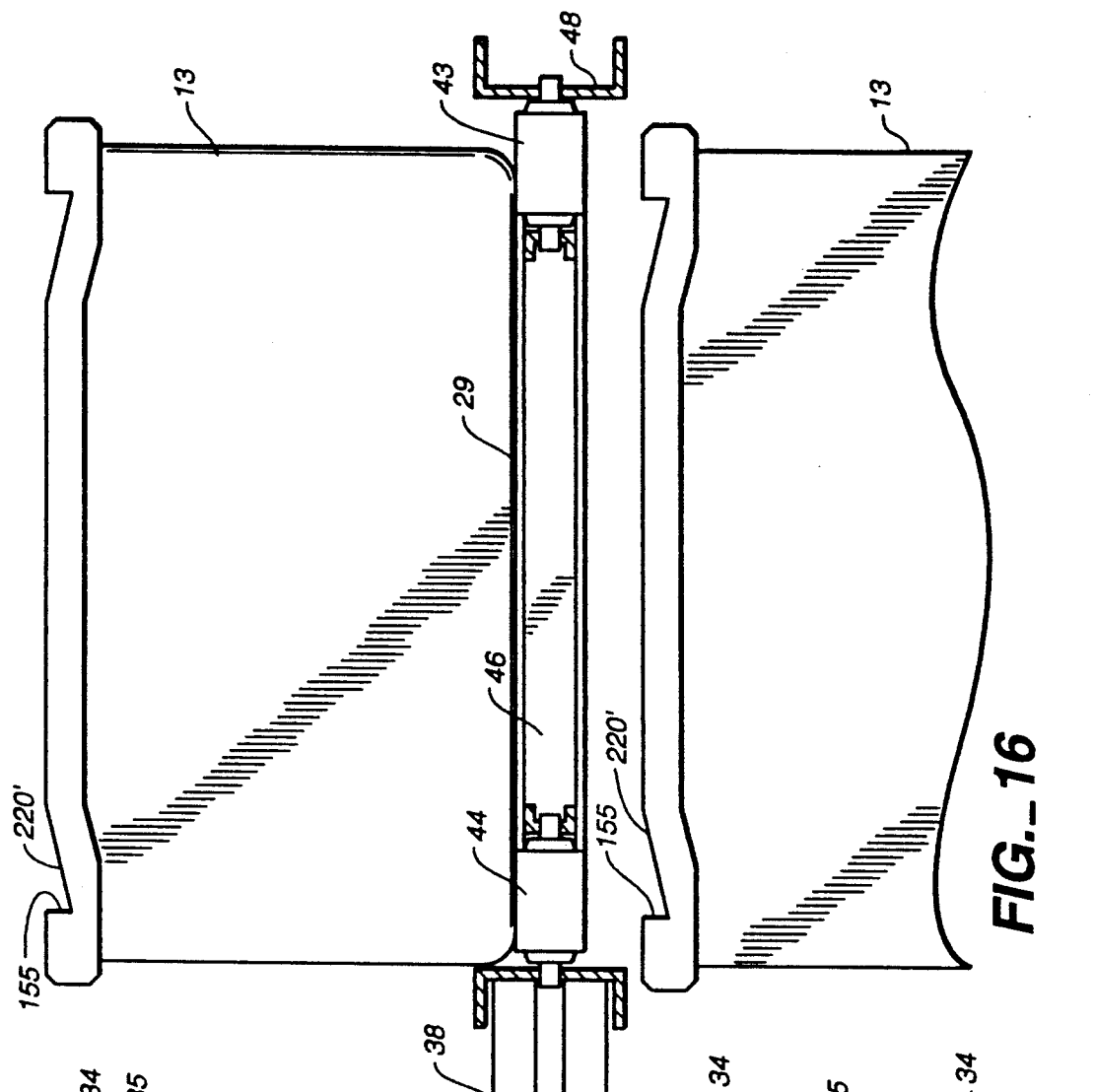
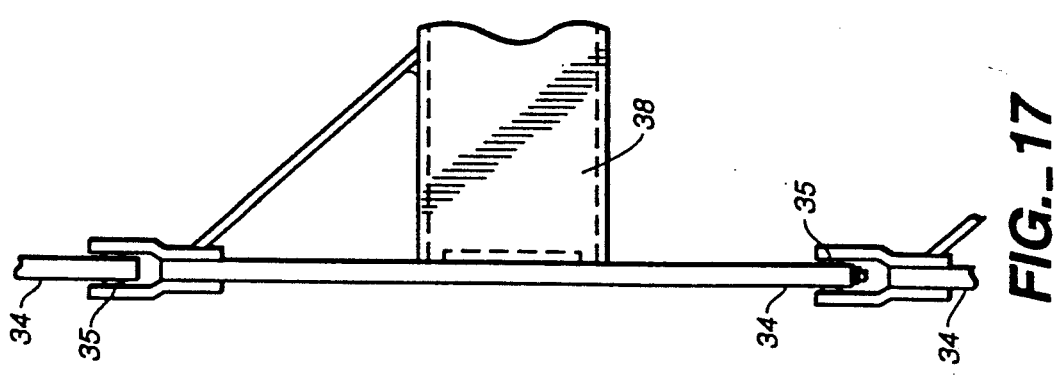

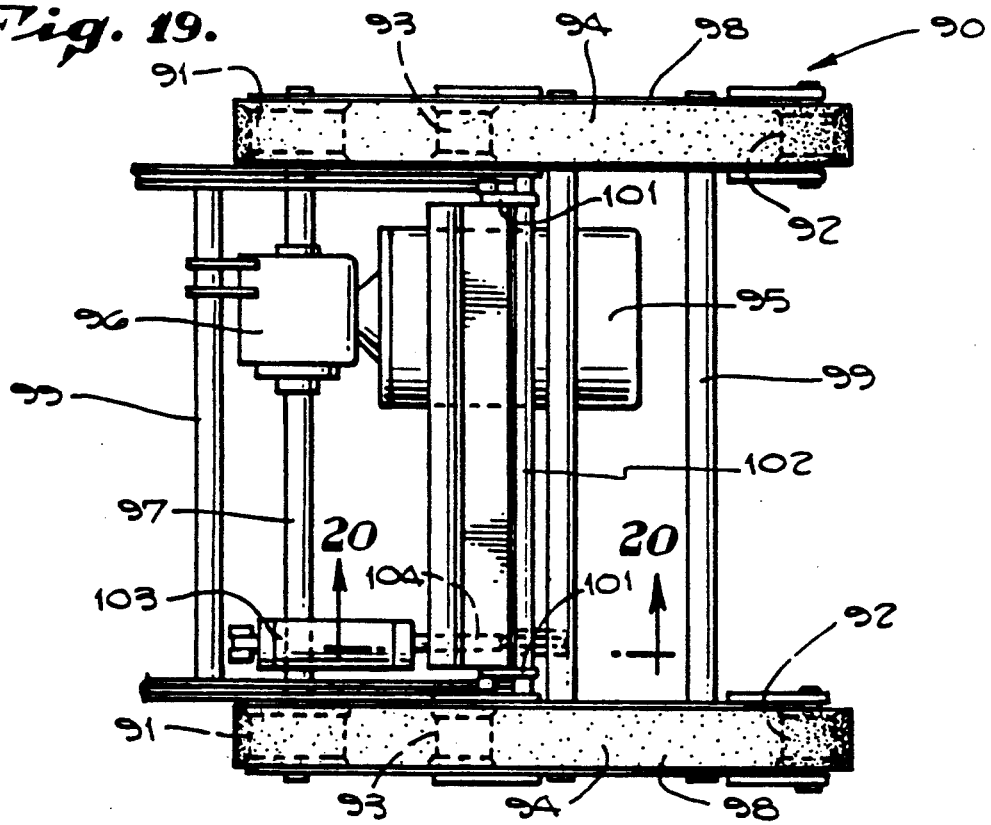
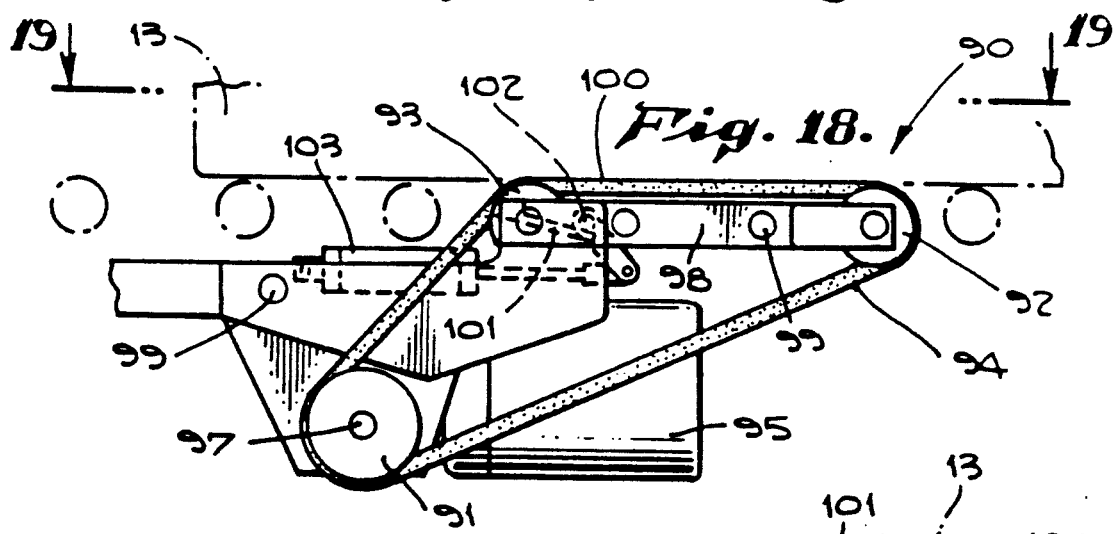
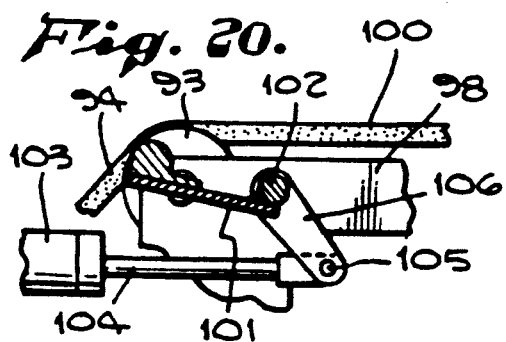
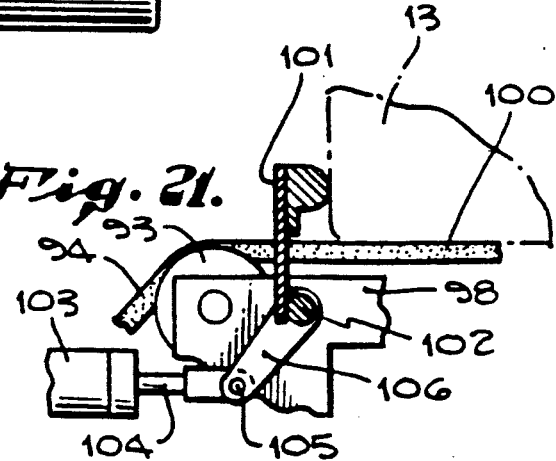

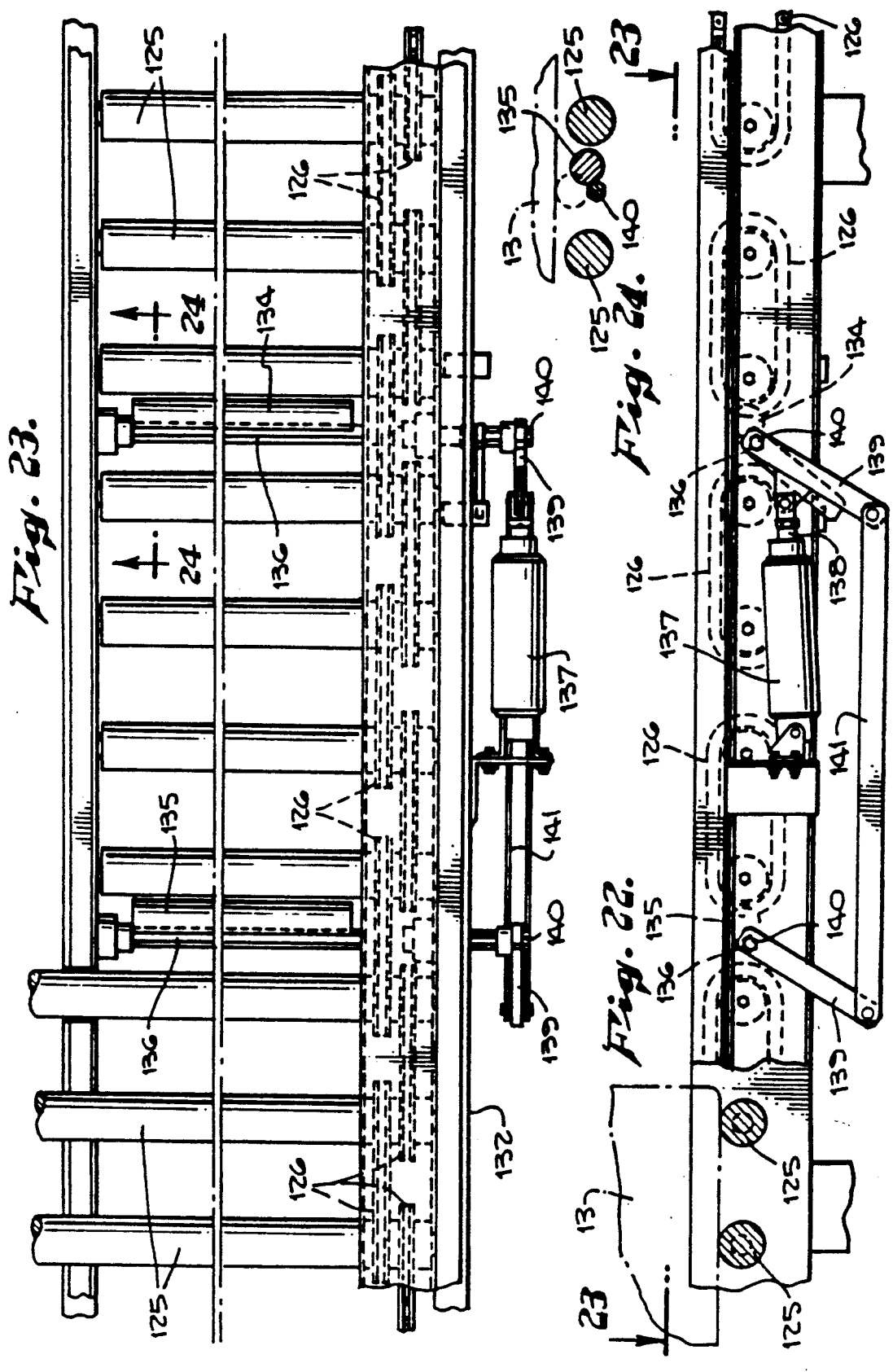

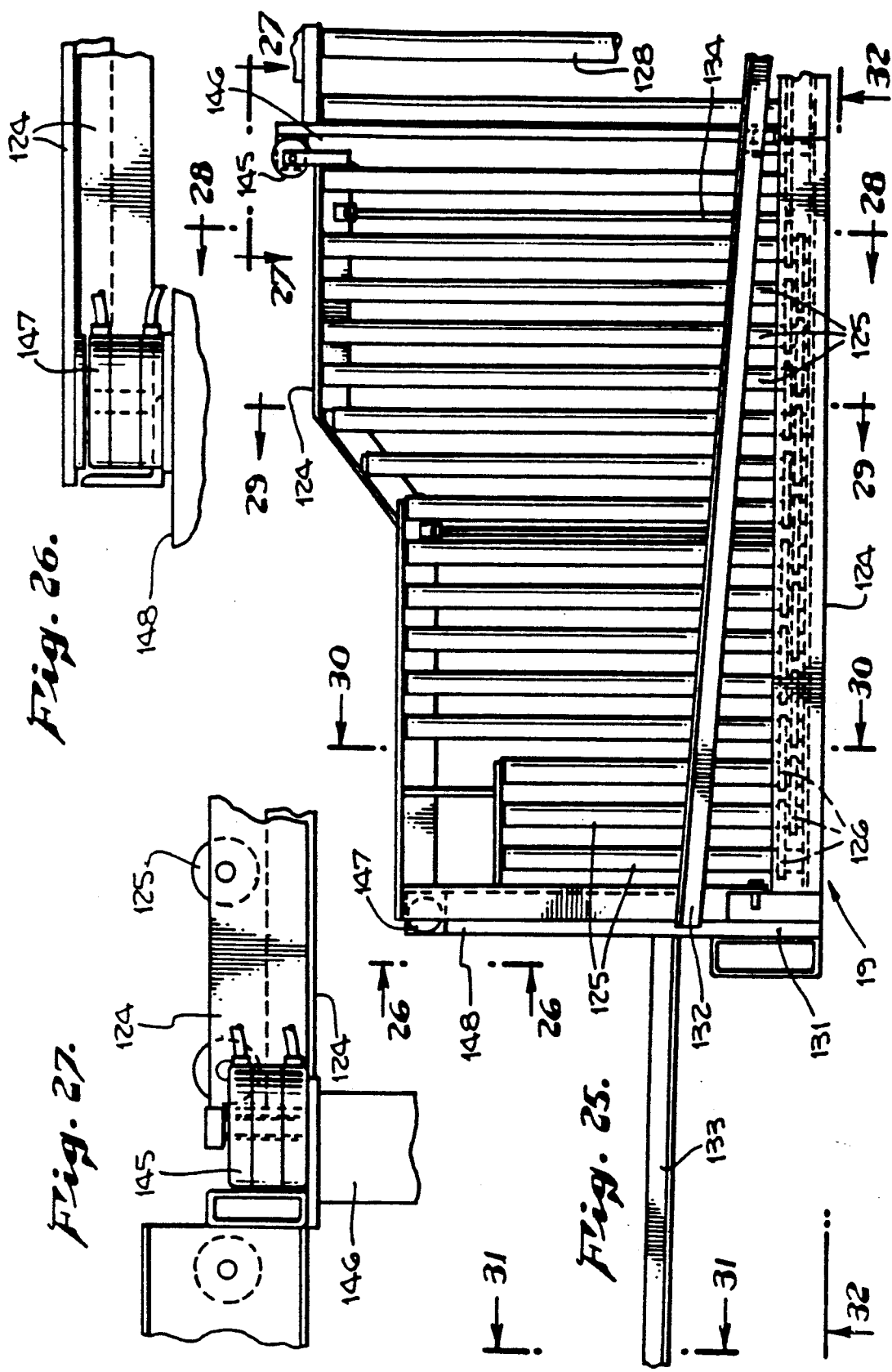

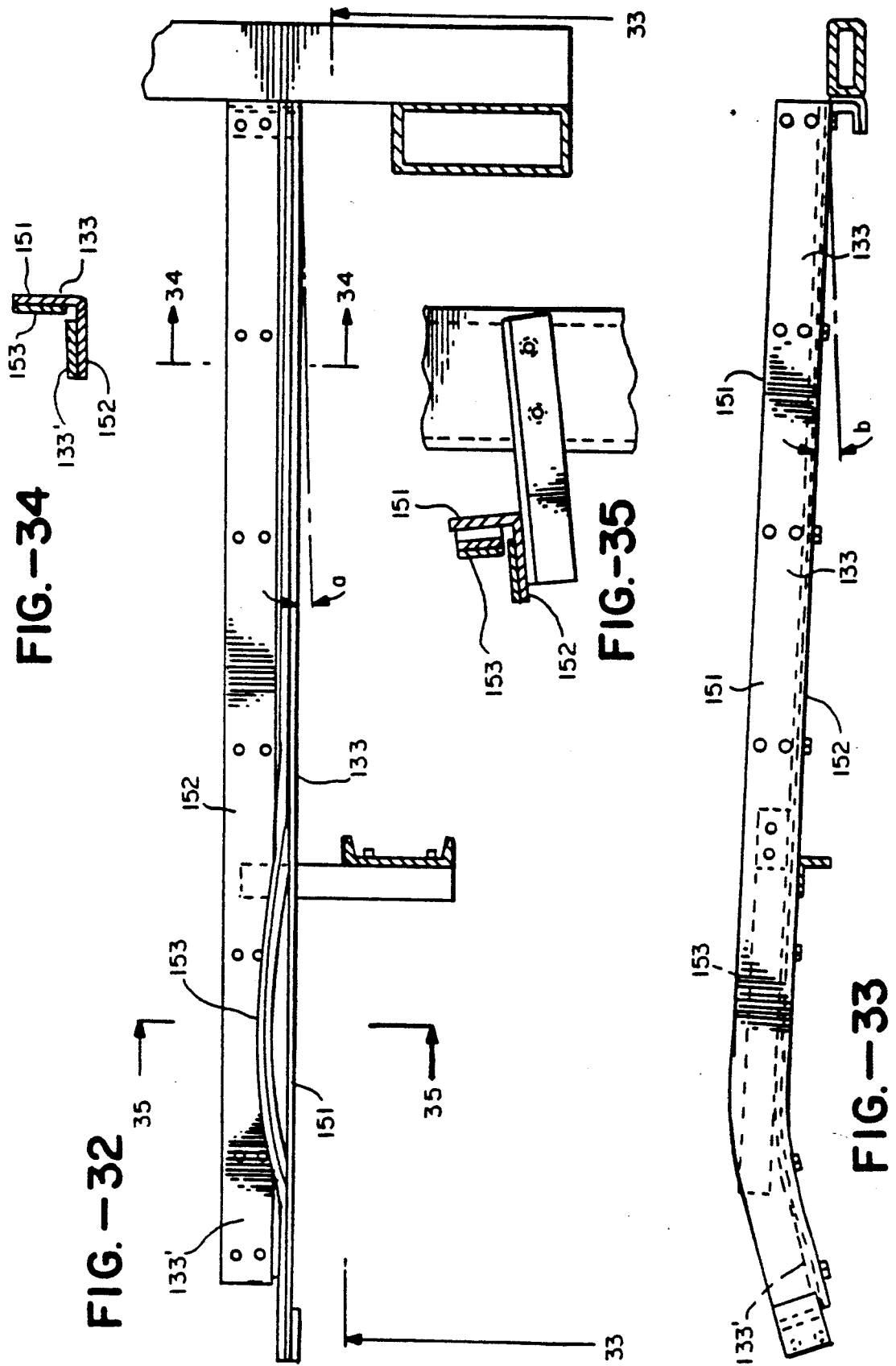

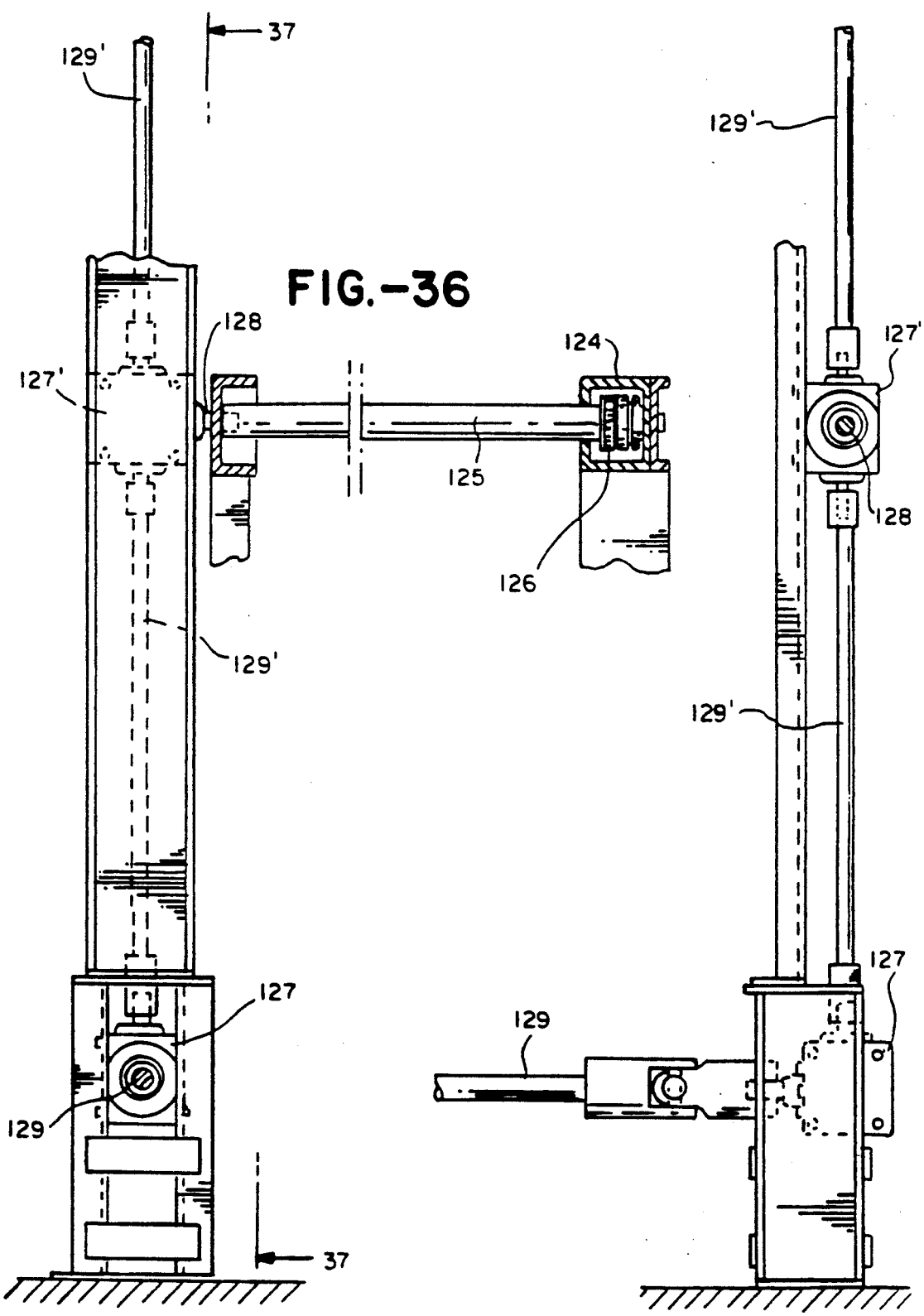

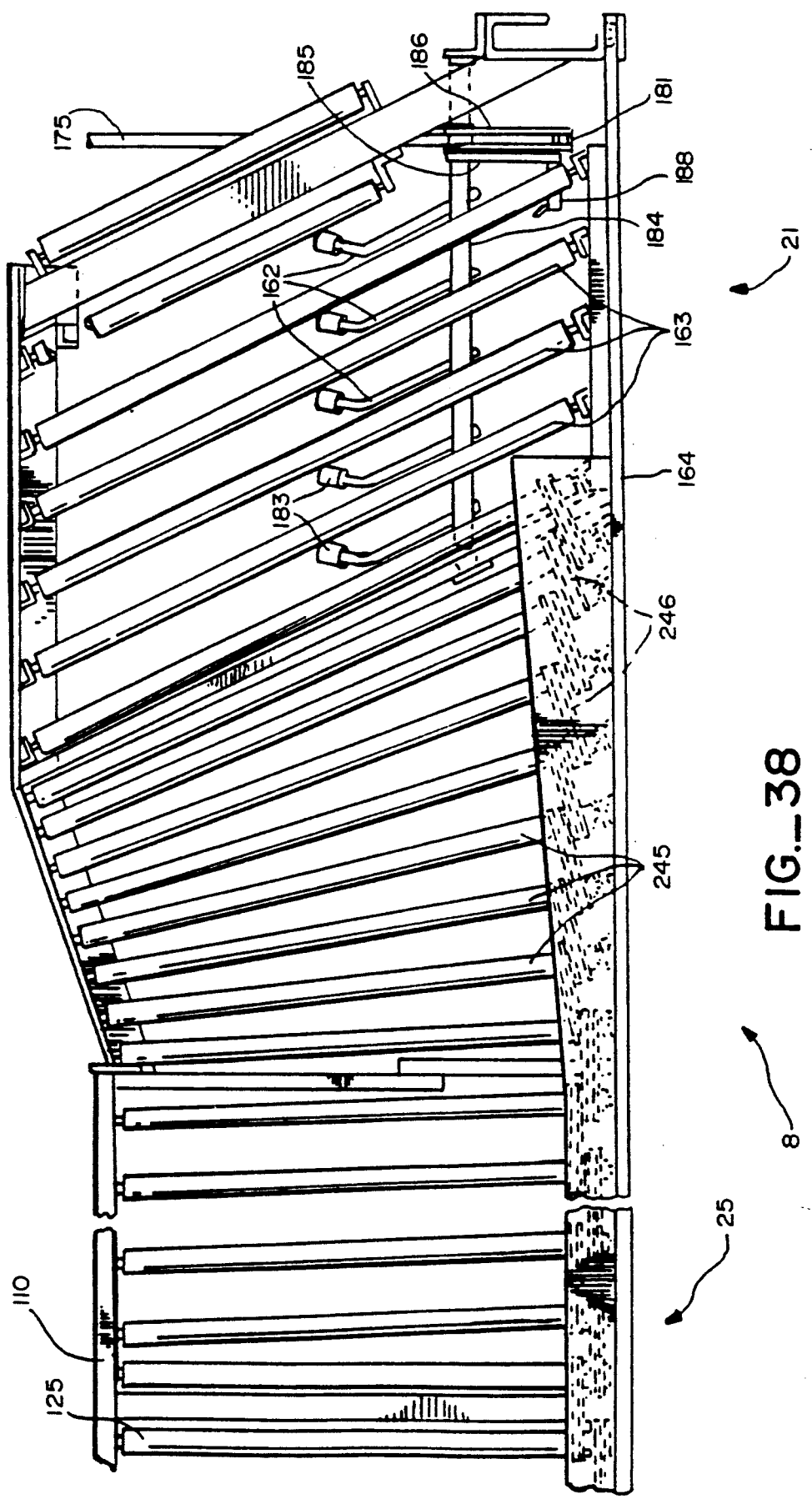
FIG._38

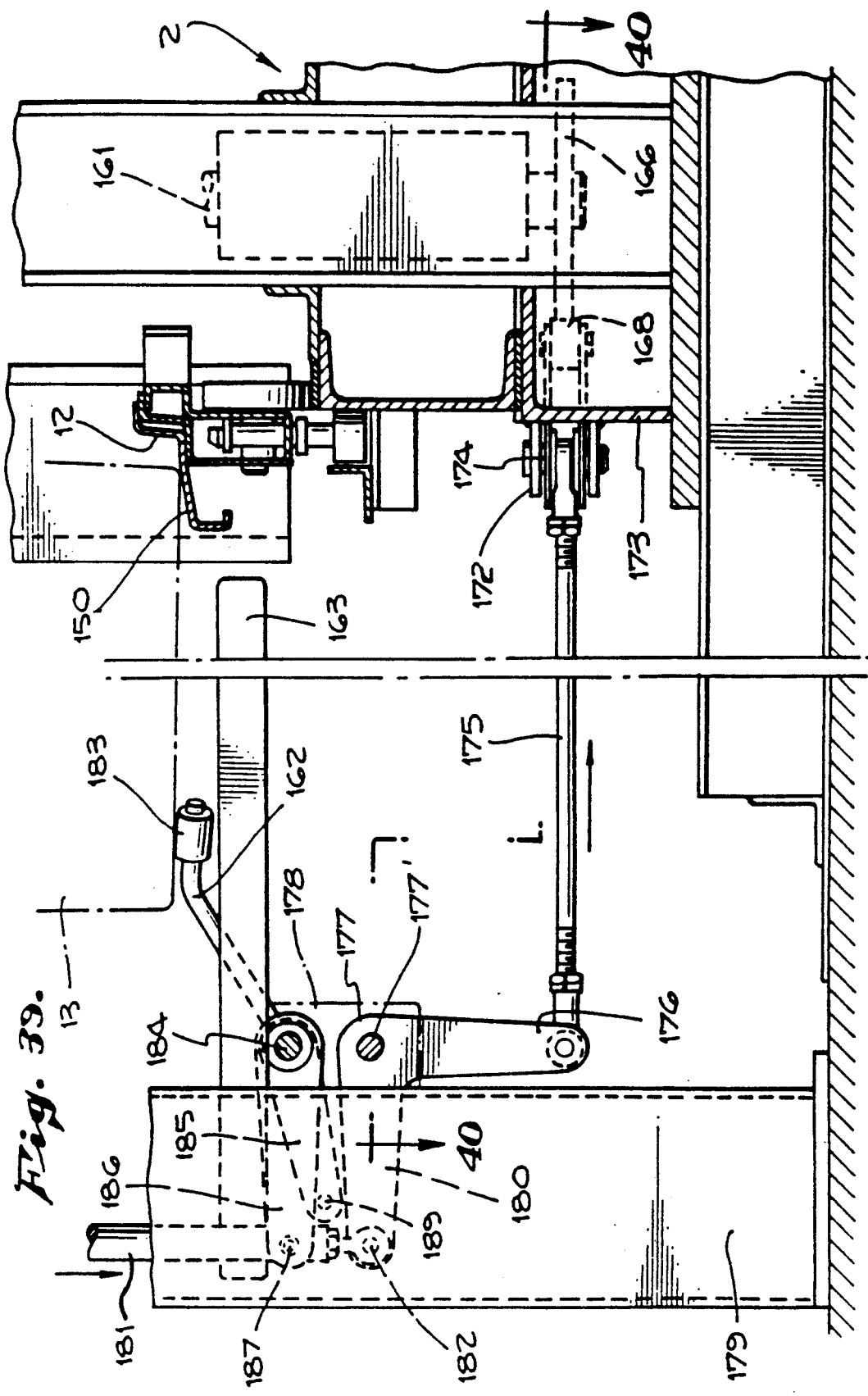

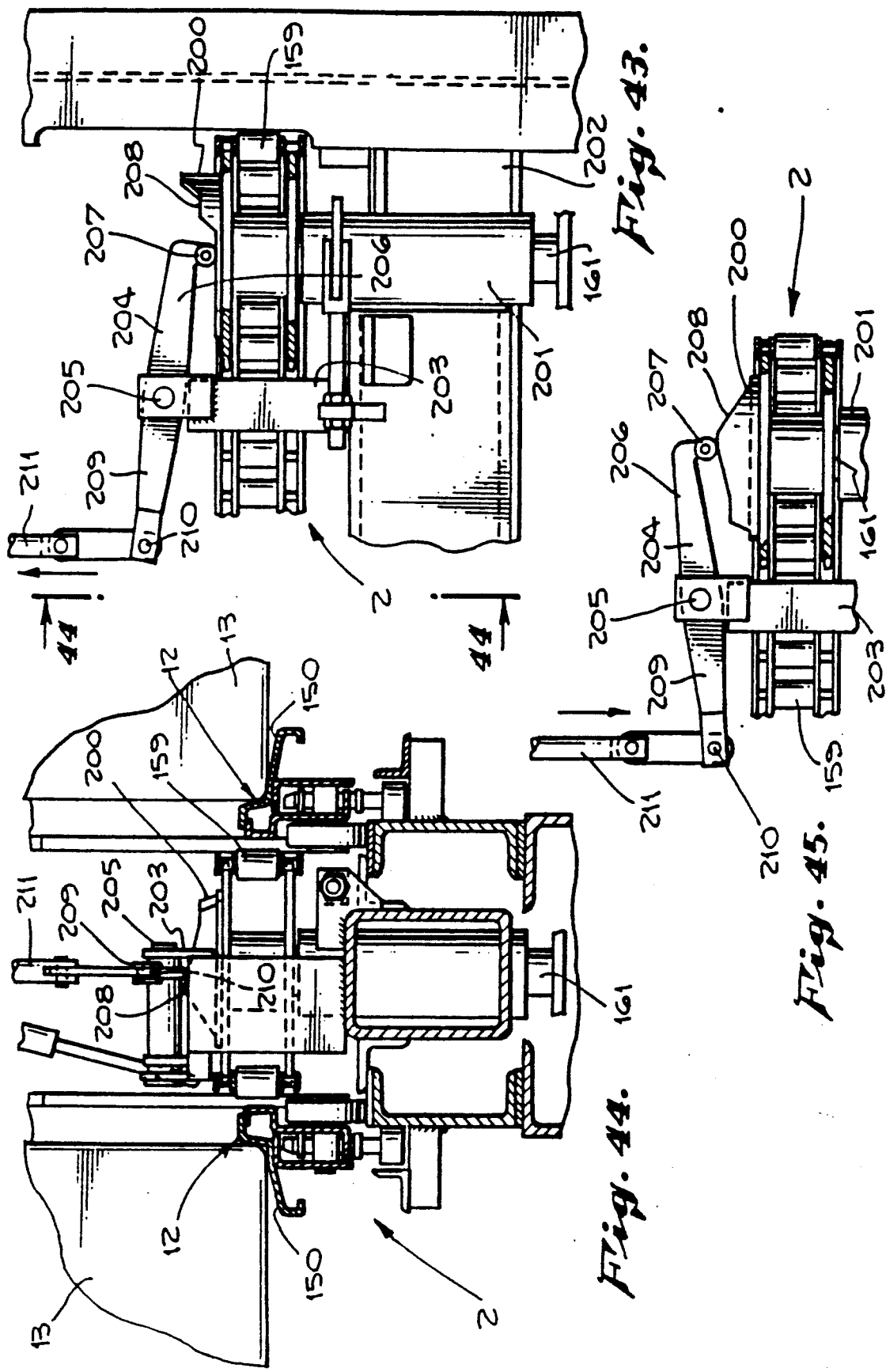

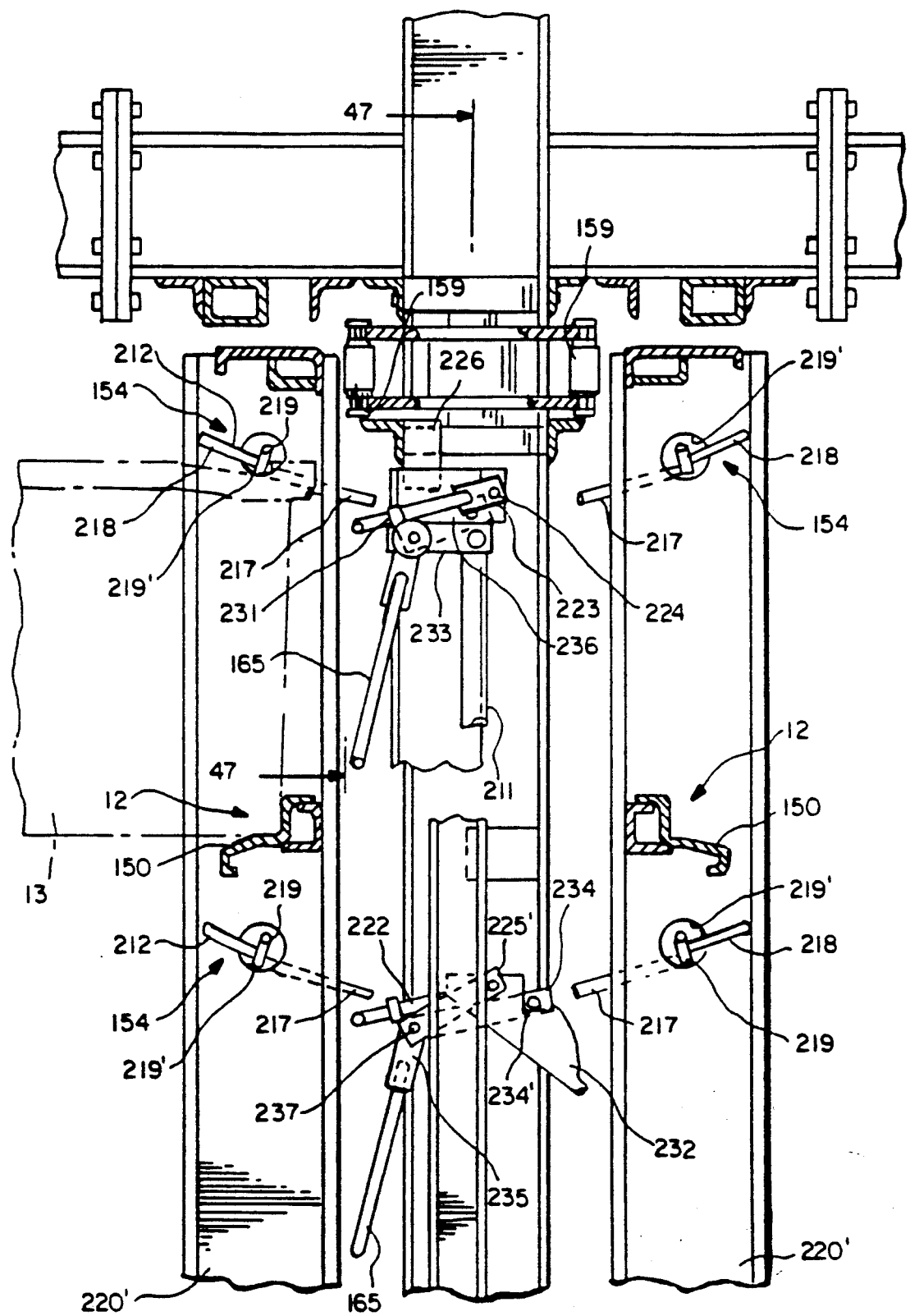
FIG. — 46

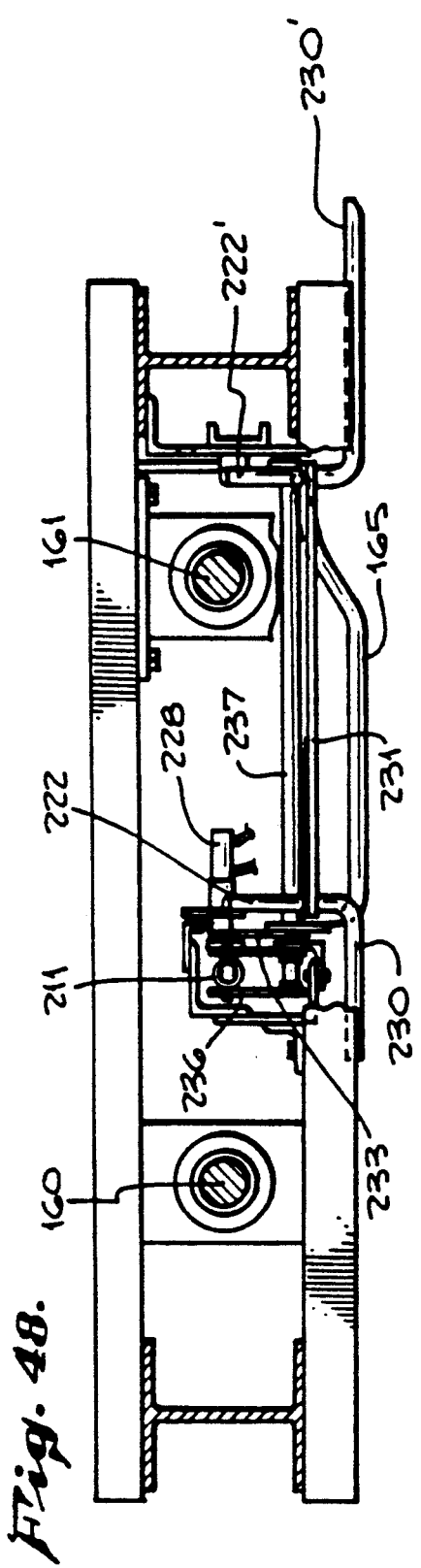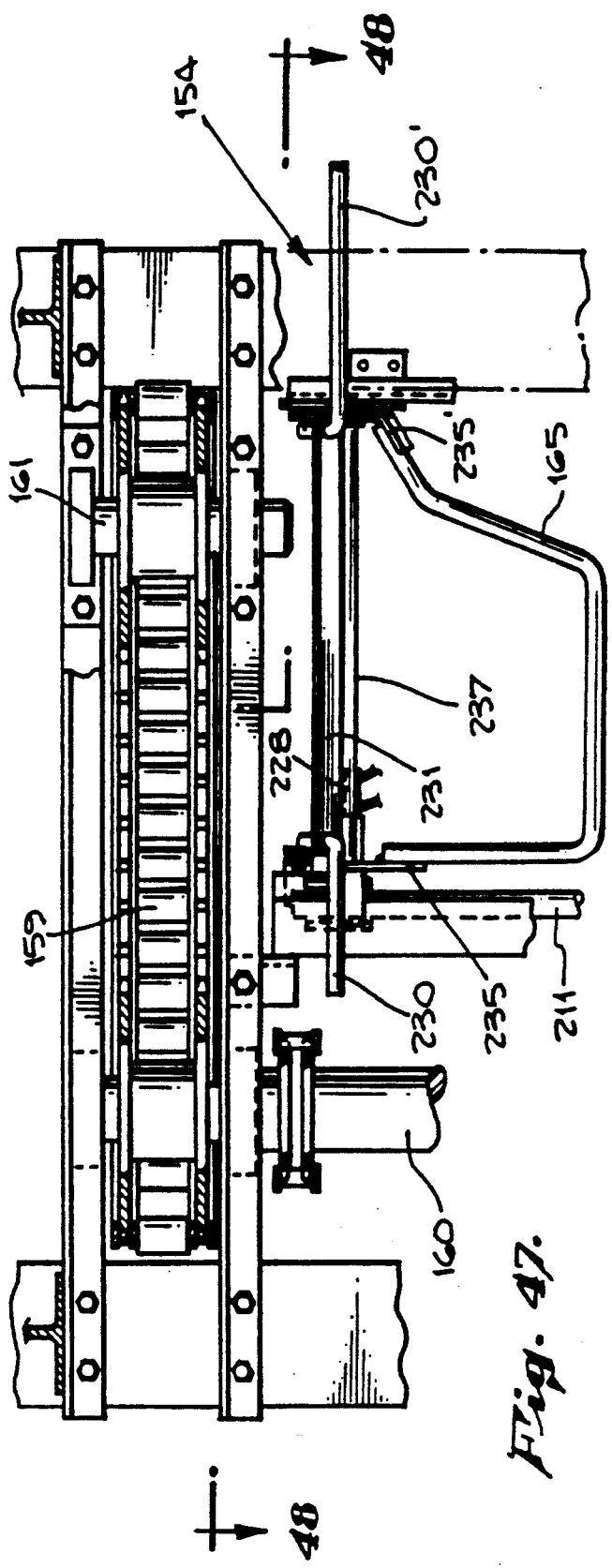

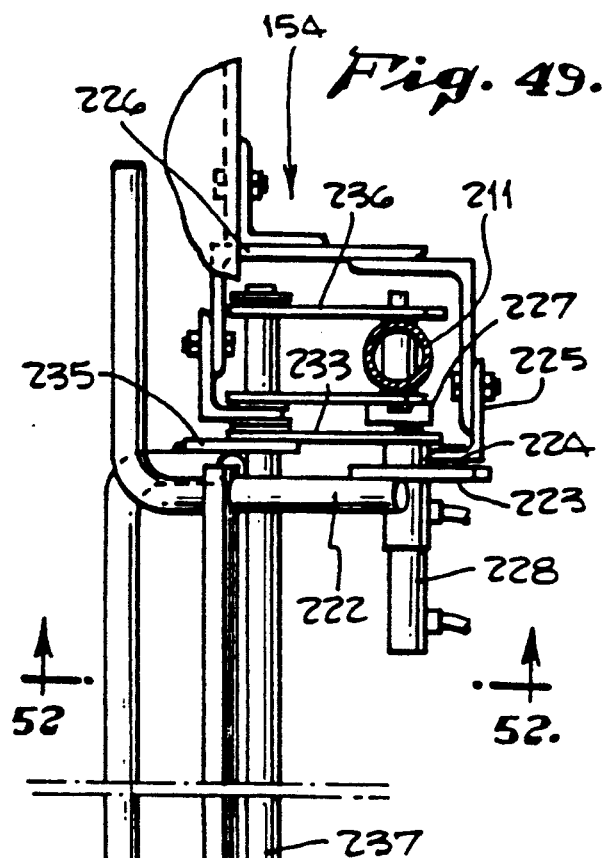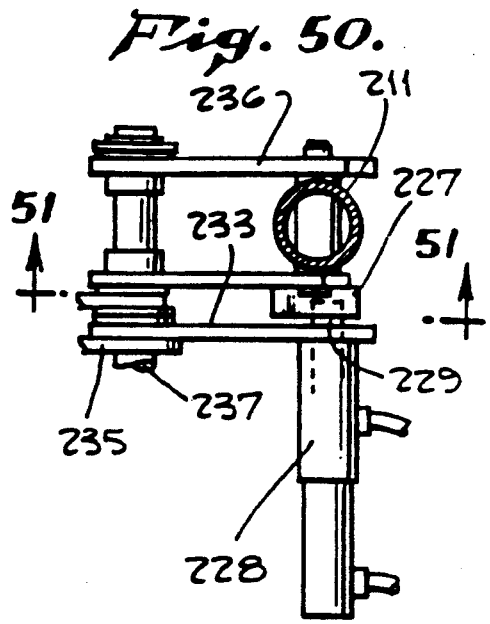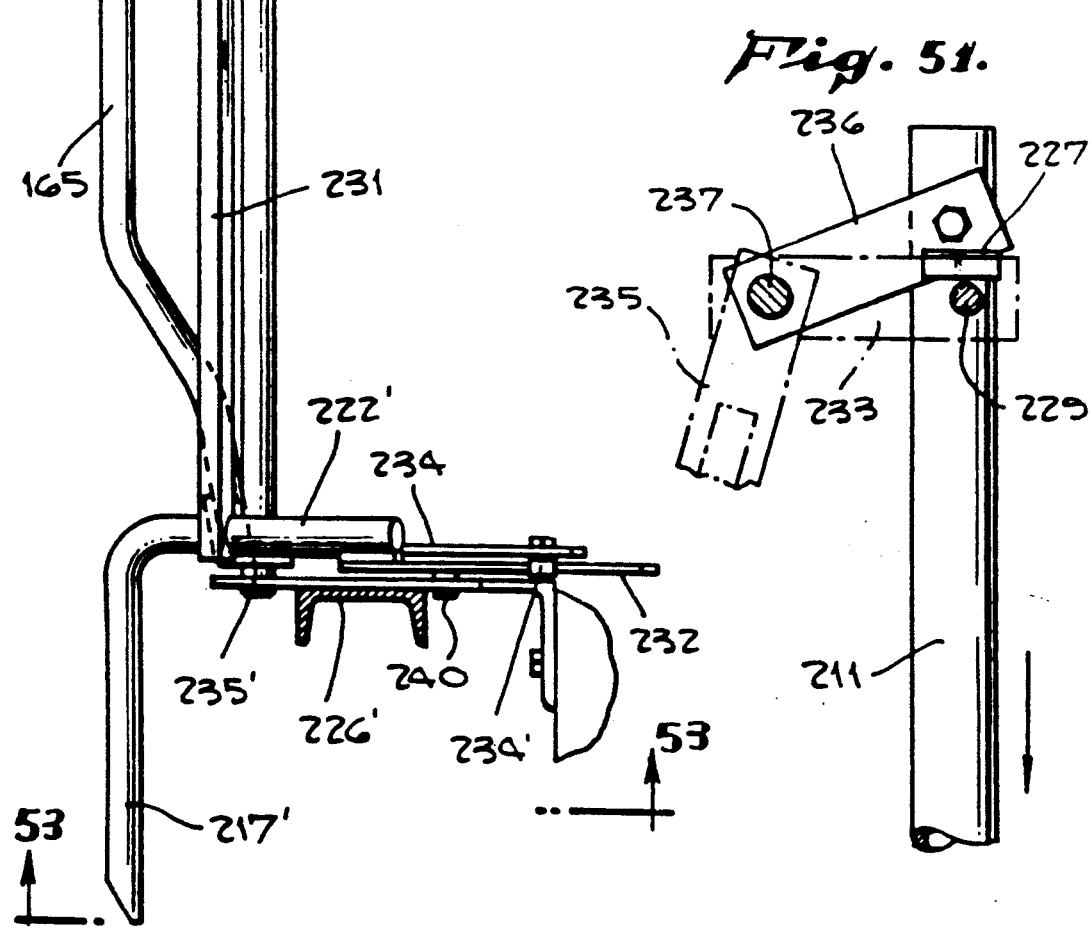

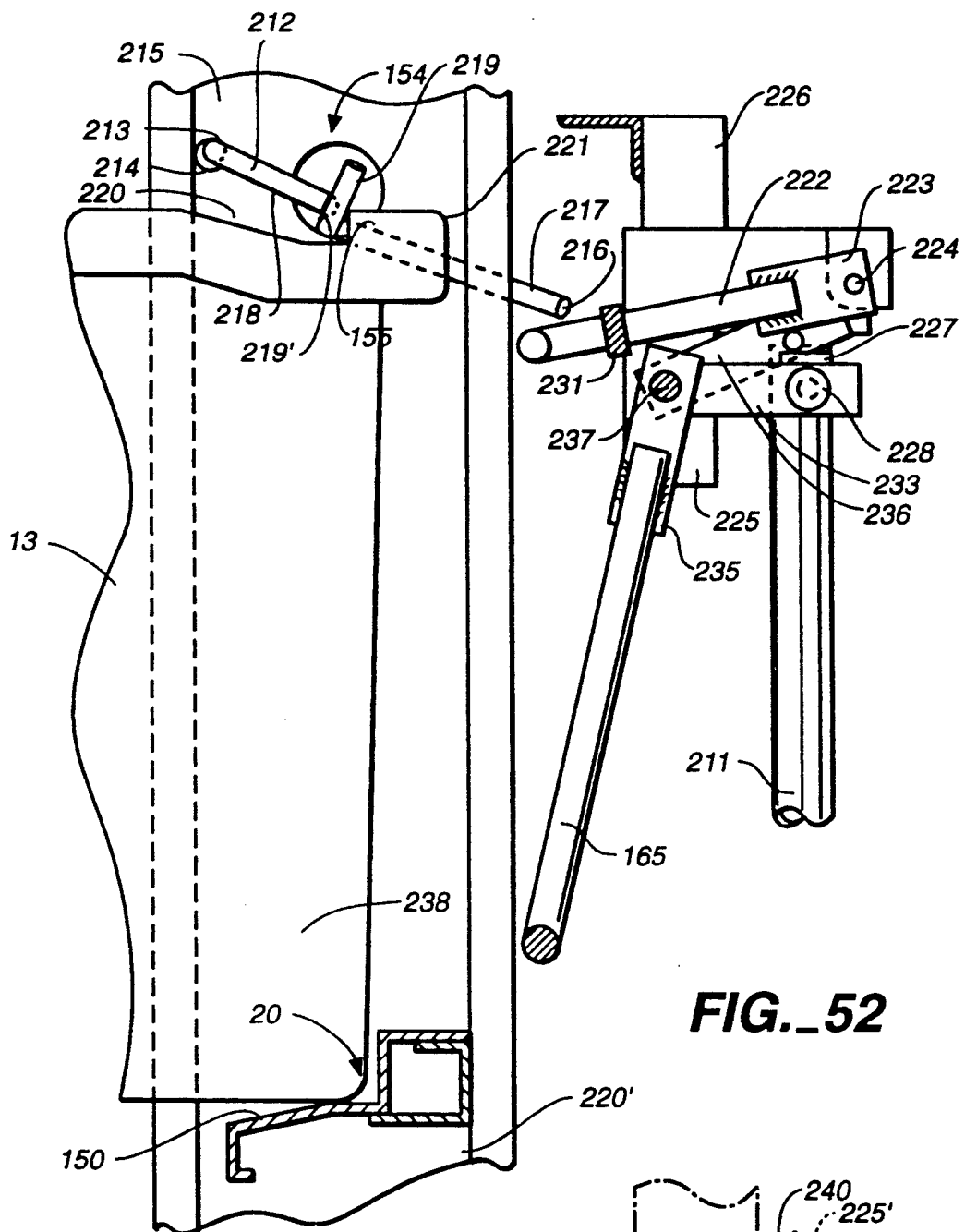
FIG._52
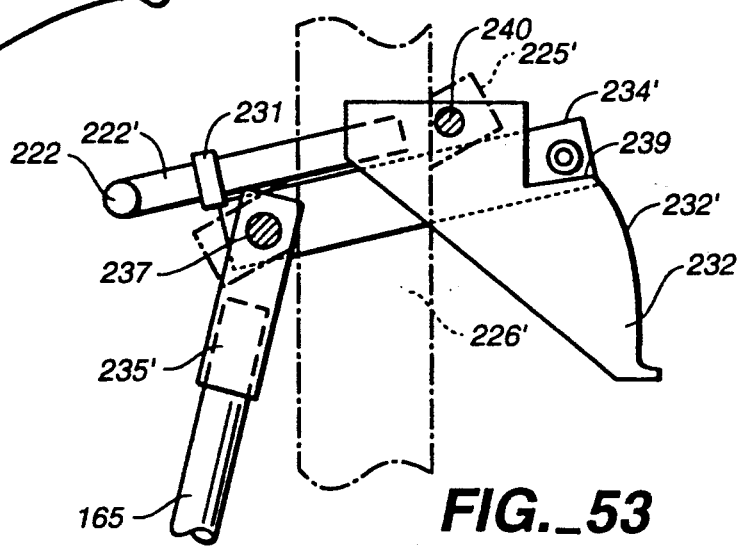
FIG._53

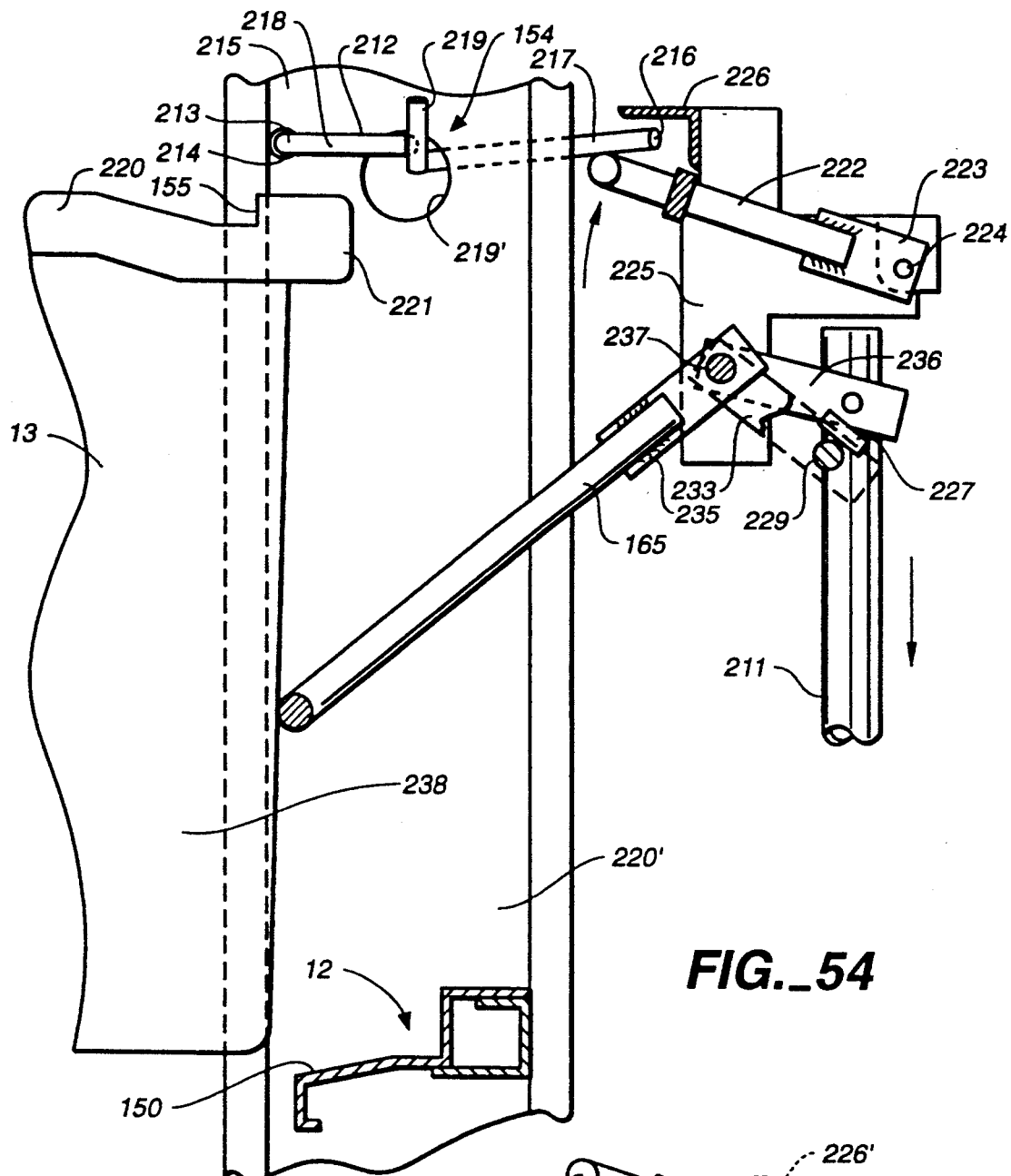
FIG._54
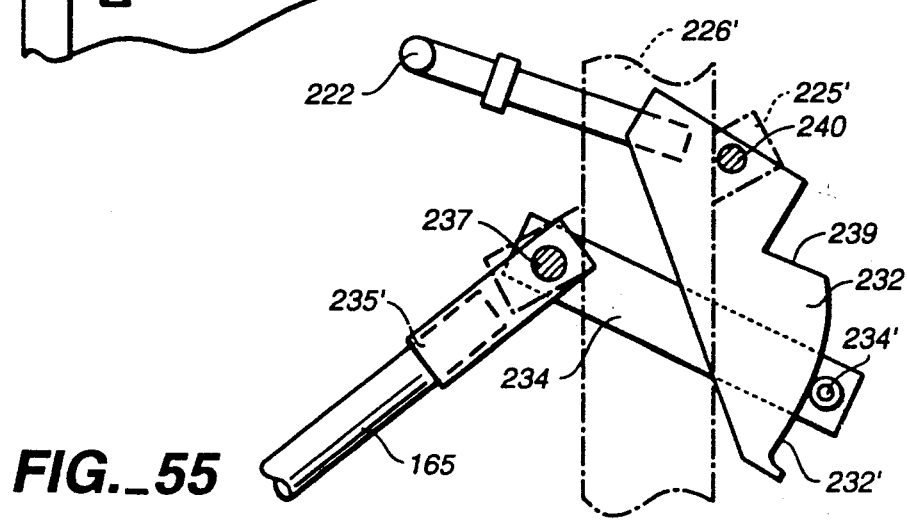
FIG._55

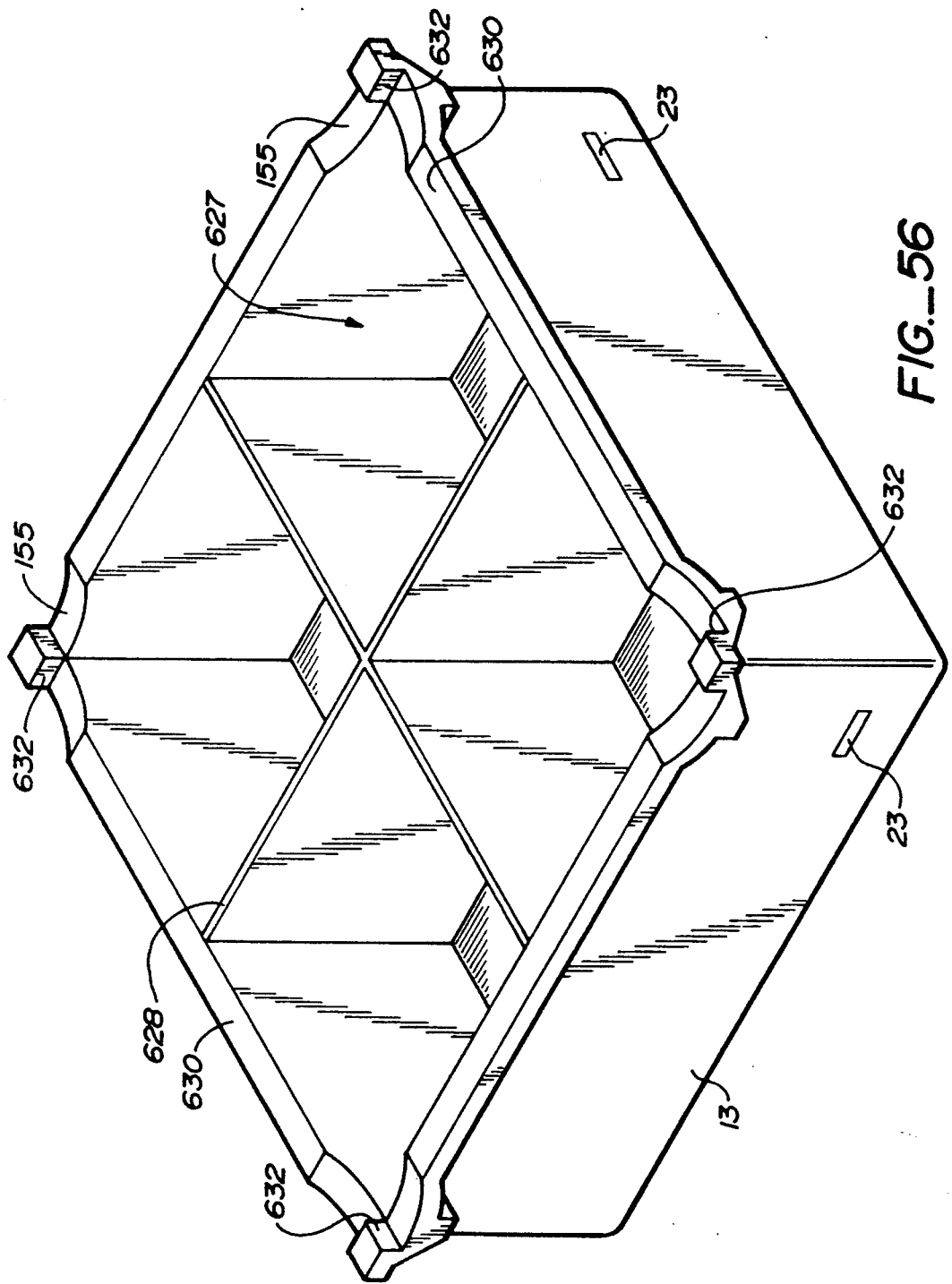
FIG._56

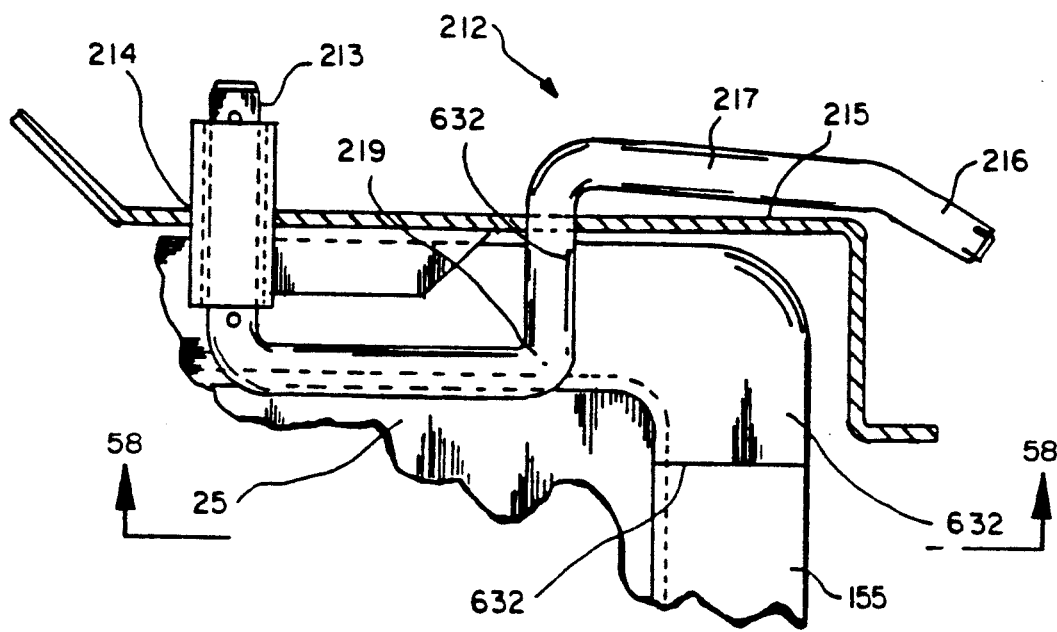
FIG. −57
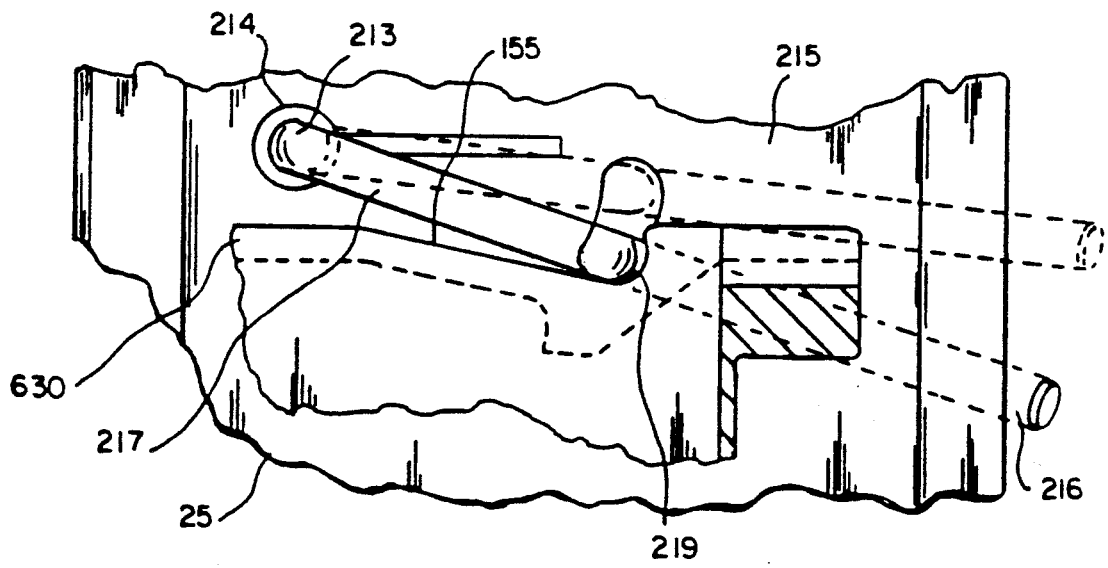
FIG. −58

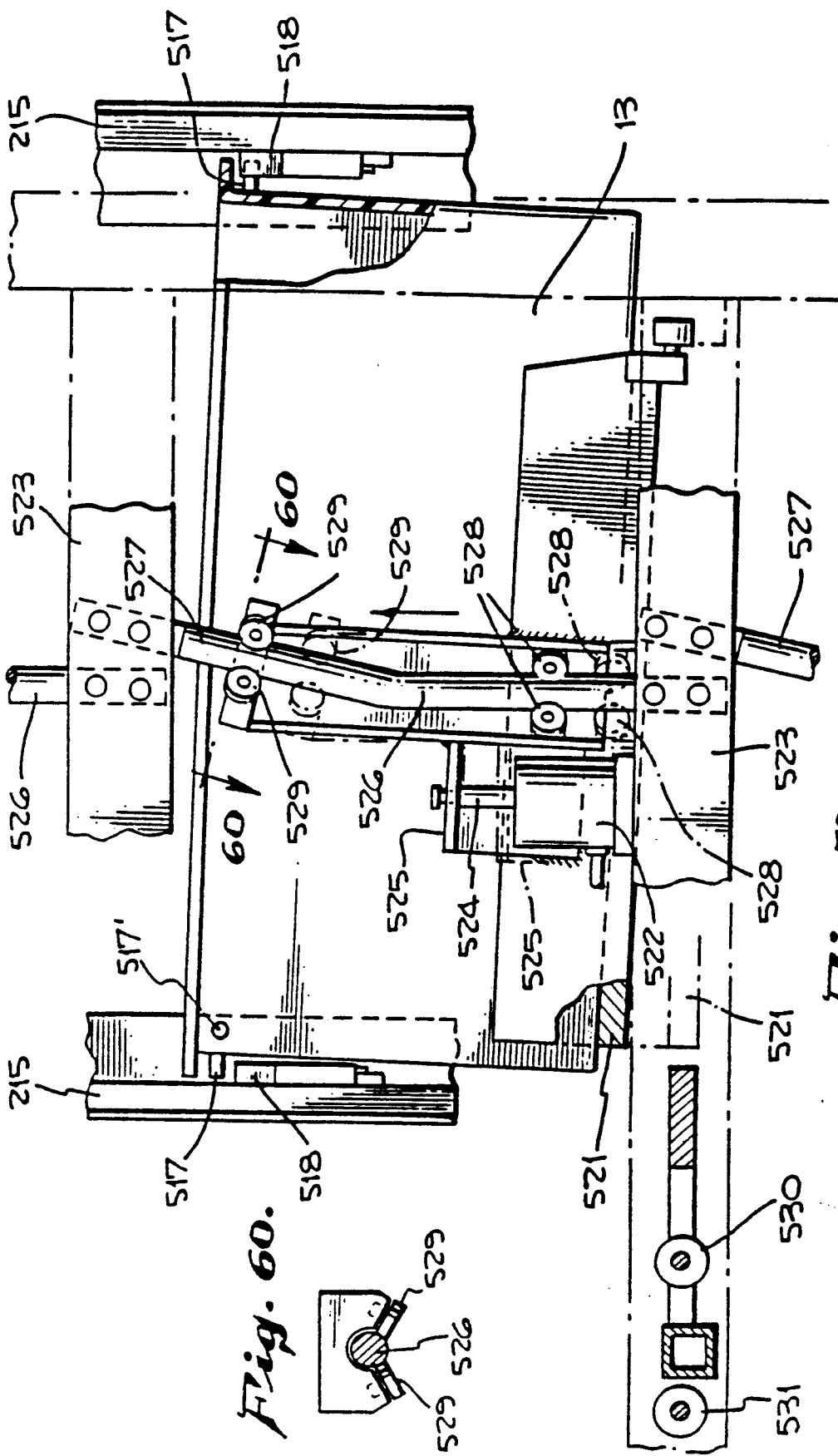

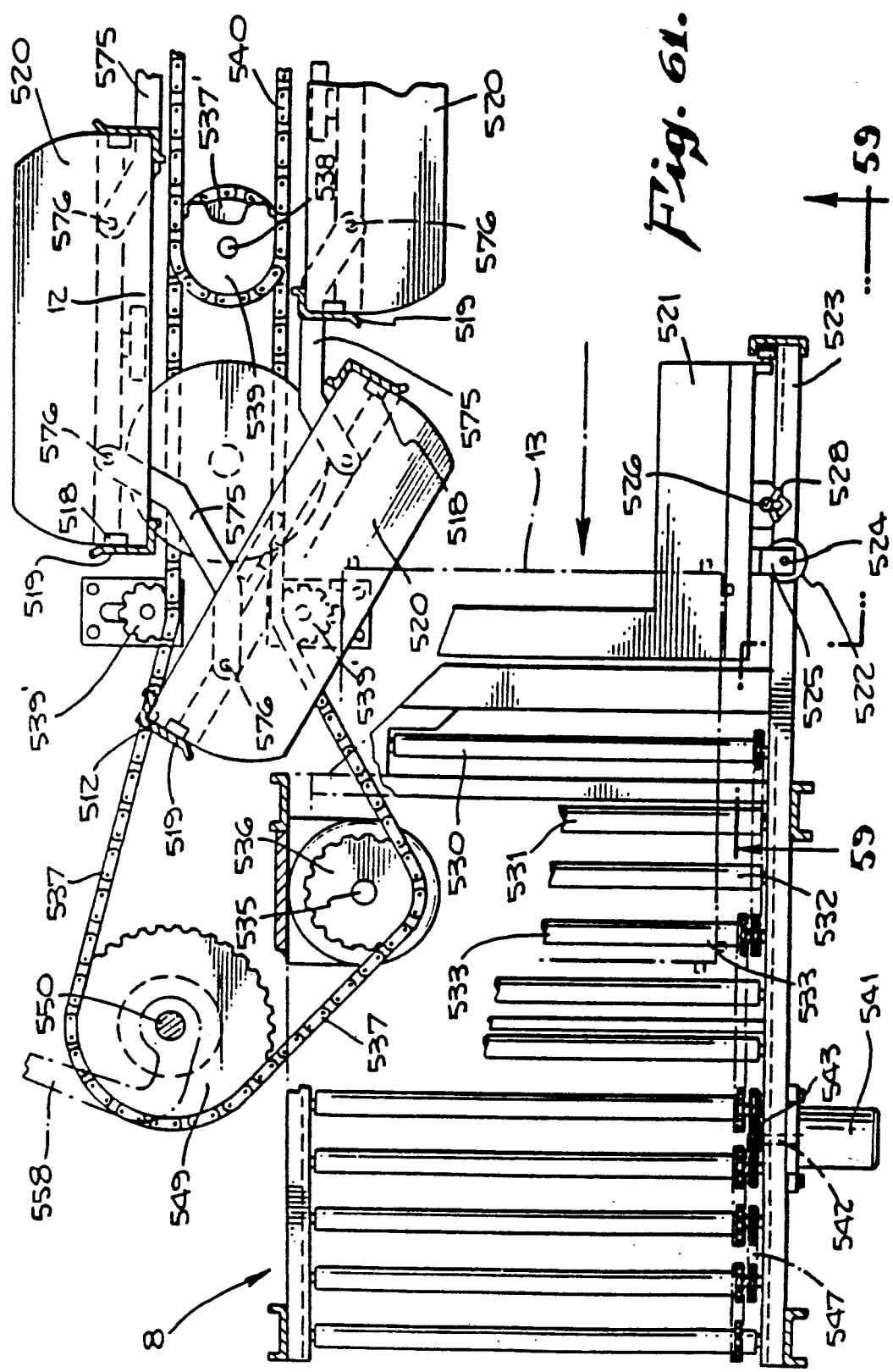

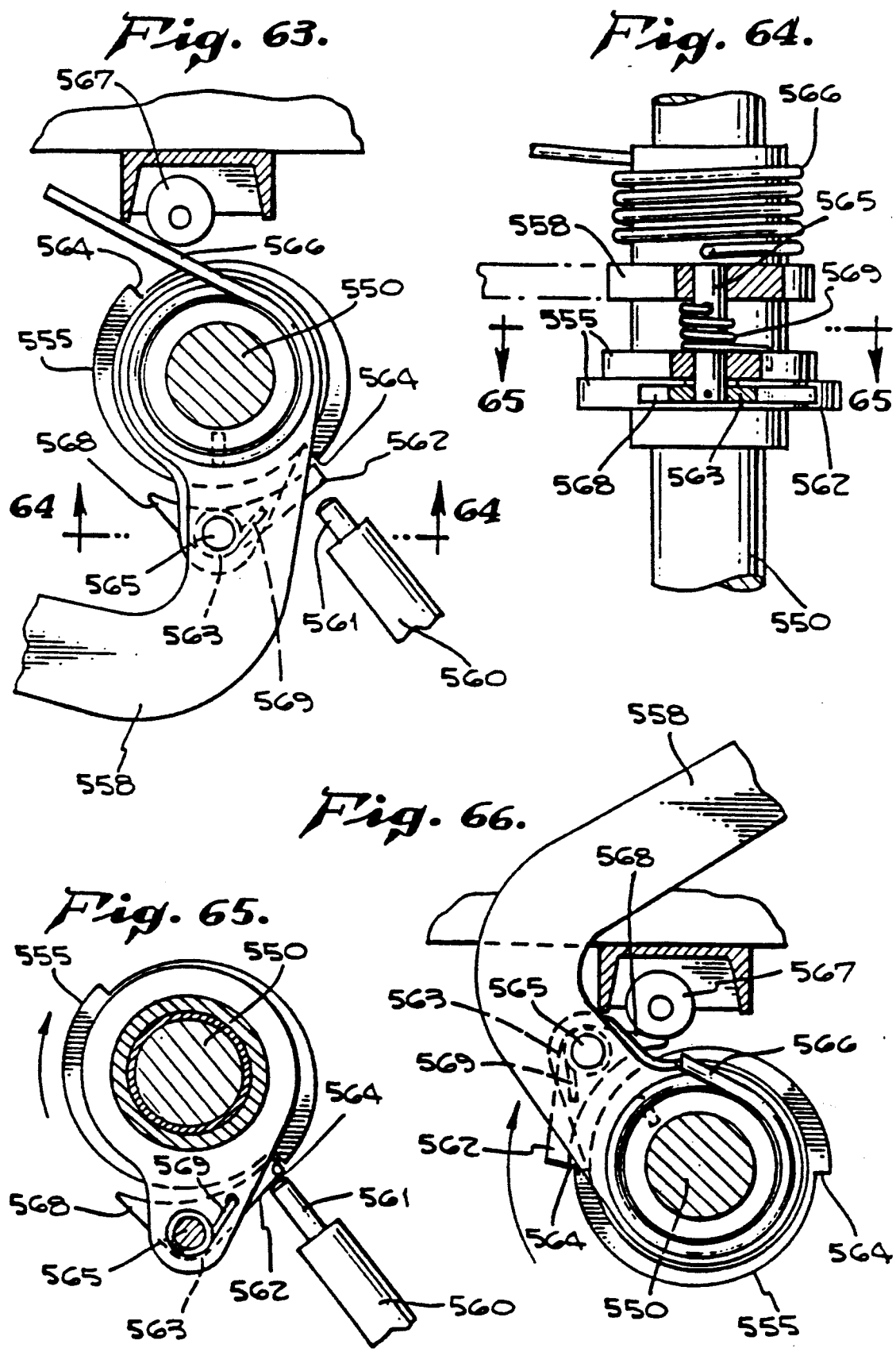

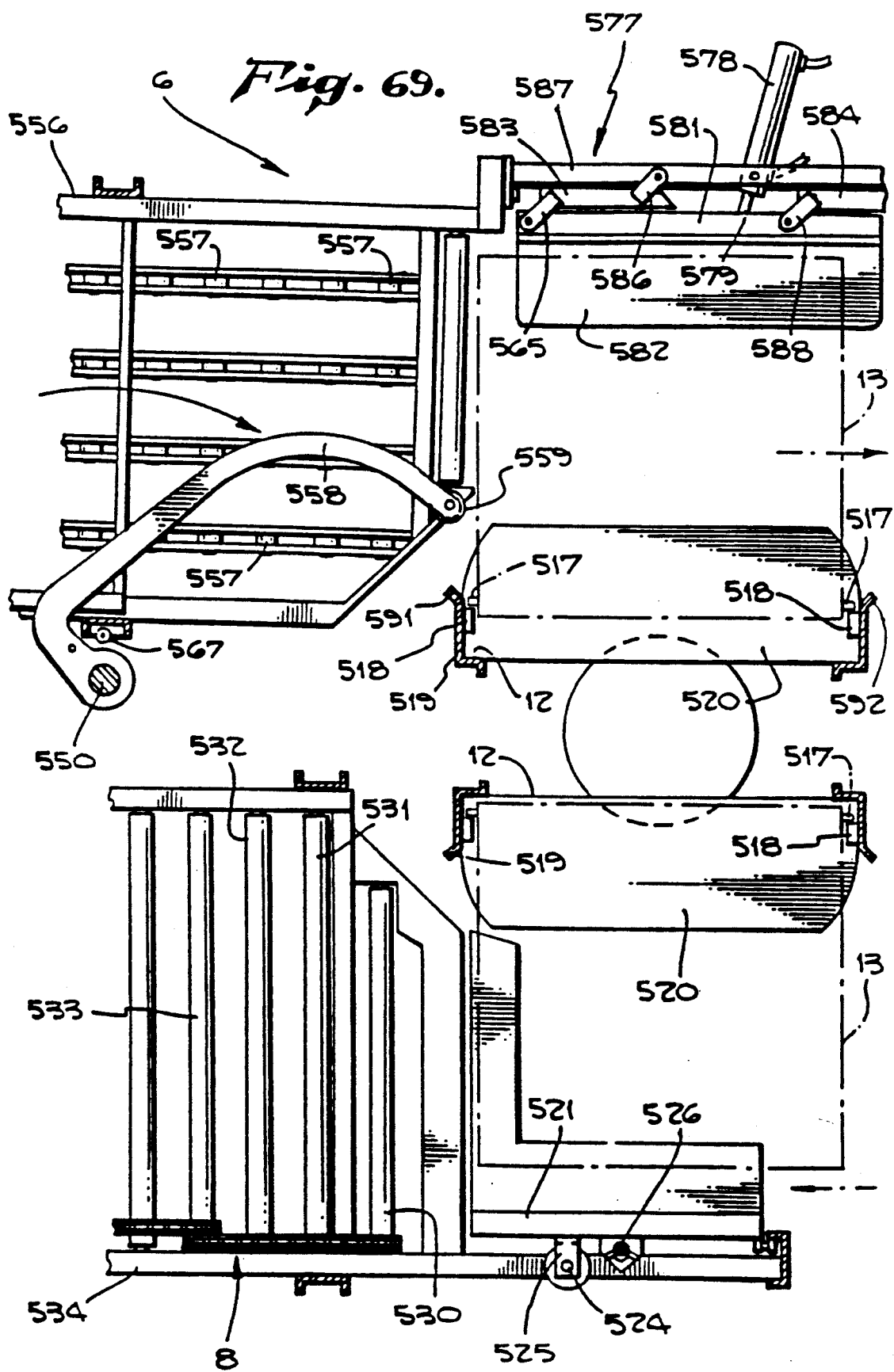

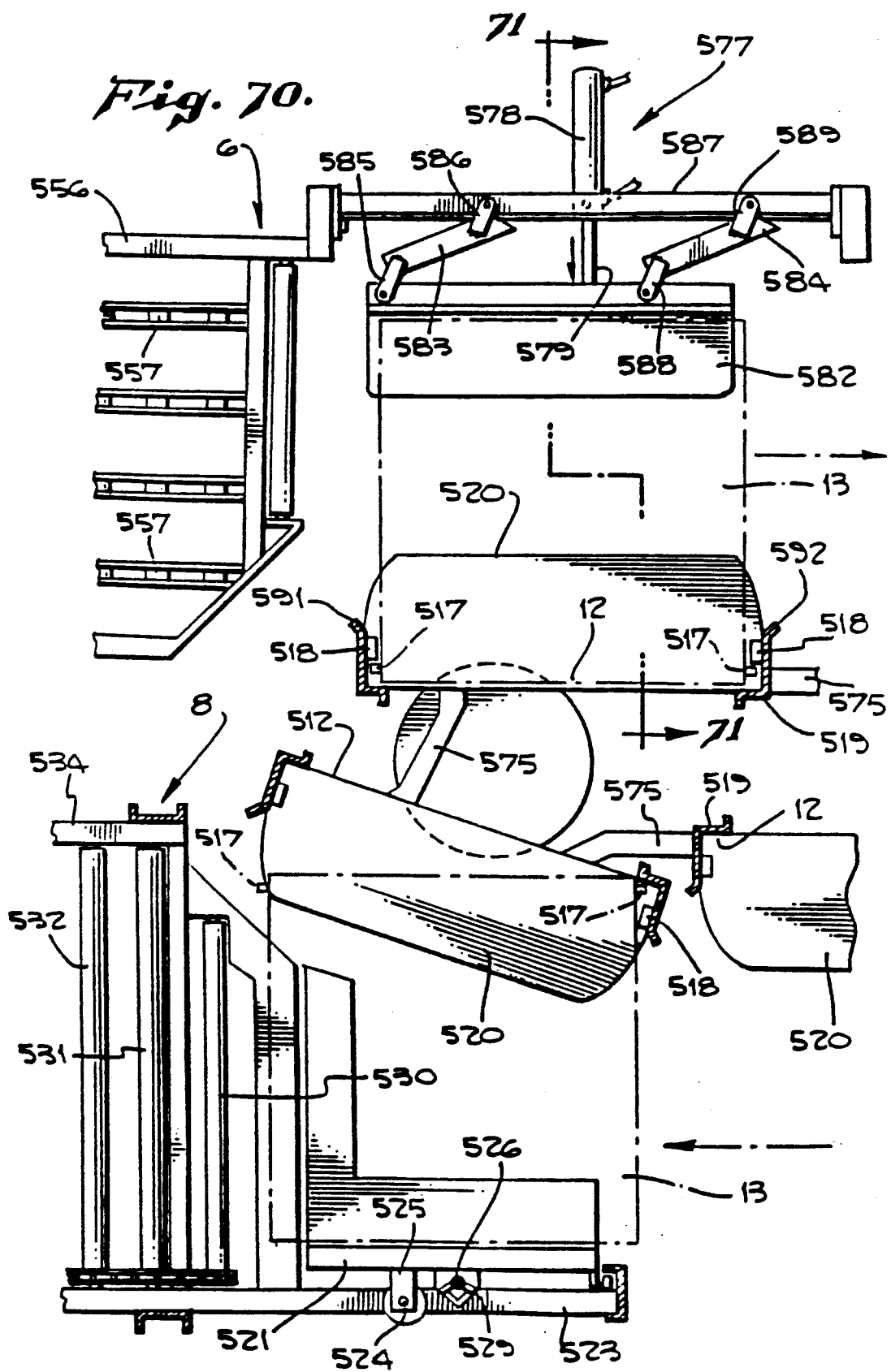

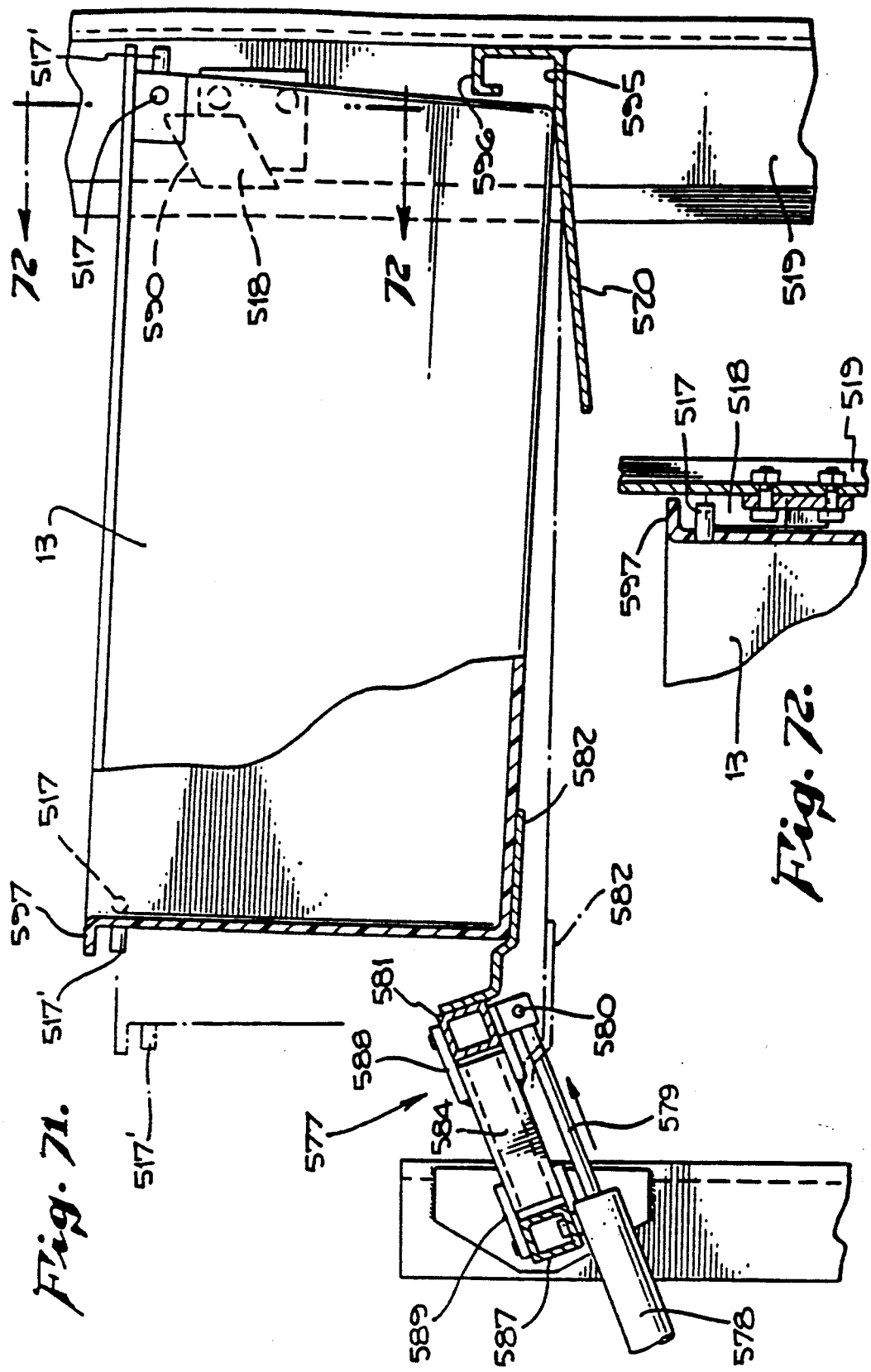

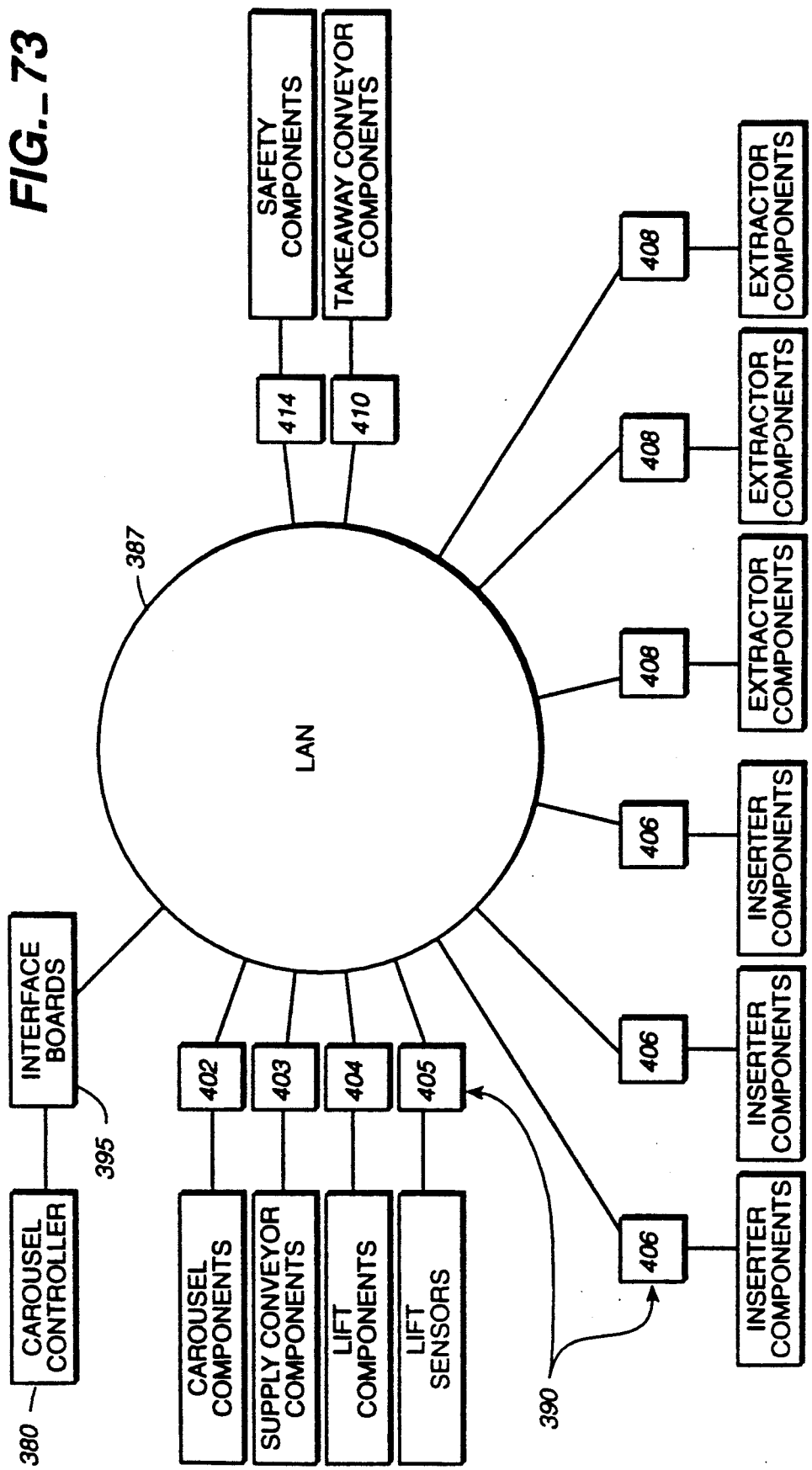

ORGANIZER SYSTEM AND METHOD FOR A ROTATABLE STORAGE STRUCTURE

This application is a division of application Ser. No. 482,317, filed Feb. 16, 1990, now U.S. Pat. No 5,090,863; which is a division of application Ser. No. 192,419, filed Apr.29, 1988, now U.S. Pat. No. 4,983,091; which is a continuation-in-part of the following applications: Ser. No. 031,989, filed Mar. 30, 1987 (now abandoned), which in turn was a continuation-in-part of application Ser. No. 732,927, filed May 13, 1985 (now abandoned); Ser. No. 824,718, filed Jan. 31,1986 (now abandoned); and Ser. No. 821,257, filed Jan. 22, 1986, now U. S. Pat. No. 4,752,175. Each of the parent applications is incorporated herein by reference. Other related applications include application Ser. No. 159,261, filed Feb. 23, 1988, now U. S. Pat. No. 4,968,207; Ser. No. 158,310, filed Feb. 22, 1988 (now abandoned); Ser. No. 800,337, filed Nov. 21, 1985 (now abandoned); and Ser. No. 815,808, filed Jan. 3, 1986 (now abandoned), which are also incorporated herein by reference.

BACKGROUND OF THE INVENTION

The present invention relates generally to automated distribution systems for storing and retrieving goods. More particularly, the invention relates to a rotatable storage carousel and supporting mechanisms for inserting and extracting containers from the carousel while it remains in continuous motion. The delivery system is designed to deliver goods at rates which exceed the demand of today's production and warehousing facilities.

Many modern production and warehousing facilities require the storage and retrieval of thousands of inventoried items. Often goods must be stored in bins or containers due to their size or delicate construction. Therefore, storage requires loading the containers and delivering them to a known location where they can later be retrieved as necessary. When an order is received, the desired items must be retrieved from their respective positions and kitted, prepared for shipping, or otherwise put to use. An efficient storage operation requires the ability to both store and retrieve a wide variety of goods and to rapidly and effectively dispose of the retrieved items. Heretofore, a wide variety of warehousing/distribution systems have been proposed to reduce the labor required in warehousing operations. However, few systems have addressed both the storage and production requirements for a global distribution solution.

Conventional storage and retrieval systems utilize large multi-level fixed storage shelves in combination with an extractor or picking mechanism that must travel to a particular shelf to pick the desired inventory item. For example, U.S. Pat. Nos. 3,402,835 and 3,402,836 show systems in which a mobile unit traverses along a series of stationary vertical racks. The mobile unit is equipped with means for loading and unloading the vertically based storage racks. Such systems have several drawbacks. Initially, they are limited to a small number of insertion or extraction transactions each time the extractor is operated due to the need to move the picking mechanism after each insertion or extraction operation. Additionally such systems traditionally have fixed locations for storing each type of goods received within the warehouse. This prohibits efficient space utilization since the fixed location occupies the same amount of space regardless of whether a particular inventoried item has two stock units or 2000. Indeed typical warehouses having such fixed space utilization tend to have only about 25% of their usable storage space filled at any given time. Therefore, such systems are extremely wasteful of valuable building space.

More recently, storage structures have been proposed that include a movable multi-tiered storage carousel having a large number of arrays of vertically spaced container racks arranged to form a continuous horizontally operating rack assembly which travels about a continuous horizontal track. Representative storage carousels are disclosed in U.S. Pat. Nos. 4,561,820, 4,422,554, and 3,780,852. However, such systems have numerous drawbacks which limit their feasibility in high volume operations. Most notably, in order to insert a container onto, or extract a container from a rack on the storage carousel, the carousel must be stopped adjacent to the insertion and extraction mechanism and the container disengaged or inserted. The time required to start and stop the carousel inherently limits the speed at which container insertion and extraction operations may occur. Additionally, the requirement of repeatedly starting and stopping a carousel which may carry on the order of 700,000 tons of material, can be extremely taxing in terms of both power requirements, component wear and drive motor life. Further, it is difficult to stop such a massive structure with enough control to precisely position the containers for either insertion or extraction. Therefore, there is a need for an improved automated storage and retrieval system having a storage carousel that may remain in continuous motion while containers are inserted into or extracted from its storage racks.

The approach disclosed herein includes an automated storage carousel that dispenses with the need for stopping and starting the rack assembly for loading and unloading containers from the storage racks.

SUMMARY OF THE INVENTION

Therefore, it is a primary objective of the present invention to provide a new and improved system for storage and retrieval of inventoried items in great quantities and varieties.

Another object of the invention is to provide improved inserter and extractor assemblies for a rotational storage carousel that facilitate loading and unloading containers from the carousel while the carousel remains in continuous motion.

Another object of the invention is to provide an organizer system capable of inserting and extracting multiple containers simultaneously to different carousel tiers.

Another object of the invention is to provide a storage system that incorporates a relatively simple hanger arrangement for holding containers stored thereon.

Another object of the invention is to provide a storage system wherein the loading and unloading operations are synchronized with movements of the carousel to prevent the destruction of containers in the event of an unexpected system shutdown or failure.

Another object of the invention is to provide a control system for automatically inserting various containers onto racks on a rotatable storage carousel and remembering the location of the stored items.

Another object of the invention is to provide a storage system capable of handling containers sized sufficiently large to receive the vast majority of inventoried parts, thus facilitating the kithing and/or consolidation of complete orders.

Another object of the invention is to provide a storage system wherein the contents of the storage carousel may be continually checked.

Another object of the invention is to provide a storage facility controller incorporating a highly distributed network of controllers that eliminate the need for priority interrupts.

To achieve the foregoing and other objects and in accordance with the purpose of the present invention a distribution system is provided that includes a storage carousel for receiving and storing containers adapted to carry material goods. The carousel includes a multiplicity of connecting rack arrays arranged in side-by-side fashion. Each of the rack arrays include a plurality of vertically spaced container racks for supporting selected containers, with the container racks from various rack arrays being arranged in a plurality of tiers. Means are also provided for forming a continuous track and rotating the rack arrays about the continuous track.

A lift including a vertically traveling endless loop having an up travel reach and a down travel reach is provided for carrying the container to the various carousel tiers. A plurality of platforms for supporting individual containers are uniformly spaced about the endless loop. Each carousel tier is provided with inserter and extractor assemblies suitable for loading and unloading containers from the various racks while the carousel remains in continuous motion.

In one of the preferred embodiments of the invention, a holding section having a plurality of vertically spaced holding shelves is provided for receiving containers from the lift, temporarily holding the received containers and transferring the received container to an associated inserter assembly. The shelves of the holding section are spaced substantially the same as the spacing between the lift platforms.

In another preferred embodiment, each container support rack includes an articulated attachment means and each of the containers include a container attachment means for releasably hooking the container onto a particular rack in a cantilevered manner.

In yet another preferred embodiment of the present invention, an automated control system is provided for a storage system that includes a storage facility controller for managing the activities of the storage system. The storage facility controller maintains a storage record that remembers the identity and storage position of each of the containers stored within its control. A plurality of storage facility controllers are provided to manage the activities of a particular storage carousel. The carousel controllers communicate with the storage facility controller over a first local area network. Each carousel controller in turn directs a plurality of logic boards that direct specific mechanical and electrical components of the carousel. Each carousel controller communicates with its logic boards over a second local area network. In a preferred aspect of the control system, a plurality of interface board are provided that act as temporary information storage buffers between each carousel controller and its associated logic boards.

BRIEF DESCRIPTION OF THE DRAWINGS

FIG. 6 is an elevational view on the line 6—6 of FIG. 5.

FIG. 7a is an enlarged elevational view of the lower portion of FIG. 5 at a mid-position of operation.

FIG. 7b is an enlarged elevational view of the upper portion of FIG. 5 at a mid-position of operation.

FIG. 8a is an enlarged elevational view partially broken away on the line 8a—8a of FIG. 5.

FIG. 8b is an enlarged elevational view partially broken away on the line 8b—8b of FIG. 5.

FIG. 9 is a top plan view on the line 9—9 of FIG. 7b.

FIG. 10 is a cross-sectional view on the line 10—10 of FIG. 7b.

FIG. 13 is a cross-sectional view on the line 13—13 of FIG. 8a.

FIG. 15 is a top plan view of one of the platforms taken, for example, on the line 15—15 of FIG. 4.

FIG. 16 is a side elevational view partially broken away taken on the line 16—16 of FIG. 15.

FIG. 17 is an inside end view on the line 17—17 of FIG. 16.

FIG. 18 is a fragmentary side elevational view of portions of the vertical transfer unit of FIG. 4, taken on the line 18—18 of FIG. 2.

FIG. 19 is a plan view on the line 19—19 of FIG. 18.

FIG. 20 is a fragmentary cross-sectional view on the line 20—20 of FIG. 19 with the barrier lowered.

FIG. 21 is a view similar to FIG. 20 with the barrier raised.

FIG. 22 is a fragmentary side elevational view of a portion of the insert holding section on the line 22—22 of FIG. 2.

FIG. 23 is a plan view on the line 23—23 of FIG. 22.

FIG. 24 is a fragmentary cross-sectional view on the line 24—24 of FIG. 23.

FIG. 25 is a plan view of the approach mechanism at the insert end of one of the levels of the multi-level horizontally rotating storage system in the area of the bracket 25 of FIG. 2.

FIG. 26 is a fragmentary elevational view of a lift cylinder on the line 26—26 of FIG. 25.

FIG. 27 is a fragmentary elevational view of another lift cylinder on the line 27—27 of FIG. 25.

FIG. 32 is a side elevational view of the guide at the outlet end of the approach mechanism on the line 32—32 of FIG. 25.

FIG. 33 is a plan view on the line 33—33 of FIG. 32.

FIG. 34 is a cross-sectional view on the line 34—34 of FIG. 32.

FIG. 35 is a cross-sectional view on the line 35—35 of FIG. 32.

FIG. 36 is an elevational cross-sectional view of a portion of the approach mechanism on the line 36—36 of FIG. 2.

FIG. 37 is an elevational view on the line 37—37 of FIG. 36.

FIG. 38 is an enlarged plan view of the removal mechanism at the extract end of one of the levels of the multi-level horizontally rotating storage system of FIG. 2.

FIG. 39 is a cross-sectional view at the entry end of the removal mechanism on the line 39—39 of FIG. 2.

FIG. 43 is a fragmentary elevational view of the lift cam generally on the line 43—43 of FIG. 2.

FIG. 44 is an elevational view substantially broken away on the line 44—44 of FIG. 43.

FIG. 45 is a fragmentary elevational view of the lift cam of FIG. 43 with the parts in a different position.

FIG. 46 is an elevational view of the latch release and kick-out mechanism located above the lift can of FIG. 43.

FIG. 47 is an elevational view on the line 47—47 of FIG. 46.

FIG. 48 is a plan view on the line 48—48 of FIG. 47.

FIG. 49 is an enlarged plan view similar to FIG. 48.

FIG. 50 is a fragmentary plan view of the upper end of FIG. 49 with portions removed for clarity.

FIG. 51 is a cross-sectional view on the line 51—51 of FIG. 50.

FIG. 52 is a cross-sectional view on the line 52—52 of FIG. 49 showing a latched position.

FIG. 53 is a cross-sectional view on the line 53—53 of FIG. 49 showing a retracted position of parts.

FIG. 54 is a view similar to FIG. 52 showing an unlatched position.

FIG. 55 is a view similar to FIG. 53 showing a kick-out position of parts.

FIG. 56 is a perspective view of a suitable container.

FIG. 57 is a plan view of the container hooking arrangement.

FIG. 58 is a side view of the container hooking arrangement shown in FIG. 57.

FIG. 59 is a fragmentary elevational view of an alternative embodiment of the invention, partially in section.

FIG. 60 is a fragmentary cross-sectional view of the line 60—60 of FIG. 59.

FIG. 61 is a plan view of the alternative extractor assembly and applicable portion of the motorized carousel.

FIG. 63 is a cross-sectional view of a clutch on the line 63—63 of FIG. 68.

FIG. 64 is a side elevational view of the clutch device.

FIG. 65 is a cross-sectional view on the line 65—65 of FIG. 64.

FIG. 66 is a view similar to FIG. 63 showing the clutch device in a different attitude of operation.

FIG. 69 is a fragmentary plan view of portions of the inserter and extractor assemblies with the inserter assembly in still a further advanced stage of operation.

FIG. 70 is a fragmentary plan view similar to FIG. 69, but showing a still further advance in the operation.

FIG. 71 is a fragmentary cross-sectional view on the line 71—71 of FIG. 70.

FIG. 72 is a fragmentary vertical sectional view on the line 72—72 of FIG. 71.

FIG. 73 is a block diagram of a carousel controller.

DETAILED DESCRIPTION OF THE DRAWINGS

The storage and retrieval system of the present invention includes a plurality of components adapted to integrate the loading and unloading of containers onto rotary storage carousels that remain in continuous motion. The storage and retrieval system includes one or more multi-level storage carousels 2, each having an associated lift 4, together with a plurality of inserter assemblies 6 and extractor assemblies 8.

Figure 1:
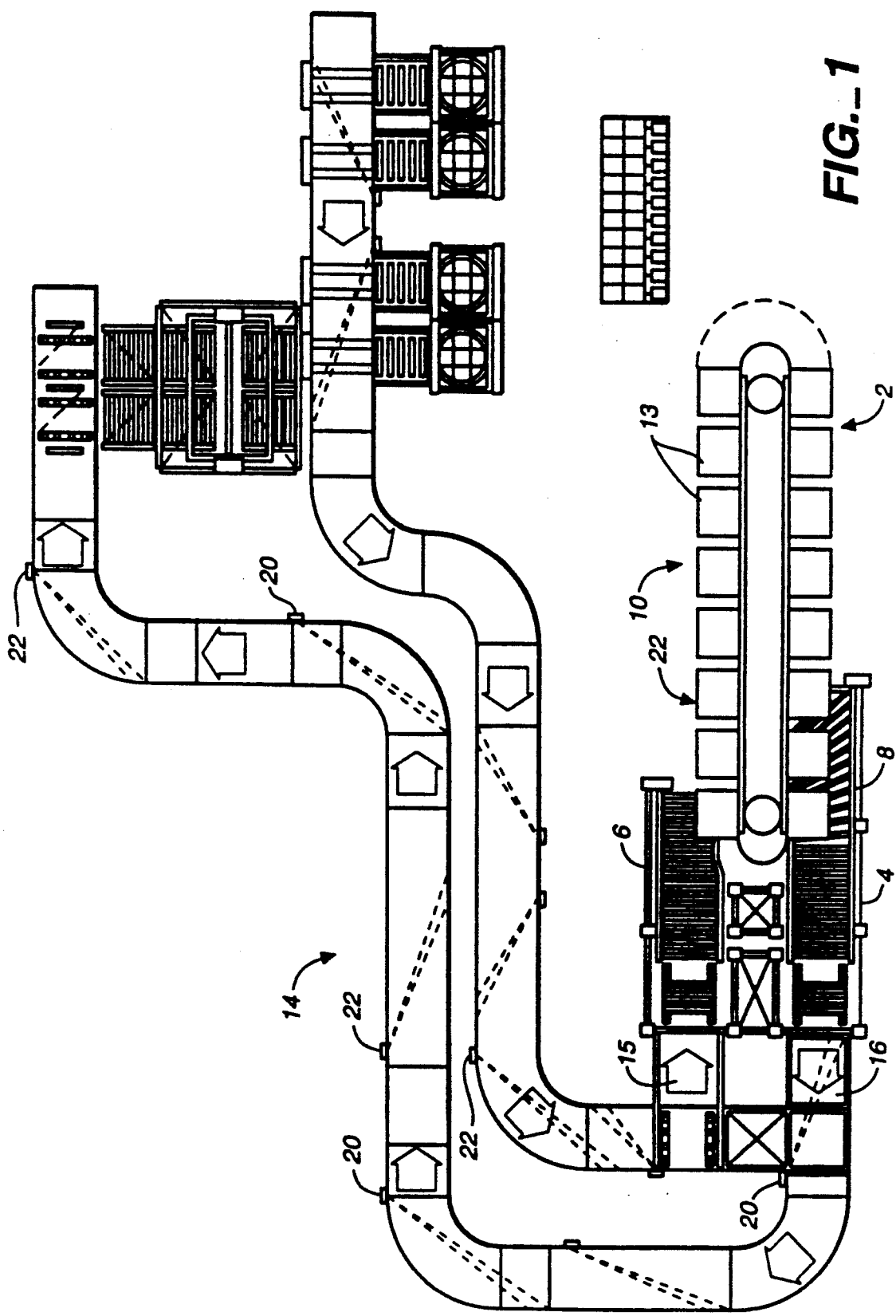
FIG. 1 is a diagrammatic plan view of a materials distribution system that incorporates a multi-level storage carousel in accordance with the present invention.

In an embodiment of the invention chosen for the purpose of illustration, there is shown in FIG. 1, a rotational storage carousel 2 forming a horizontally traveling endless conveyor that carries a plurality of rack arrays 10 about an oval track. Each rack array 10, includes a plurality of vertically spaced container storage racks 12. The rack arrays 10 are arranged in side-by-side relationship so that their respective racks are arranged in tiers, one above another as suggested in FIG. 1. The rack arrays 10 are parallel to each other and the racks in the various tiers are aligned perpendicularly with respect to the ground.

A suitable frame structure is provided to support the multiple tiers of storage racks. Each storage carousel includes an upper track and a matching lower track. The tracks for each carousel are identical and continuous, oval-like in shape with rounded ends and parallel sides. The rack arrays are moved along the racks by a plurality of electrically or hydraulically operated motor (not shown). For a more detailed understanding of how a suitable rotating storage carousel may be constructed, reference is made to an acceptable structure as disclosed in U.S. Pat. No. 4,422,554. Thus, by way of example, each rack array 10 may include a pair of spaced columns attached to the frame and onto which a plurality of latching mechanisms are placed to form portions of the vertically spaced racks 12. In a carousel eight tiers high with the rack arrays on 40 inch centers and rated to hold 500 pounds per rack three 5 hp motors spaced along the carousel are suitable to drive the carousel at speeds up to 50 feet per minute. In a preferred embodiment an idler drive is also provided to facilitate attaching another motor to drive the carousel should the needs of the system call for a backup motor.

Figure 2:
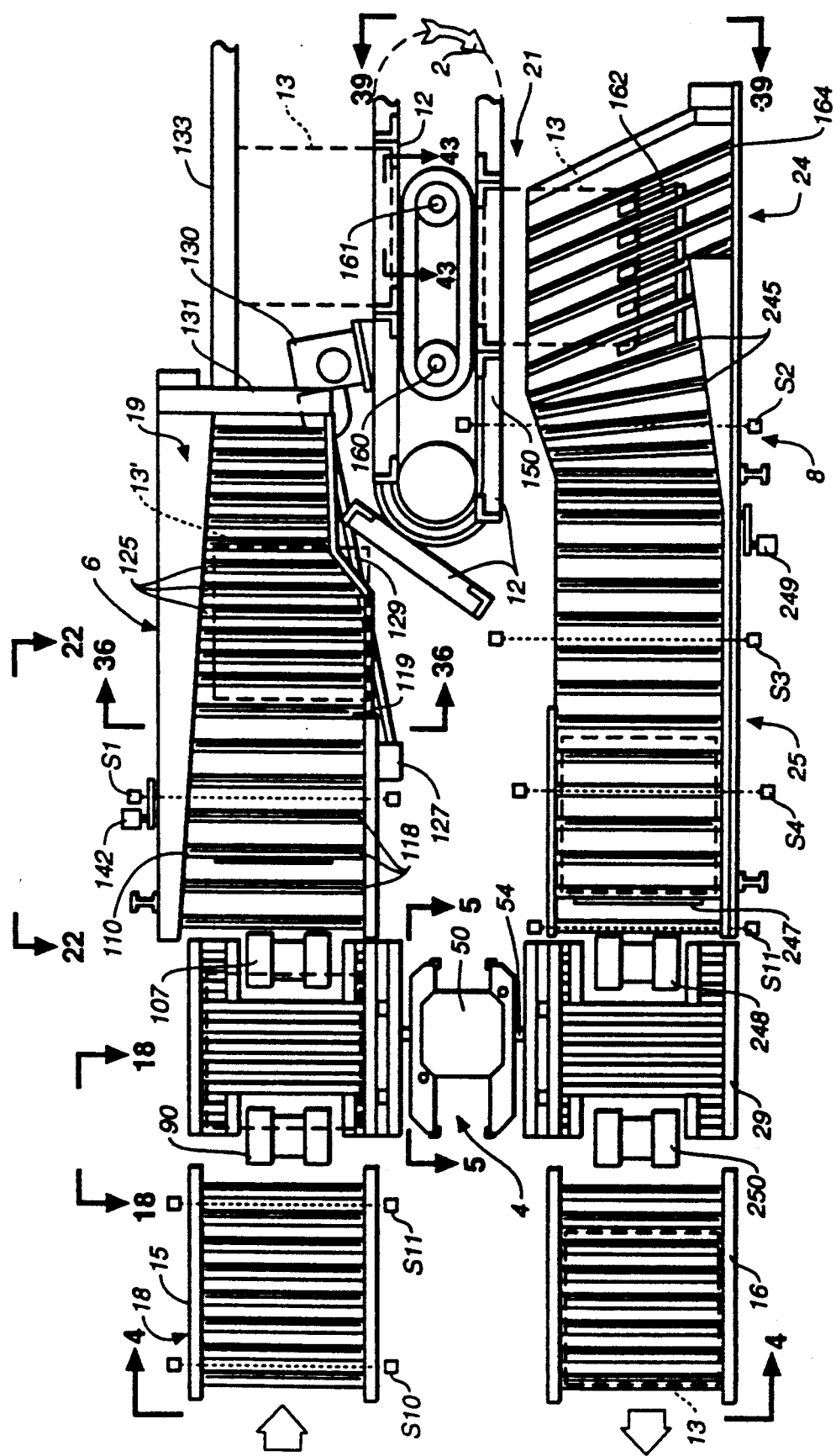
FIG. 2 is a diagrammatic plan view of the insert/extract organizer interposed between a corresponding and of a multi-level horizontally rotating storage system and a related conveyor array.

At one end of the storage carousel 2, a lift 4 is provided for carrying containers 13 to and from each of the rack tiers. Each tier has an associated inserter assembly 6 and an extractor assembly 8. As seen in FIG. 2, the insertion and extraction may all take place on one end of the storage carousel. However, it should be appreciated that if demand is expected to be particularly heavy, higher picking volumes can be obtained by adding additional inserter and/or extractor assemblies to the opposite end of the carousel.

A conveyor network 14 is provided to carry containers 13 between the storage structure and various work stations (not shown) wherein the containers may be accessed by an operator. Specifically, containers 13 are transported to the storage structure via supply conveyor 15, while takeaway conveyor 16 carrier extracted containers away from the storage structure to the conveyor network.

General Operation of the System

Assuming, by way of explanation, that operation of the system commences with the insertion of containers 13 into the system, containers 13 are delivered to the storage carousel 2 via supply conveyor 15. As the containers arrive, they are first passed through one or more holding stations 18 before being delivered to a platform 29 on lift 4. The holding stations act essentially as a queue for temporarily holding containers until an empty lift platform is positioned adjacent the final holding station and ready to receive the container located thereon. Additional holding stations would in effect serve as an extension of the "queue." Holding stations are desirable since containers are likely to be delivered to the storage carousel at random time intervals for insertion.

Once a container has been deposited onto a lift platform 29, it is elevated to inserter assembly 6 corresponding to the carousel tier at which the container is to be placed. The container is then off-loaded onto a shelf portion of the inserter assembly 6. The actual construction of the lift assembly may be widely varied, with suitable structures being disclosed below. The container is held within the inserter assembly until an empty rack passes by. When an empty rack passes, the container is attached to the rack without requiring the carousel to stop or even slow down.

Each time a container is inserted, the rack position (by tier and rack array) at which the container is stored is recorded so that the container can be accessed at any desirable time in the future. A computerized storage facility controller maintains a storage record indicating the position at which each particular container is placed on the storage carousel. When a request is made for goods stored within a particular container, the controller determines the container holding the desired goods by checking an inventory record. Once the identity of the desired container is determined, the storage record is searched to determine the specific rack position at which the container is held. When a request is placed for a particular container, the extractor assembly waits until the rack 12 that holds the desired container passes by. As the rack passes by, the container is detached from the rack and pulled into the extractor assembly 8. The container is maintained within the holding section 25 of extractor assembly 8 until a suitable opening occurs on a lift platform 29 (which will be moving along a down traveled reach), and the container can be moved onto the lift 4. The lift carries the containers to a takeaway conveyor 16 which delivers the containers to the conveyor network 14.

Presence scanners 20 (FIG. 1) may be positioned throughout the system to detect the presence or absence of containers at each critical position. For example, scanners 20 are provided to monitor each of the holding stations, and at each tier level of the lift on both the up travel and down travel reaches. The presence scanners would thus provide the system controller with important feedback as to the position of the containers it controls. It will be appreciated, for example, that if a particular lift platform 29, holding station 18, inserter assembly 6 or extractor assembly 8 is full, then the system must be disabled to the extent that no other containers will be directed toward that particular unit until it has sufficient room. Thus, the presence scanners 20 are intended to prevent the system from overrunning itself.

One or more identification scanners 22 (see FIG. 1) may also be disposed throughout the system to read the identifying indicia 23 (see FIG. 56) on the sides of the containers 13. Specifically, it is desirable to identify the containers as they approach the storage carousel, since they are likely to be delivered on a random basis. Further, a plurality of identification scanners 22 are preferably positioned to view containers carried by the storage carousel 2 just after each inserter assembly to verify the identity of the specific containers carried by the carousel. Such scanners also are effective to rapidly reidentify the containers stored on the carousel in the event that the system controller loses its data indicative of the carousel's contents.

It will be appreciated that a wide variety of automated controllers could be developed to drive the disclosed warehousing structure. A good control system must lend itself to a modular construction so that if and when the needs of the distribution system change (the desired volume often tends to rise), additional storage carousels or insertion and extraction mechanisms may be added to the system with little or no change to the system software. Further, it is contemplated that the storage structure of the present invention may be incorporated into a fully automated distribution system. An exemplary distribution system suitable for incorporating the storage structure of the present invention is disclosed in co-pending application Ser. No. 158,310, filed Feb. 22, 1988, now abandoned. Therefore, the controller is adapted to lend itself to modular integration with other components of an automated distribution system.

Activities relating to the storage structure are controlled by a storage facility controller 370 (FIG. 3) that is responsible for remembering which of the containers are within its possession, the storage carousel upon which each of the containers 13 are hung and the actual position, (by tier and rack number) of which the container is stored. Additionally, the storage facility controller is responsible for coordinating communications with external systems as well as overseeing the insertion and extraction of containers from the various carousels.

Figure 3:
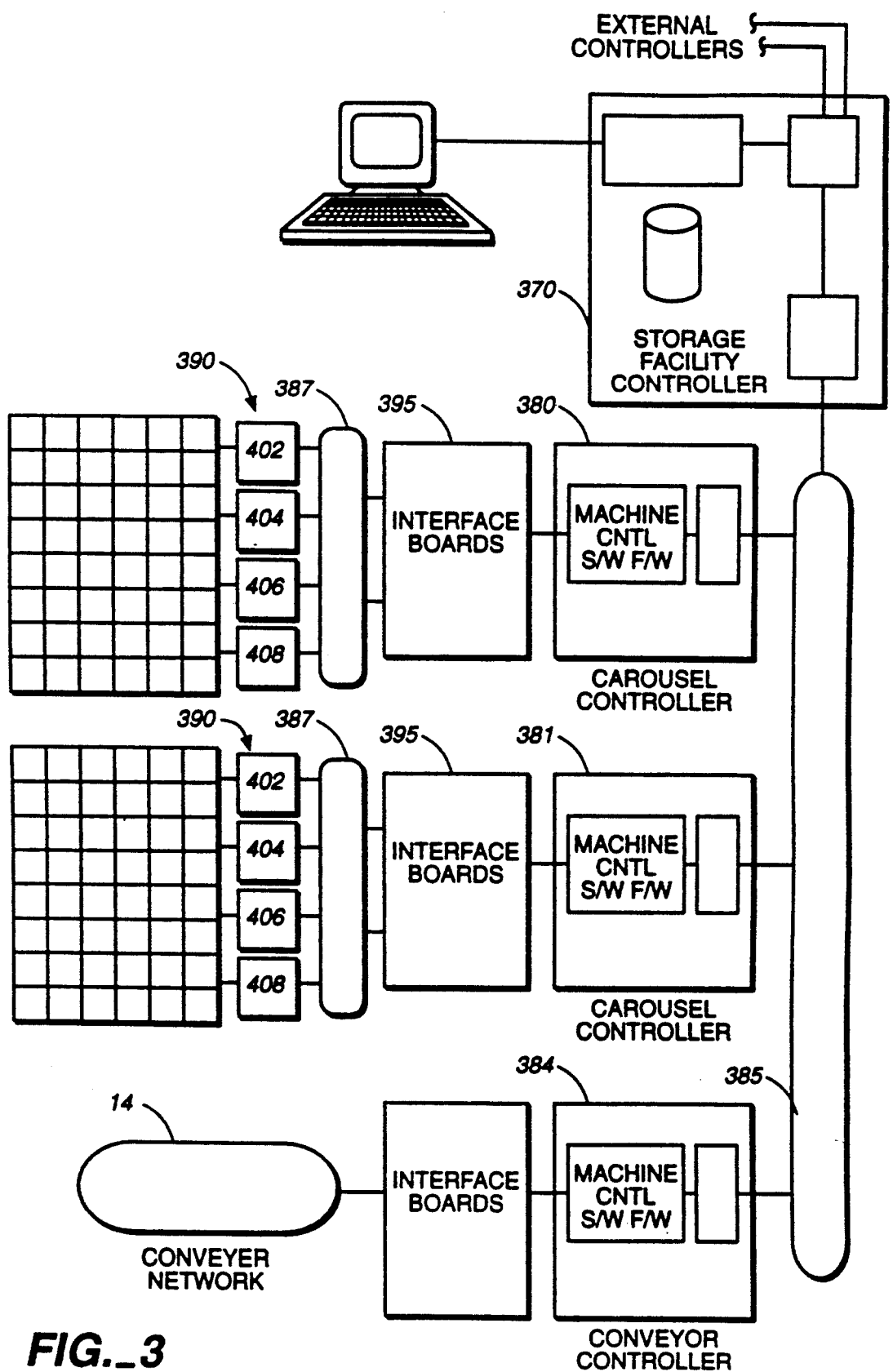
FIG. 3 is a block diagram of a representative storage facility control system.
Figure 4:
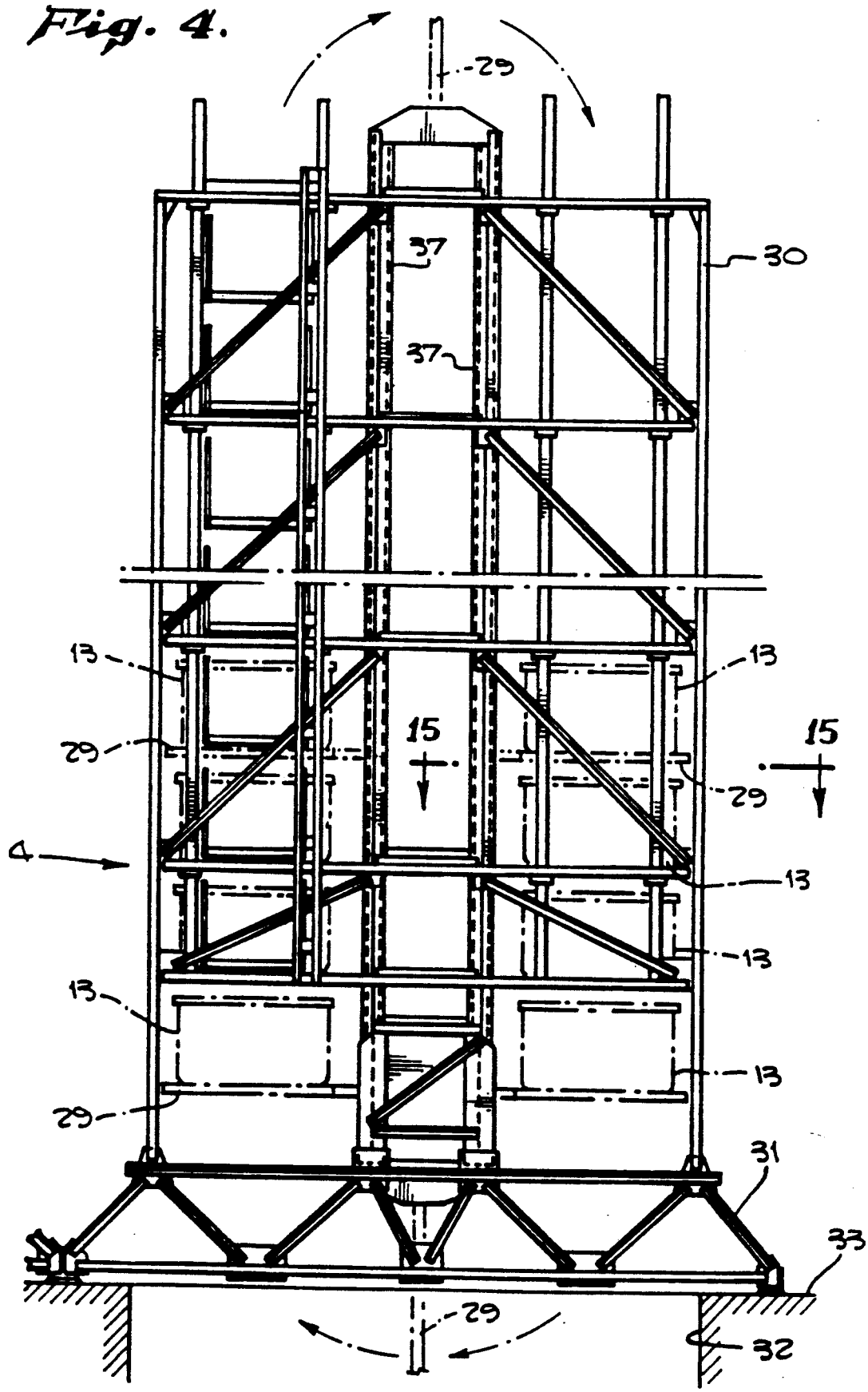
FIG. 4 is an end elevational view on the line 4—4 of FIG. 2.

A representative embodiment of the storage carousel control system is shown in FIG. 3. As seen therein, the storage facility controller manages a plurality of carousel controllers 380, 381, each of which is associated with a particular storage carousel 2, etc. The storage facility controller 370 may be either an integrated computer that is directly accessible by the user to input orders and the like, or it may communicate with an external master controller and/or other components as described in the previously mentioned co-pending Application. Typically, container requests would be generated either internally or externally in the form of an extended list of desired containers, together with an indication of the number of containers to be provided at any given time. It will be appreciated that the acceptable container list can be extended and considerably longer than the actual number of containers desired. Of course in an alternative embodiment, individual requests for particular containers could be made.

When an extraction request is made, the storage facility controller 370 surveys the storage records to determine where the requested containers are positioned within the various storage carousels 2. Then, knowing the positions of the requested containers, the pending extraction requirements and the openings on lift 4, the storage facility controller decides which of the listed containers is easiest to access and should be provided. The storage facility controller then sends an extraction command to the carousel controller associated with the storage carousel that holds the desired container. The message indicates to the carousel controller only that the container in a particular storage rack should be removed. The carousel controller 380 issues appropriate signals to cause an extraction of the desired container. It then reports to the storage facility controller 370 whether or not the extraction was successful.

To ensure that the storage facility controller 370 has the latest information about the contents of the storage carousels 2, the plurality of identification scanners 22 are provided as previously described to read the identifying indicia 23 attached to the sides of containers 13. The identification scanners are preferably disposed just after the inserter assemblies to verify insertion and extraction events. Each time a rack array 10 passes by the identification scanners 22, the identity of the containers is reported to the carousel controller 380, which in turn reports both the container numbers and the storage rack positions to the storage facility controller 370.

The carousel controllers 380, 381 each control the detailed operations of their associated storage carousel 2, along with its associated inserter assemblies 6, extractor assemblies 8, and lift 4.

The containers 13 are preferably open boxes that are sized appropriately to receive stored goods. A representative container 13 is shown in FIG. 56. In the embodiment described, the containers 13 are adapted to be hung on carousel storage racks 12. The containers are preferably substantially square so that they may be hung on the racks in any orientation. They are sized to suit the needs of the particular storage application. The containers must be large enough to hold reasonable quantities of the inventoried goods, yet they must be small enough so that an operator can readily pick the goods therefrom. By way of example, 36×36×21" containers are suitable for most consumer product applications. In applications where extremely small parts or small numbers of each item are inventoried, smaller containers on the order of 24×24×12" would be appropriate.

The containers 13 may be formed from a molded fiberglass reinforced resin material. As seen in FIG. 56, a suitable container 13 includes an upper rim 630 having a pair of shoulders 632 formed at each of its upper corners. The shoulders 632 are formed by a gradual depression or notch 155 in the upper rim 630. The shoulder arrangement lends itself to what may be described as a cantilevered support by the racks of the storage carousel as described below.

Each container has an identifying indicia 23 that individually identifies the particular container. By way of example, the containers may be numbered sequentially with the numbers being applied in bar coded form to each exterior corner of the container. Bar code labels may be readily printed and adhered to the four corners of the container. It is desirable to label each corner so that a single scanner can identify the container regardless of its orientation as it passes by the scanner. With larger containers it also may be desirable to control the orientation of the container when it is presented to an operator. In such systems, the bar code labels would further identify each particular corner so as to allow the work system controller to rotate the container in a manner such that the material to be removed from or inserted into the container is always facing the operator.

In most warehousing operations, the sizes of stored goods will vary widely. Thus, for compatibility relatively large containers are used so that only one or two container sizes need be handled by the warehousing system. To minimize the empty shelf space, many of the containers would be subdivided into multiple compartments 627 by placing wall inserts 628 into the containers. Generally, there would be containers having a wide range of compartment sizes within the warehousing system, with the actual number of containers having a given compartment size being entirely dependent on the nature of the goods being stored. To maximize flexibility, wall inserts 628 may be removable so that the number of compartments within any container may be readily altered. To facilitate automatic control, each compartment 627 has a specific designation.

Vertically Traveling Lift Assembly

The lift 4 is adapted to deliver containers from the supply conveyor 15 to the inserters 6 and to carry extracted containers from the extractors 8 to the takeaway conveyor 16 as can be seen with reference to FIG. 1. Particulars of a preferred embodiment of the lift chosen for the purpose of illustration are shown in FIGS. 4–17. As shown therein, the lift is contained by a frame 30 that rides on a base 31. The frame stands over pit 32 below the supporting surface 33 for the base 31. A plurality of platforms 29 are arranged about a compression chain 34 (see FIGS. 16–17) to travel vertically in an endless loop. Compression chain 34 is comprised of a plurality of links in the form of an endless loop separated by pivot structures 35 of substantially conventional design. The links are joined by spherical bearings formed of hardened steel to limit wear. The inside end of each platform 29 is anchored by means of a beam 38 to a midportion of an associated link 34 in a cantilevered fashion. The platforms are evenly spaced about the chain at intervals equal to the distance between tiers on the storage carousel. With such a construction, the lift may be stopped with each of the platforms 29 on an up travel reach positioned to deliver a container to an inserter, while platforms on the down travel reach are each positioned to receive containers from the extractor. As described below, the drive system functions like a sinusoidal drive to provide accurate positioning of the platforms without any possibility of either over or under shooting of the platforms.

As can best be seen by reference to FIGS. 15 and 16, the pivot structures 35 travel in guideways 36 carried by columns 37 of the frame 30. It is significant to note that the containers 13 are adapted to travel on the platforms 29 only through the respective up travel and down travel reaches, but are not carried over from one reach to the other at either the top or the bottom of the lift. Clearance for the platforms 29 as they pass about the bottom pivot structure 35 is provided by the pit 32. It will be appreciated, however, that the clearance could be provided in many other ways as well. For example, the base 31 could be made of sufficient height to provide the necessary clearance.

Referring specifically to FIG. 15, in the described embodiment, the surface of platform 29 is provided by plurality of elongate low friction rollers 39. On the side of the platform facing towards the storage carousel, (the left side of FIG. 15) there are two sets of short rollers, namely, the rollers 40 and 41, spaced apart to provide a relatively wide opening 42. On the opposite side of the elongated rollers, another pair of short rollers 43 and 44 are spaced apart as shown to provide a relatively narrow opening 45. Together, the rollers provide a low friction supporting surface for the containers 13. Appropriate connecting beams 46 and 47 interconnect an exterior beam 48 with the interior beam 38 to support the rollers.

For operating the lift 4 a drive unit 50 is provided in a position located intermediate of the up travel and down travel reaches. The drive unit 50 is activated by a motor 51, the general location of which is shown in FIG. 2 with more pertinent details in FIGS. 5 and 6. The drive unit 50 features a drive disc 52 adjacent the up travel side and drive disc 53 adjacent the down travel side, both discs being mounted upon and driven by a drive shaft 54. Power reaches the drive unit 50 by way of a drive shaft 55 from the motor 51. See FIGS. 5 and 8a.

Adjacent the rim of the drive disc 52 (see FIGS. 5 and 7a), a crank arm 56 is attached by means of a pivot pin 57. At the opposite end the crank arm 56 is attached to a drive block 58 by means of a pivot pin 59. See FIGS. 5 and 7b.

When the platforms 29 on the up travel reach are to be moved upwardly, they are so moved in a step-by-step progression, one step of the travel distance being the vertical distance between two adjacent platforms. Movement is accomplished by a 180 degree rotation of the drive disc 52 on the corresponding side.

In order to interconnect the drive block 58 with the up travel reach, a driver 60 is reciprocatably mounted in the drive block. In the extended position shown in FIG. 8b, the driver 60 is adapted to engage the underside of the interior beam 38 of the platform, as shown in FIG. 6. Movement of the driver 60 between the extended and retracted positions is accomplished by cam action.

Extending part way around the circumference of the drive disc 52 is a cam track 61, the cam track being to a degree oblique with respect to its path of travel around the drive disc. A cam follower 62 equipped with rollers 63 and 64 follows the path of the cam track as the drive disc 52 rotates. Motion thus given to the cam follower is picked up by a rod 65, the rod 65 being journaled in bearings 66, 66' so that the rod can rotate about its long axis. See FIGS. 5, 7a and 8a.

The upper end of rod 65 is provided with a laterally extending arm 67, the free end of which is lodged in a notch 68 in the inner end of the driver 60. See FIG. 12. In this arrangement, rotation of the rod 65 in a clockwise direction, as viewed in FIG. 12, causes the driver 60 to be withdrawn, whereas counterclockwise rotation causes the driver to be extended to the position of FIG. 6 and 8b where it underlies one of the platforms 29. The cam track 61 is so configured that when the drive disc 52 has been rotated to the position where the pivot pin 57 and corresponding lower end of the crank arm 56 is in its lowermost position, namely, 180 degrees from the position shown in FIG. 5, the cam follower 62 will have been moved to the position wherein the driver 60 will have been moved outwardly to a location beneath the corresponding platform 29. Throughout the succeeding 180 degree rotation of the drive disc 52, the driver will remain extended as the platform is moved upwardly one step. Once this has been accomplished and the drive disc 52 continues in its succeeding 180 degree rotation clockwise, the configuration of the cam track is such that the driver is then withdrawn.

So that the platform will remain in fixed position at rest during down travel of the crank arm 56 and its drive block 58, there is provision for a stop 70. The stop 70 is adapted to horizontally reciprocate within a jacket 71 attached to a frame section 69 so that the jacket clears the lower most point on the circumference of the drive disc sufficient to accommodate a second cam track 72. See FIGS. 5, 7a and 8a. Rollers 73, 74 attached to the top of the stop 70 and extending through a slot 75 of the jacket enable the rollers to follow the configurations of the cam track 72 so that in the extended position of FIG. 11, the stop is positioned beneath the corresponding platform 29. The configuration of the cam track 72 is made such that the stop 70 continues in this extended position while the crank arm 56 and its drive block 58 are traveling from the uppermost position to the lowermost position, thereby preventing platforms 29 on the up travel reach from moving downward.

Once the crank arm 56 begins moving upward, the configuration of the second cam track 72 is such that the stop 70 is withdrawn, permitting the next lower platform 29 to pass the stop without obstruction.

The down travel reach is similarly equipped for operation with the corresponding drive disc 53 accompanied by a crank arm 56' and its drive block 58'. (See FIG. 8a). Adjacent the rim of drive disc 53, crank arm 56 is attached by pivot pin 57 to drive shaft 54. Downward travel of the platforms 29 during the down travel reach calls for what may be considered as a reverse operative procedure. For this procedure, when the driver 60', which is extended when at the uppermost position of its stroke, remains extended for the succeeding 180 degrees of rotation of the crank arm 56', until the drive block 58' reaches its lower most position. During this period of operation, the driver 60' in effect supports the load of the corresponding platform 29 while it is being lowered through one step. Conversely, the driver 60' is withdrawn from its position beneath the platform and remains withdrawn while the driver and its drive block 58' is being raised again to its uppermost position for the succeeding 180 degree travel of the drive disc 53. In withdrawn position the driver is enabled to bypass the platform which it has just supported during downward movement and is extended only soon enough to be able to be moved against the platform next above for its ultimate descending operation. Operation of the driver 60' is similarly implemented by use of a rod 65' rotatably actuated by travel of its cam follower 62' on the cam track 61'.

Also the corresponding side is provided with a stop 70' operable in its jacket 71' by a second cam track 72' with its corresponding rollers 73', 74' acting as its cam follower.

It follows from the foregoing description that when the drive disc 53 with its corresponding drive block 58' is moving in a downward direction for one step, namely, the distance between two successive platforms, platforms on the opposite (up travel) reach are simultaneously moving in an upward direction. The stop 70' in its jacket 71' functions in comparable opposite sequence, being actuated by the second cam track 72' on its rollers 73', 74', serving as the cam follower 62'.

Not previously made reference to is the provision of a pair of shafts 75, 76 mounted on the frame to accommodate bushings 77 and 78 which are part of the drive block 58. Comparable shafts 75', 76', and bushings 77' (not shown), 78' are employed on the opposite side to accommodate the corresponding drive block 58'. (See FIGS. 9 and 10.

To add to the stability of the operating parts, there is provided a centrally disposed torque tube 79 which extends upwardly from the drive unit 50 to an uppermost beam 80. The beam is located at the tops of corners 81. Another pair of beams 82 provide support for the upper bearings 66' which function to contain the rods 65, 65'.

When containers are delivered to the storage carousel, they arrive on supply conveyor 15. The supply conveyor includes a plurality of holding stations 18 which take the form of independently operable power operated conveyor sections. From the final holding station 18, the containers are delivered to the lowest lift platform 29 on an up travel reach. It should be appreciated that the lowest platform 29 is on the same level as the supply conveyor.

For transferring containers 13 from the supply conveyor 15 to the appropriate platform 29, there may be provided a belt conveyor assembly 90 of a type shown in FIGS. 18 and 19. The belt conveyor assembly consists of a pair of left and right-hand belt drives consisting of a drive pulley 91 and two idler pulleys 92 and 93 which carry an endless belt 94. A motor 95 with its gear box 96 communicates with a drive shaft 97 at the ends of which the drive pulleys 91 are mounted. The idler pulleys 92, 93 are conventionally mounted on brackets 98, struts 99 being employed to hold and separate the two belt drives.

The belt drives are shown schematically in FIG. 2 and are located in a position so that a level reach 100 of the endless belt 94 extends to a position underneath the terminal of the supply conveyor 15 on one side and reaches into the narrow opening 45 of the platform 29, see FIGS. 2 and 15. The length of the level reach 100 is made sufficient so that abundant traction will be applied against the bottom of the containers as they approach the platform so that when the units leave the traction provided by the conveyor itself, the containers will be carried to a position relatively centered upon the platform, as shown in phantom in FIG. 2.

To make certain that containers are not delivered to the lift region until a suitable empty platform is disposed adjacent the supply conveyor, there is provided an articulated barrier 101. See FIGS. 20 and 21. The barrier is pivotally mounted upon the brackets 98 by a transversely extending arm 102 which enables two barriers to be employed, one on each side. To move the barrier between a withdrawn position of FIG. 20 and an active position of FIG. 21, there may be provided a pneumatic cylinder 103, or other appropriate motor power, for driving a piston 104. The piston in turn is pivotally attached by means of a pin 105 to a lever arm 106 which, in turn, is attached to the barrier 101.

A belt conveyor assembly 107 (see FIG. 2) similar to belt conveyor assembly 90 may be employed for removing containers 13 from the platform 29 to the inserter assembly at the same level as the supply conveyor. With such a construction, the belt conveyor assembly 107 is permitted to occupy the wide opening 42 provided for it by the platform construction as seen in FIG. 15.

As lift platforms 29 travel upwardly from within the pit 32 to the lowermost level of the up travel reach to which reference was just made, the empty platforms clear the adjacent belt conveyor assembly 107 because of the clearance provided by the wide opening 42.

After the containers are deposited onto platforms of the vertical lift 4, the next step is to transfer them to the appropriate inserter assembly 6. Each inserter assembly includes a holding shelf 110 (see FIG. 5) adapted to receive containers from a platform adjacent the inserter assembly and temporarily hold them in a position that is free from interference with either the vertical lift 4 or the storage carousel 2. The level of the lowermost of the shelves 110 is coincident with the level of a platform 29 which is not only at the lowermost level of the up travel reach, but is also coincident with the level of the supply conveyor 15. In systems likely to encounter particularly heavy use, it may be desirable to provide each inserter assembly with a pair of adjacent holding shelves 110. Each of the shelves 110 forms a short independently operable conveyor array. From the shelf 110, the containers are passed into an approach section 19 in the form of a short power-operated conveyor. Thereupon the approach section functions to move the container 13 into position on an appropriately available rack 12 on storage carousel 2. Since there is a shelf 110 and accompanying approach section 19 available for each and every one of the multiple storage carousel tiers, the containers 13 can be inserted onto any rack at any level of the storage carousel.

After a container 13 has been properly positioned on a platform as described above, it may either be immediately removed from the platform by action of the second belt conveyor assembly 107 and transferred to the shelf 110 of the lowermost inserter assembly 6 or it may be carried by the lift to a higher tier. If the container is destined for a rack on a higher tier, the container is carried by the lift 4 to the appropriate carousel tier. A different mechanism is provided for unloading containers onto succeeding upper shelves 110.

Figure 5:
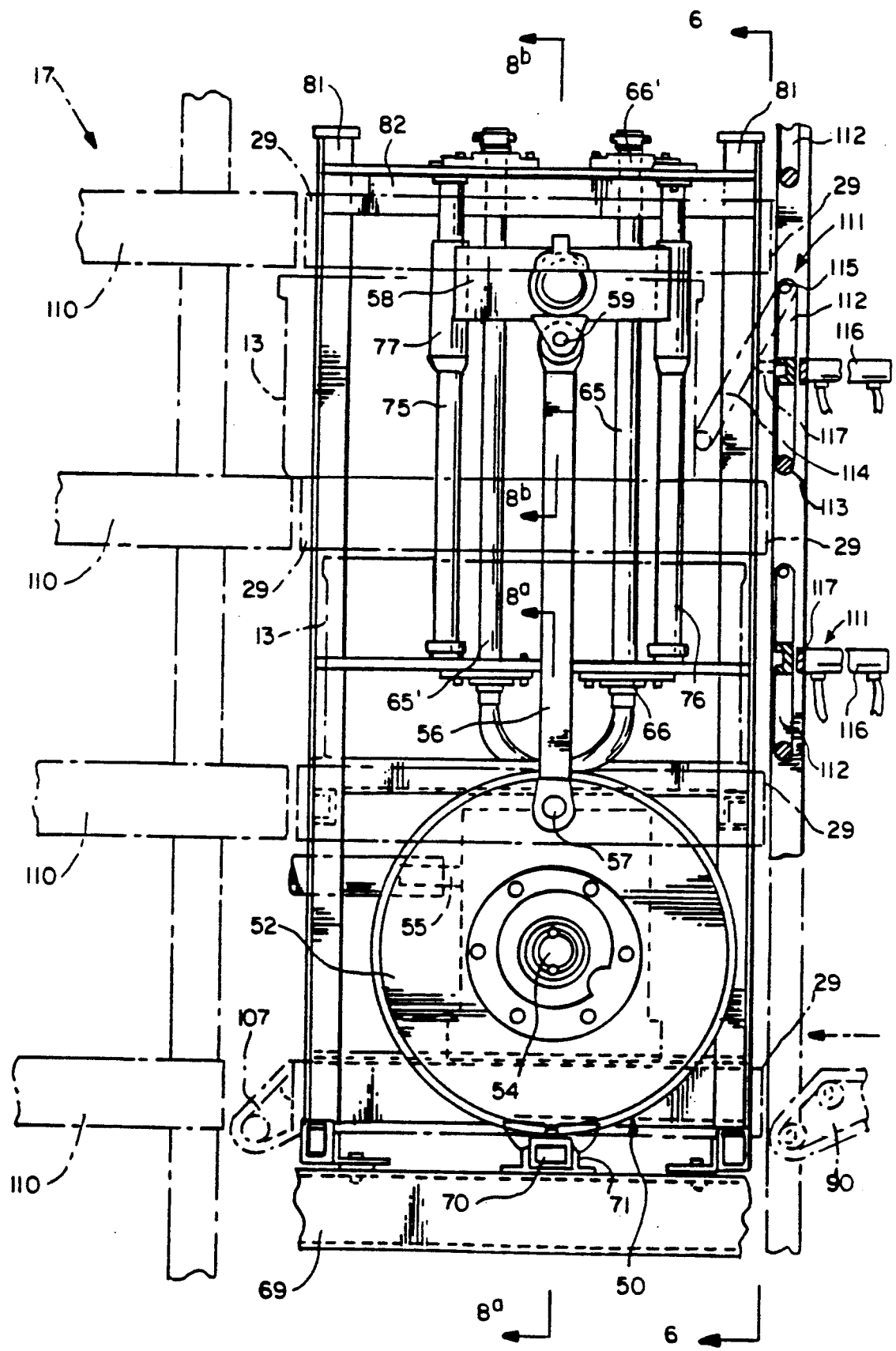
FIG. 5 is an elevational view on the line 5—5 of FIG. 2.
Figure 11:
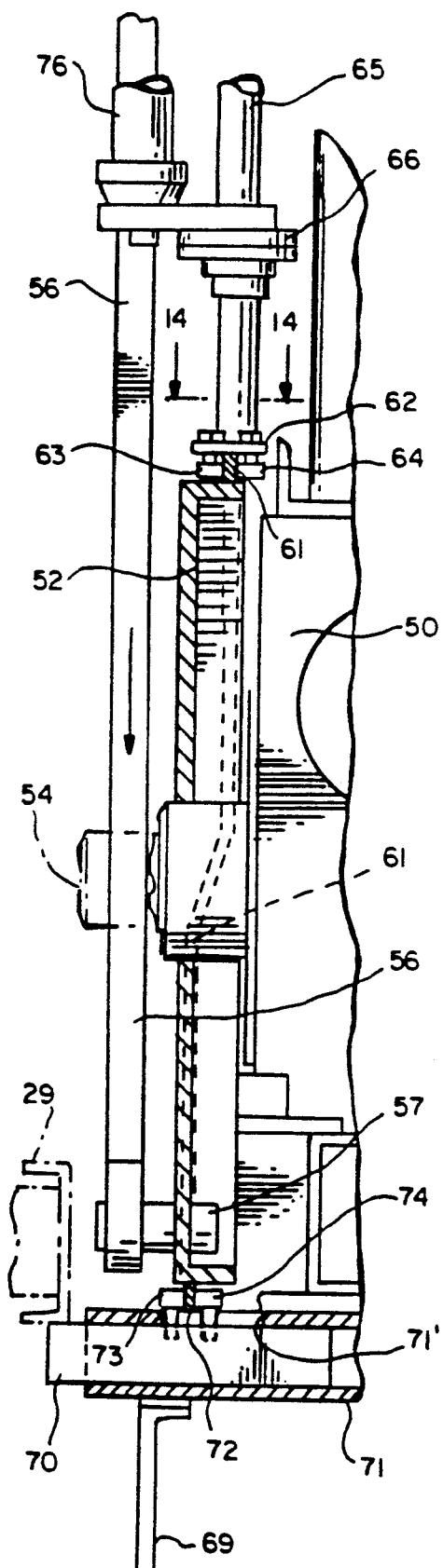
FIG. 11 is a fragmentary view partially broken away at the left side of FIG. 8a with operating parts in a lower-most position.
Figure 12:
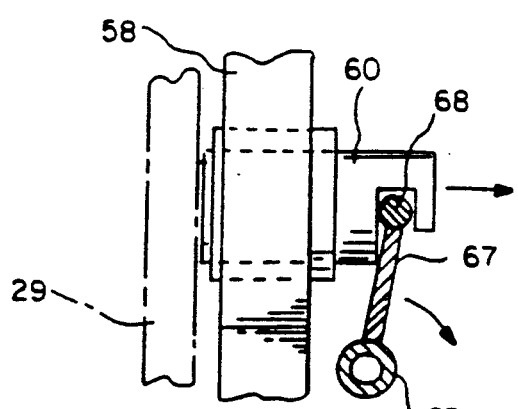
FIG. 12 is a cross-sectional view on the line 12—12 of FIG. 8b.
Figure 13:
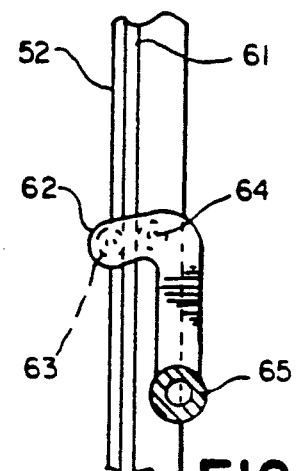
Figure 14:
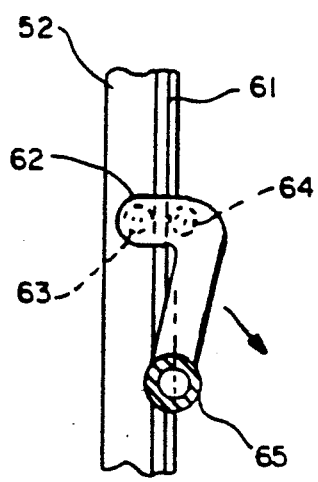
FIG. 14 is a cross-sectional view on the line 14—14 of FIG. 11.

For the upper inserter assemblies, a mechanism found workable for moving containers from the platform far enough to reach the adjacent shelf 110 is embodied in an articulated transfer assembly 111, there being such a transfer assembly for each of the upper inserter assemblies 6. Referring next to FIGS. 1 and 5, the transfer assemblies 111 are located successively one above another outside of the lift 4. As seen in FIG. 5, the transfer assemblies 111 appear on the right side of the lift 4 and includes a rack 112 that is pivotally attached to the frame at pivot point 113. A push rod 114 has a scissors-like pivotal attachment 115 to the rack 112. In a motor powered embodiment of the transfer assembly, a pneumatic ram 116 has its piston 117 attached to the push rod 114 so that when the piston is extended, the push rod engages the adjacent side of the container 13 which can then be pushed far enough off the platform to be engaged by substantially conventional power actuated traction rollers 118 on the shelf 110.

After the container has been discharged, the transfer assembly is then collapsed by reverse action of the pneumatic ram so as to be clear of succeeding platforms as they are moved upwardly through their up travel reach. An appropriate energizable detainer 119 (FIG. 2) may be employed on the shelf to detain the container on the shelf until it is timely to insert the container onto an empty rack of the rotary storage carousel.

It should be appreciated that the detailed construction of the lift can be widely varied within the scope of the present invention. Other suitable lift constructions are disclosed in U.S. Pat. No. 4,752,175, issued Jun. 21, 1988 and co-pending U.S. patent application Ser. No. 821,257 filed Jan. 20, 1986. In application Ser. No. 824,718, which is incorporated herein by reference, a lift is disclosed having platforms comprised of a plurality of cantilevered power operated rollers. Thus, to load or unload the lift, the power operated rollers are actuated. Since the rollers are power operated, the lowermost tier includes a plurality of power operated loading rollers cantilevered in an opposing fashion to the lift platform and positioned such that the lift platform will pass therethrough. The loading rollers facilitate transferring containers between the lift and the supply and takeaway conveyors.

U.S. Pat. No. 4,752,195 discloses yet another lift construction. The platforms for the lift disclosed therein form tilted shelves that each include a plurality of low friction rollers and power operated end blocker. Thus, when a container is loaded onto the lift, it is gravity motivated to roll freely over low the friction rollers until it abuts against the power operated blocker. The container is then carried to the appropriate level and the power operated blocker is dropped thereby discharging the container onto the desired inserter assembly. The lift can readily be adapted to carry two or more containers per platform level merely by extending its length and placing the appropriate number of independently operable power operated intermediate blockers in strategic locations on the platform. It should be appreciated that when unloading a container from a platform holding two or more containers, the end blocker would be dropped first to allow the end container to be discharged. The end blocker would then be raised back up before the intermediate blocker is dropped to allow the container it is holding to slide into the end position.

Insertion Procedure

To insert a container 13 located within the inserter assembly onto an approaching empty rack 12 on the carousel, the container called for is transferred from the holding shelf 110 to the approach section 19 immediately downstream of the holding section. To achieve the transfer, the detainer 119 is removed and the traction rollers of the shelf 110 move the container downstream until the container is engaged by comparable power actuated traction rollers 125 of the approach section. See FIGS. 2 and 25. The traction rollers 125 are carried by an appropriate tilt table 124.

Referring next to FIGS. 25-36, the operation of the traction rollers 125 will be described. The traction rollers are interconnected via gearing 126 which serves to drive the rollers 125. Gearing 126 is driven by a gear box 127 to which driven shaft 128 is connected. The gear box 127 in turn is powered by a drive shaft 129 that is driven by a power source 130 which drives the storage carousel. The interconnection between the power source 130 and the tractions rollers 125 serves the important function of insuring that the rate of travel of containers within the approach section 19 always matches the rate of travel of racks on the storage carousel as they pass an outlet end 131 of the approach section 19 ready for insertion. Extension drive shafts 129' serve gear boxes 127' at other levels. To be certain that the containers leaving the approach section will be in alignment with the appropriate rack and close enough for effective engagement, there is provided an oblique guide strip 132 and an interconnecting parallel guide strip 133. By virtue of its obliquity the oblique guide strip 132 physically directs containers propelled by the traction rollers 125 to a proper position with respect to the storage carousel.

Referring next to FIGS. 22, 23, and 25, the approach section includes several features that facilitate attaching containers to the storage carousel racks. One of these features is embodied in lift bars 134 and 135. The lift bars are mounted on lift shafts 136 on the frame of the approach section. The lift bars are mounted sufficiently eccentric such that they are tiltable to the position shown in FIG. 22 so as to lift the container clear of the traction rollers 125. The lifting action is provided for by a reciprocating motor such as, for example, a pneumatic cylinder 137 and its piston 138. The piston is connected through appropriate brackets to tilt levers 139 anchored to tilt shafts 140 eccentric with respect to the center of rotation of the lift shaft 136. The two layers 139 and tilt shafts 140 are interconnected through a connecting layer 141 as seen in FIGS. 22 and 23.

Upon operation of the pneumatic cylinder 137 in the chosen embodiment, the container can be lifted clear of the traction rollers 125 and thus be enabled to remain stationary while the traction rollers continue in operation at full speed. Conversely, when the pneumatic cylinder is manipulated to reverse operation of the lift shafts thereby lowering the container into engagement with the traction rollers 125, the container will be propelled at full speed direction towards the carousel (from right to left as seen in FIGS. 22, 23 and 25).

Figure 28:
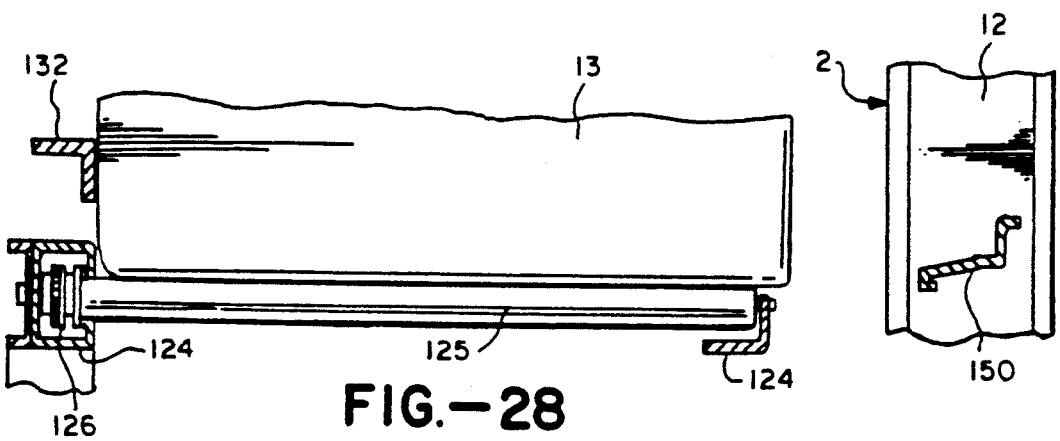
FIG. 28 is a cross-sectional view on the line 28—28 of FIG. 25.
Figure 29:
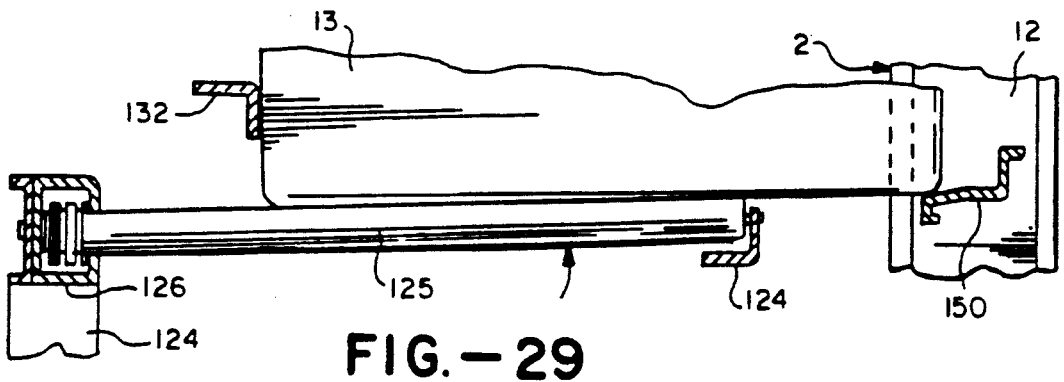
FIG. 29 is a cross-sectional view on the line 29—29 of FIG. 25.
Figure 30:
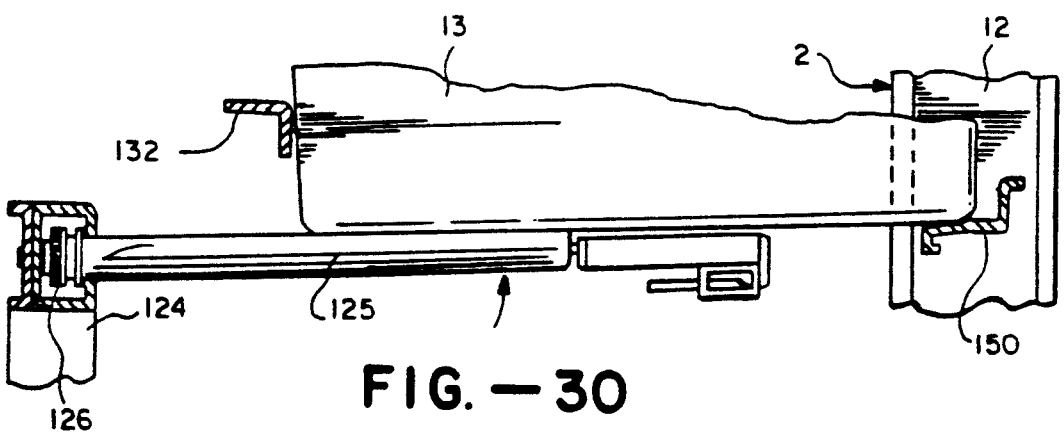
FIG. 30 is a cross-sectional view on the line 30—30 of FIG. 25.
Figure 31:
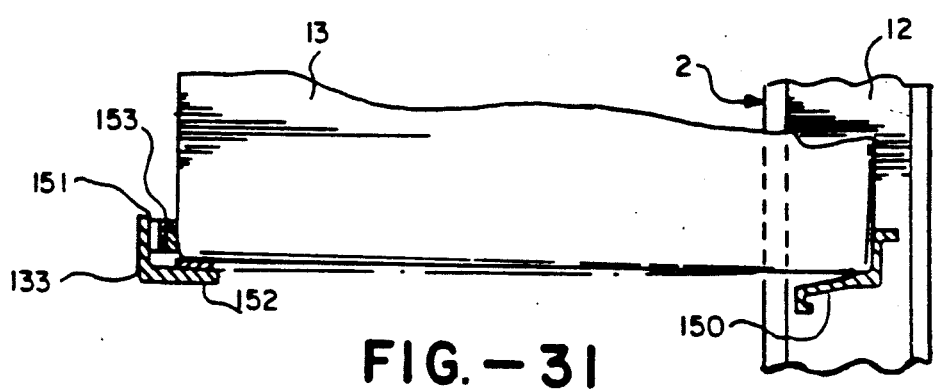
FIG. 31 is a cross-sectional view on the line 31—31 of FIG. 25.

The tilt table 124 is adapted to lift the inside edge of the container above the level of the positioning strip 150 on carousel rack 12 as is best shown in FIGS. 28-30. It is desirable to lift the container above the positioning strip to eliminate friction as the container is pressed into engagement with the rack by guide strip 133, as well as to reduce wear on the bottom of the container. It should be appreciated that the tilt table must be lifted only during insertion procedures. Otherwise, loaded containers on the following racks would strike the tilt table as they pass thereover. To facilitate lifting the inside edge, a pneumatic cylinder 145 is mounted between the tilt table and a section 146 of the frame on the approach end of the tilt table. At the opposite end, a second pneumatic cylinder 147, also mounted on the tilt table 124, is positioned to bear downwardly against its adjacent section 148 of the frame as can be seen in FIG. 25. When a container is directed onto the tilt table, the controller actuates cylinders 145 and 147 thereby lifing the inside edge of the tilt table. The actual height of the tilt table may readily be adjusted through adjusting the heights of pneumatic cylinders 145 and 147. The extensions of the two cylinders are adjusted such that cylinder 147 tilts the table by an amount greater than that provided by the cylinder 145 thereby facilitating a smooth transition between the rollers of the holding section and those of the approach section.

The combined effect that the tilt tables and oblique guide strip 132 impart on the containers is shown in FIGS. 28-30. Together they align the container 13 with a positioning strip 150 which is part of the structure of carousel racks 12. As the container 13 is moved in the direction of the storage rack 12, it is not only moved laterally (FIGS. 28 and 29), but it is also lifted vertically so that the level of the bottom of the container reaches above the level of the positioning strip 150, as in FIG. 30. After the container has been inserted, cylinders 145 and 147 are deactivated and the tilt table is returned to its withdrawn position thereby allowing containers carried by the following racks to smoothly pass thereover.

As the container leaves the downstream end of the tilt table 124, (FIG. 25) it is propelled by the trailing rack column 215 (FIG. 57) into a position of engagement with a carrier leg 152 and a vertical leg 151 of the parallel guide strip 133. Various movements of the container may be accomplished by the guide strip 133. By having the guide strip pitched obliquely upwardly by an amount suggested by the angle "b" in FIG. 33, the level of the bottom of the container 13 may be brought approximately even with the level of the rack where the adjacent edge approaches the positioning strip 150. Also, a vertical leg 151 disposed at a right angle relative to the carrier leg 152 is directed laterally toward the carousel by an amount suggested by the angle "a" in FIG. 32. In addition the leg 152 is provided with a leaf spring 153. Referring also to FIG. 46, the purpose of the leaf spring is to shift the container 13 laterally toward the location of the positioning strip 150 so that proper engagement can be made between latching means 154 of the rack, and complementary notches 155 at the top of the adjacent wall of the container 13.

In the embodiment described, the latching means 154 takes the form of hooks 212 mounted on each carousel storage rack 12. For a better understanding of the structure and operation of the hooks 212 reference is made to co-pending application Ser. No. 159,261 filed Feb. 23, 1988, which discloses a wide variety of suitable hooking structures and is incorporated herein by reference. Referring specifically to FIGS. 52, 57 and 58, hook 212 is shaped roughly in the form of the letter S and has a captive end 213 pivotally secured in a bushing received by bearing hole 214 in one of the columns 215 of rack array 10. It will be appreciated that columns 215 extend the height of the storage carousel and form the walls of rack array 10. The hook 212 has a free end 216 at the end of a lever arm 217. Intermediate opposite ends of the hook 212 is a transversely disposed latch bar 219 which is adapted to engage the shoulder 632 of container 13. That is, the latch bar 219 is adapted to fall into the gradual depression in the upper rim of container 13 which forms the notch 155 as the hook 212 swings pivotally about the wall of the bearing hole 214. The latch bar 219 extends through and moves freely within a slot or hole 219' in a column 215 of the frame.

Each storage rack 12 includes a pair of hooks 212 mounted on opposite columns of rack array 10 in a facing relationship. Thus, a hook 212 engages each inside corner that forms shoulder 632 of the container 13 to support the container in a cantilevered manner. It should be appreciated that in order for the hooking arrangement to be effective, each rack has a positioning strip and backstop 150 disposed in a position to be engaged by the bottom portion of the container. Specifically, the bottom of the inside wall of the container abuts against the backstop 150. This insures that the container will not drop off of the hooks.

As the container 13 becomes latched in position on its appointed rack 12, it is allowed to lower to finalize the latching engagement. Referring to FIG. 33, lowering is facilitated by a downwardly tilted exit end 133' of the parallel guide strip 133. The gradual downward tilt allows the container 13 to lower itself progressively until it finally moves out of reach of the guide strip.

To ensure that the latches have been effectively set, a spring mounted hook setting strike bar is positioned above the downward sloping exit end 133' of the guide strip. The strike bar is positioned such that if the latch bar 219 is not fully recessed within the gradual depression in the upper rim of container 13, the latch bar will strike the hook setting bar which will press the latch bar fully into its appointed depression. In the event that the hook is lying on top of shoulder 632 of the container as opposed to being in the depression where it belongs, the hook setting strike bar will be forced upwards. A kill switch will immediately shut down the carousel. It is important to insure the hooks are properly set to prevent the containers from flying off of the carousel when they rotate about the opposite end.

The power actuated traction rollers 125 of the approach section are directly connected with the power source 130 that controls the carousel's rotational speed. This positively synchronizes the inserter assembly with the carousel. With such an arrangement it is assured that the containers can be properly loaded irrespective of any variations in carousel speed which might occur due to fluctuations in operation of the power source. In addition, should there be, for example, a power failure, insertion activity as described would be halted at the same time, thereby to avoid any pile-up of containers at the insertion position. When subjected to a subsequent resumption of power, the containers are then ready to complete whatever insertion activity may have been interrupted. Further, in that application of power to the approach sections 19 through gear boxes 127 is identical at all levels, control throughout the system is maintained at all times.

Alternatively, the inserter assemblies may be electronically synchronized with the carousel. This may be accomplished by bringing the containers 13 against the detainer 119 as an empty rack approaches. The detainer is then dropped when the empty rack reaches a precise position and the container is carried by the traction rollers of the approach section into contact with the approaching rack 12. The carousel motor(s) 130 and motor 142 that drives the traction rollers of the inserter assembly are driven by a common variable speed controller. The inserter assembly motor 142 is geared to carry the containers at a speed substantially faster than the carousel is traveling, as for example, 50% faster. The release of detainer 119 is timed so that the container will catch up with the rack and abut against the rack 12 at substantially the position shown by container 13' in FIG. 2. Since the rollers of the approach section are traveling faster than the carousel, the container will press against the leading column 215 of the rack array to ensure that the container is positioned for proper loading. Since the carousel motors 130 and inserter motor 142 are controlled by a common variable speed controller, the containers will be synchronized with the carousel movements regardless of fluctuations in operations of the power source.

It will be appreciated that if for some reason a container is not properly delivered to the carousel in synchrony with the arrival of the rack, it may be struck by the preceding or trailing container or pinched by one of the container columns 215 that form the edges of rack array 10. In such an event, the container could be pinched against guide strip or thrown clear of the carousel. To prevent crushing containers, the guide strip 133 includes a breakaway latch that will release the guide strip allowing the container to push free of the carousel. A kill switch is provided that will immediately stop the carousel in the event that an insertion is missed to prevent the destruction of the container or any components that it is thrown into. As a further backup to prevent improperly inserted containers from causing damage, it may be desireable to provide netting to catch a container in the event that a container is thrown from the carousel.

Extract, Release and Removal Sections

When a container 13 is called for extraction from the carousel, it is extracted from the rack upon which it is hung by the appropriate extractor assembly. As depicted in FIG. 1, the extractor assemblies are disposed opposite the inserter assemblies. Each extractor assembly 8 includes a removal section 24 for disengaging the container from its associated carousel rack, and an extract holding section 25 for temporarily storing the container until it can be transferred onto the lift 4. To facilitate an extraction, there is a sequence of operations that are motivated by and in synchrony with the carousel. At the extract end 21 of the carousel, the selected container 13 is unlatched from its rack 12 and, in effect, pulled away from the rack so that it can be passed left to right through removal section 24 and into extract holding section 25 as seen in FIG. 1. The container is then loaded onto a platform 29 on the down travel reach of lift 4. The lift carries the container to the takeaway conveyor 16 for delivery to the conveyor network 14. To facilitate a general understanding of operation of the system, it is assumed that the supply conveyor 15 and takeaway conveyor 16 are disposed at the same level. However, it will be appreciated that, should the occasion require, more than one level could be served.

Several mechanisms are involved in the extraction of containers from the storage carousel. The removal section of the extractor assembly includes a plurality of power actuated traction rollers 163 that are synchronized with the carousel to carry the container away from the carousel without striking containers carried by the preceeding or trailing racks. Referring now to FIGS. 38-39, a set of lift arms 162 are provided for lifting the free ends of containers 13. The lifting action of lift arms 162 enable a second mechanism to unlatch the container from its latched engagement with the carousel rack. A third mechanism in the form of an auxiliary kick bar 165 is provided to physically push containers away from the rack laterally outwardly away from the carousel. These three mechanisms are synchronized with and driven by the power source 130 acting through a main drive shaft 160 and an idler drive shaft 161 which is reached by a chain drive 159. FIGS. 46, 47, 48. It will be appreciated that when extraction of a container is called for, all three of these mechanisms are activated at substantially the same time. Since extractor assemblies are provided at each tier level, this activation can take place at any one of the multiple levels of the storage carousel.

Figure 40:
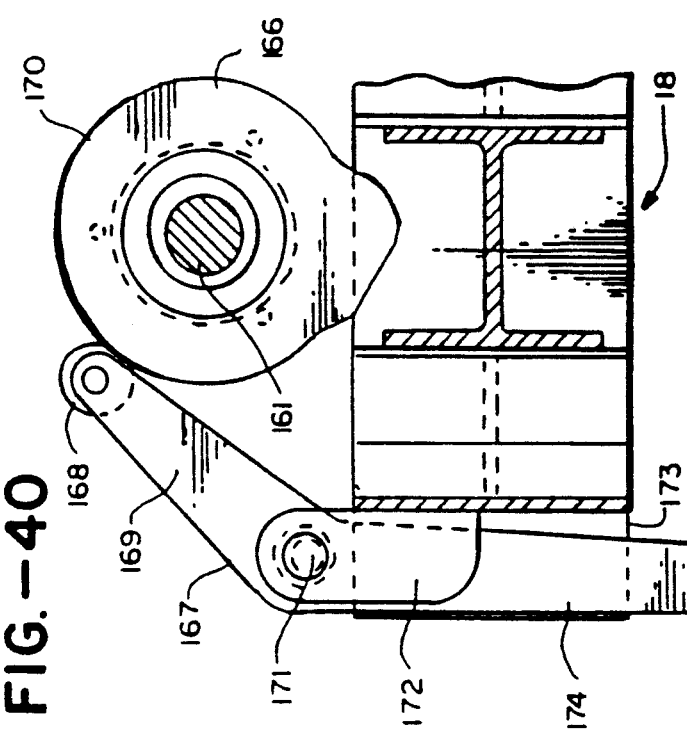
FIG. 40 is a horizontal view on the line 40—40 of FIG. 39.
Figure 41:
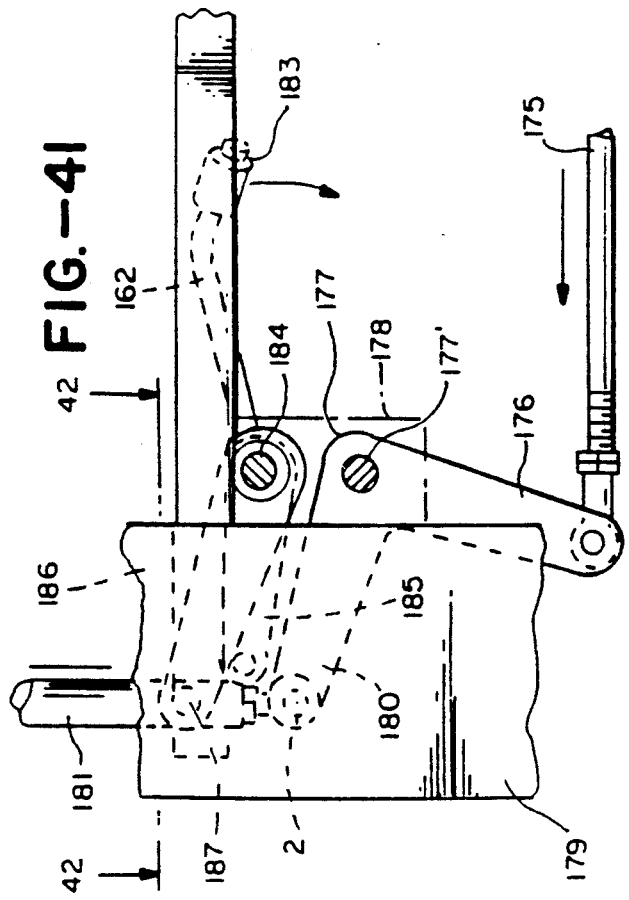
FIG. 41 is a view of the left end portion of FIG. 39 showing the parts in a different position.
Figure 62:
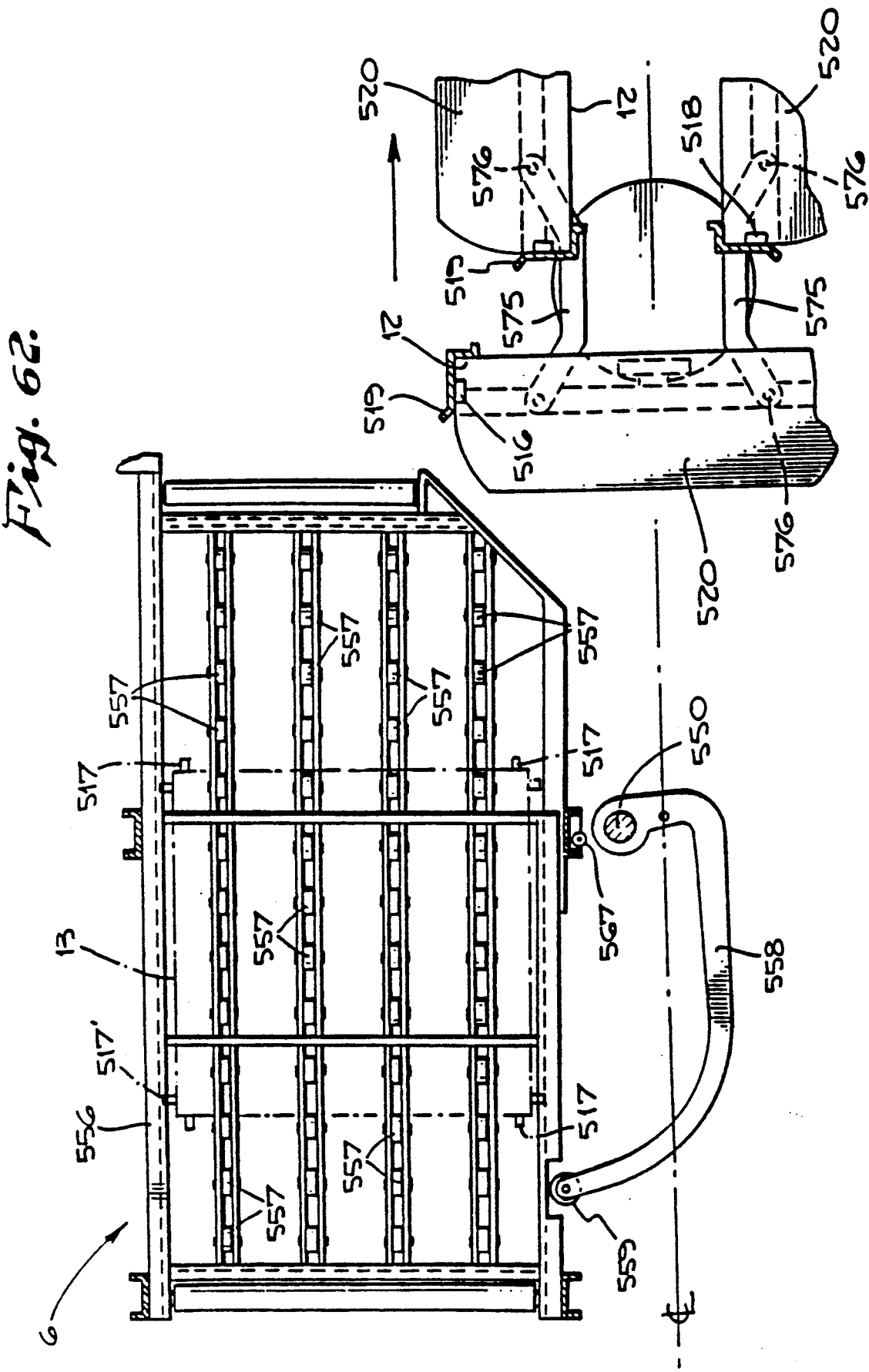
FIG. 62 is a plan view of a part of the alternative inserter assembly and applicable portion of the motorized carousel.

When a container selected for removal from the carousel arrives at the extract end 21 of the removal section 24, the lift arms 162 are triggered for action. A lift arm cam 166 is keyed to the idler drive shaft 161 so that the lift arm cam is rotating at all times during operation of the rotary storage system, FIGS. 39, 40, 41. A bell crank cam follower 167 is provided with a roller 168 on an arm 169 and engages a cam track 170 of the lift arm cam 166. A pivot pin 171 mounts the bell crank cam follower 167 on a bracket 172 of a frame section 173. A second arm 174 has attached to it a rod 175 which extends toward the left, as viewed in FIGS. 39-41, to a position of engagement with an arm 176 of a bell crank 177. The bell crank is mounted by a pivot pin 177' on a bracket 178 on an adjacent frame section 179. A second arm 180 of the bell crank 177 is attached to a reciprocating rod 181 at a pivot point 182. The reciprocating rod is long enough to extend upwardly throughout all levels of the rotary storage system. The train of connection just recited makes certain that as long as the storage carousel is in operation, the reciprocating rod 181 is constantly reciprocating. Despite the constant reciprocation of rod 181, the lift arms 162 are operated only when called upon.

The lift arms 162 with appropriate rollers 183 at their free ends are attached to a common rotatable drive rod 184. The drive rod, pivotally mounted on the bracket 178, has anchored to it a drive lever 185. There is in addition a drive link 186, one end of which has a pivot attachment 187 to the reciprocating rod 181 and the other end of which is pivotally mounted on the drive rod 184. In view of this pivotal relationship in spite of constant reciprocation of the rod 181, the lift arms 162 and rollers 183 remain fixed in position at a location below the level of the rollers 163.

Figure 42:
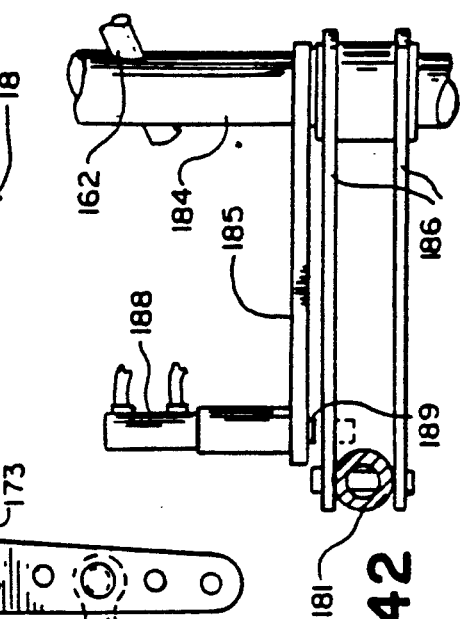
FIG. 42 is a cross-sectional view on the line 42—42 of FIG. 41.

A reciprocating cylinder 188 mounted adjacent the end of the drive lever 185 is provided to operate the lift arms at the appropriate times. An actuator pin 189 of the cylinder 188 is adapted to be extended to the phantom position of FIG. 42. When extended, the reciprocating activity of the drive link 186 is passed to the drive lever 185, which in turn causes the lift arms 162 to be elevated to the lifted position of FIG. 39. This results in lifting the outside edge of the container 13 which substantially reduces the load on the hooks 212 of latching means 154 by causing it to be dislodged slightly from its snug position on the rack 12. The duration of the lift is determined by travel of the roller 168 of the bell crank cam follower on the cam track 170.

Unlatching Initiated

While the lifting activity just described is taking place, a separate mechanism is also being called into action to unlatch the latching means 154 from the notches 155 at the top of the inside wall of the container 13. Referring now to FIGS. 43, 45, 46 and 52, this relies upon operation of a rotary acting unlatching cam 200. The unlatching cam is attached to and is driven by the same idler drive shaft 161 which is relied upon for operation of the lift arms 162. In FIG. 43 the idler drive shaft 161 is shown journaled in a bearing 201, attached to a frame section 202. A flange 203 on the same frame section 202 supports a first lever 204 pivoting about a pivot point 205. One arm 206 is equipped with a roller 207 serving as a cam follower for a cam track 208. A second arm 209 is connected by means of a pivot pin 210 to a vertically reciprocating latch trip rod 211.

It should be noted in this connection that the latch trip rod 211 extends upwardly throughout all tiers of the carousel, paralleling upward extension of the reciprocating rod 181. What is further significant to an understanding of the operation is that the power stroke of the latch trip rod 211 is in a downward direction, driven by the second arm 209, while the first arm 206 is driven upwardly by action of the cam track 208 against the roller 207, FIGS. 45, 52, 53. The latching means 154 which takes the form of hooks 212 is unlatched by activity of the latch trip rod 211 as shown in latched position in FIGS. 46 and 52.

Unlatching the latching means 154 and operation of the kick bar 165 occur at substantially the same time when triggered by downward motion of the latch trip rod 211. As shown in FIGS. 49 and 50, the upper end of the kick bar by its flange 235 is pivotally mounted on a frame section 226 by means of a pivot rod 237. The same pivot rod also mounts the opposite end of the kick bar by use of its flange 235' on a frame section 226'. A link 236 to the latch trip rod 211 may be provided for stability.

The flange 235 at the first mentioned upper end of the kick bar 165 also has fixed on it a crank arm 233. The crank arm extends to a position adjacent to the latch trip rod 211 at a location adjacent to a ledge 227. Mounted on the fixed crank arm 233 is a pneumatic cylinder 228 at a position where its piston 229 can be projected beneath the ledge 227. As a consequence, when the trip rod 211 moves downwardly, FIGS. 46, 54, 55, the kick bar is rotated clockwise as shown to a kick-out position far enough to dislodge the container 13 from the positioning strip 150 of the rack 12, FIG. 54. The latches then rest on the flange of the container away from the notches 155.

At the opposite end of the kick bar 165, as viewed in FIG. 49, another operation takes place simultaneously. This is where the flange 235' is attached. For this operation there is a cam follower arm 234 in fixed position on the kick bar making use of the flange 235'. Both the cam follower arm 234 and flange 235' rotate about the pivot rod 237. As the kick bar 165 swings outwardly, as above described, a roller 234' at the end of the cam follower arm 234 is forced out of its notch 239 on a drive cam plate 232 and along an arcuate cam track 232'. The configuration of the cam track is one which causes the drive cam plate 232 to rotate clockwise about a pivot 240 on a bracket 225' of the frame section 226, see FIGS. 53 and 55. By having the drive cam plate fixed on the adjacent end of the delatch bar 222', the delatch bar is tilted upwardly, FIGS. 53, 54.

Because there is a connecting bar 231 interconnection delatch bars 222 and 222' at both sides of the container 13 (FIGS. 48, 49), unlatching takes place simultaneously at both corners 221. The delatch bar 222, as shown, has its tab 223 pivotally mounted by use of the pivot 224 to a bracket 225 of a frame section 226. The other delatch bar 222', attached as it is to the drive cam plate 232, pivots with the connecting bar 231 about the pivot pin 240.

By the operations just described when a container designated for removal arrives at the extract end 21 of the extractor assembly its outside edge is lifted by the lift arms 162 such that much of the weight of the container is taken off of the hooks 212. The hooks are then lifted to disengage the container which is then lowered down onto the rollers 163 of the removal section. The rollers 163 are slightly below the level of positioning strip 150 of rack assembly 12 which therefor tilts the container slightly away from the carousel to enhance its removal. At approximately the same time, kick bar 165 pushes the container away from the carousel. Simultaneously, rollers 245 pull the container away from the rack (FIG. 38). A motor 249 is provided to drive the traction rollers. To facilitate synchronization with the carousel, motor 249 is controlled by the same variable frequency motor that runs the carousel motors. It will be appreciated that the surface speed of rollers 245 will be slightly faster than the carousel speed since it is desired that the containers travel longitudinally at the same speed as the carousel while being drawn away from the racks.

The motor includes a dual controller that includes both high speed and variable frequency settings. During extraction, the traction rollers are synchronized with the carousel through the use of the common variable frequency controller. A presence detector 20 indicates when the container is clear from the travel path of its neighboring containers that remain on the carousel. At that point, the motor 249 could be switched to the high speed controller which would drive the rollers at a higher rate of speed.

In alternative embodiments, the initial traction rollers 236 could be replaced by idler rollers. In such an embodiment, the kick bar would be primarily responsible for propelling the containers clear of the carousel racks, with the traction rollers carrying the container away only after it had been pushed off of the carousel rack. In yet another alternative embodiment, the kick bar could be use for mechanical backup only and the traction rollers 245 could be used exclusively to pull the container away from the carousel. In such an embodiment, it may be desirable to use rubber coated traction rollers to enhance traction between the rollers and the containers.

In other alternative embodiments, the variable frequency motor described could be replaced by a drive connection that mechanically couples movements of the carousel to the rotation of the traction rollers. In such embodiments, the rollers are driven by an interconnecting chain drive 246, that propels the container in a direction left to right, as viewed in FIGS. 2 and 38, to the extract holding section 25.

Energizable detainers 247 may be provided, where desired to provide storage shelves on the extract holding section. Shelves of the extract holding section 25 are substantially the same as the holding shelves 110 of the insert holding section.

From these shelves the containers are transferred to one or another of the lift platforms 29 as they travel along their down travel reach. It should be appreciated that it may not be possible to move the container onto the first empty platform that arrives adjacent the extractor shelf since such platforms may be designated to receive a container from a lower shelf. Optimization of the extracting sequence is handled by the storage facility controller as explained below. Once on the lift, containers are progressively moved downwardly to the level of takeaway conveyor 16. This may also be the level of the lowermost extraction assembly 8.

To unload the containers from the lift, a belt conveyor assembly 248 of the type described in FIGS. 18 and 19 may be employed to effectively transfer containers from the platform at the lowermost position in a direction left to right, as viewed in FIG. 2, to a location of engagement with a second belt conveyor 250 which in turn transfers the containers to the adjacent pick-up end of the takeaway conveyor 16.

The components of the organizer system described above enable the storage carousel to operate continuously and uninterruptedly while containers are inserted onto and extracted from selected carousel racks. By providing selectively energizable inserters and extractors at each carousel tier level together with the other energizable actuator described, the organizer system lends itself to computerized control. The system also insures against jamming as a result of inadvertent malfunctioning of the moving parts because the insertion and extraction operations of the organizer have a keyed synchronized engagement with the primary drive for the storage carousel. Moreover, since all levels are interconnected with the same drive, the number of levels employed is entirely arbitrary and limited only by structural limitations. Further still, since the various sections at the various levels are substantially modular in their construction and operation, servicing problems and routine maintenance are materially reduced.

Referring next to FIGS. 59-63, an alternative embodiment of the present invention will be described. In this embodiment, the containers 13 include pegs 517 in place of the notches 155 described in the previous embodiment. The pegs 517 cooperate with hooks on racks 12 of storage carousel 13 to reliably secure the containers to the carousel. The layout of the system may be as previously described with the only differences being in the inserter and extractor assemblies and their integration with the storage carousel.

The extractor assembly 8 in this embodiment includes an elevating platform 521, as shown in FIG. 59 and in plan view in FIG. 61. For lifting the elevating platform 521 so as to disengage the container from the conveyor, a lifting cylinder 522 mounted on an adjacent beam 523 is provided with a piston 524 acting against a bracket 525 of the elevating platform, action of which results in lifting the left edge of the container 13 high enough for the peg 517 on that side to clear the corresponding flange 518. Although essentially a clockwise tilting motion is provided, there will be a degree of lift for the right-hand wall of the container 513, sufficient to loosen engagement of the corresponding peg 517 from its flange 518.

To accentuate the tilt, there may be provided a substantially vertically extending shaft 526 mounted on the beam 523, having a bent portion 527 at its upper end. A lower set of casters 528 are adapted to ride upwardly on a vertical portion of the shaft 526 while an upper set of casters 529 ride along the bent portion 527. The net result of the casters rolling upwardly on the shaft 526 is to lift the left-hand peg 517 clear of the corresponding flange 518, sufficient to disengage the container 13 from its corresponding rack 12 so that the container can be moved clear of the conveyor rack and advance to the broken line position of FIG. 61. It should be appreciated that it is unnecessary to lift the right-hand peg 517 clear of its corresponding flange 518 because the corresponding shelf 520 will be continuing its motion in a clockwise direction while the lifting is taking place, the result of which is having the wall of the shelf 520 push the container in a direction from right to left of FIG. 61 far enough so that upon automatic lowering of the elevating platform 521, the right-most power actuated horizontal roller 530 will be engaged by the bottom of the container 13 and progressively moved in a direction from right to left, with the help of additional power actuated horizontal rollers 531, 532, 533, etc., acting as a conveyor for the extractor assembly 8. The same discharge disposition of the container would apply under circumstances where, in the alternative, both rear corners were released simultaneously instead of by the tilting expedient. It should be appreciated that the shelves 520 are primarily for guidance and are not intended to fully support the container. However, in alternative embodiments, the more traditional shelves that fully support the containers could be provided.

Synchronization between the travel of the carousel 2, the extractor assembly 8 and the inserter assembly 6, is accomplished, in the embodiment chosen, by means of a mechanical drive interconnecting the various moving parts, as illustrated advantageously in FIG. 61. A common drive shaft 535, emanating from a conventional source of power, has mounted thereon a sprocket 536 from which a chain 537 extends to engagement with a sprocket 537' mounted on a shaft 538 of the carousel. A second sprocket 539 has a chain 540 in engagement with it, the chain 540 being a portion of the endless drive for the carousel 2. One or more tension sprockets 539' may be employed to set the tension of the chain 537.

A separate motor 541 mounted on the beam 523 is provided with shaft 542 which drives a sprocket 543 which in turn motivates a chain drive assembly 547 for the rollers 530, 531, 532, 533, etc., which in this fashion comprise a conveyor for the containers 13 as they are fed to it by the unloading assembly. Moreover, by an appropriate selection of sprocket sizes and chain drive assembly 547, the rollers 530, 531, 532, 533, etc., can be made to rotate rapidly enough to move the container 13 along the disposal conveyor at a speed more rapid than the speed of approach of comparable containers while being carried by the approaching leg of the carousel. Accordingly, the containers can be moved out of the way for disposition at a rate faster than they are unloaded from the carousel. Although a single common drive shaft 535 has been shown in the chosen embodiment for operating all levels of the conveyor rack, there could, where preferred, be a separate motor for each level.

The same common drive shaft 535, by use of the chain 537 in engagement with a sprocket 549 on a shaft 550, can be used for driving appropriate parts of the inserter assembly 6.

If desired, loading of containers onto the carousel racks can proceed while unloading is taking place as well as before or after that operation. For loading, the containers 13, shown in phantom in FIG. 62, 67 and 68, for example, may be advanced along an approach conveyor 556 with the assistance of a set of idler rollers 557. Since the insertion and extraction mechanisms operate independent of each other, they could be at opposite ends, or at both ends, or even at the sides under acceptable circumstances.

Figure 67:
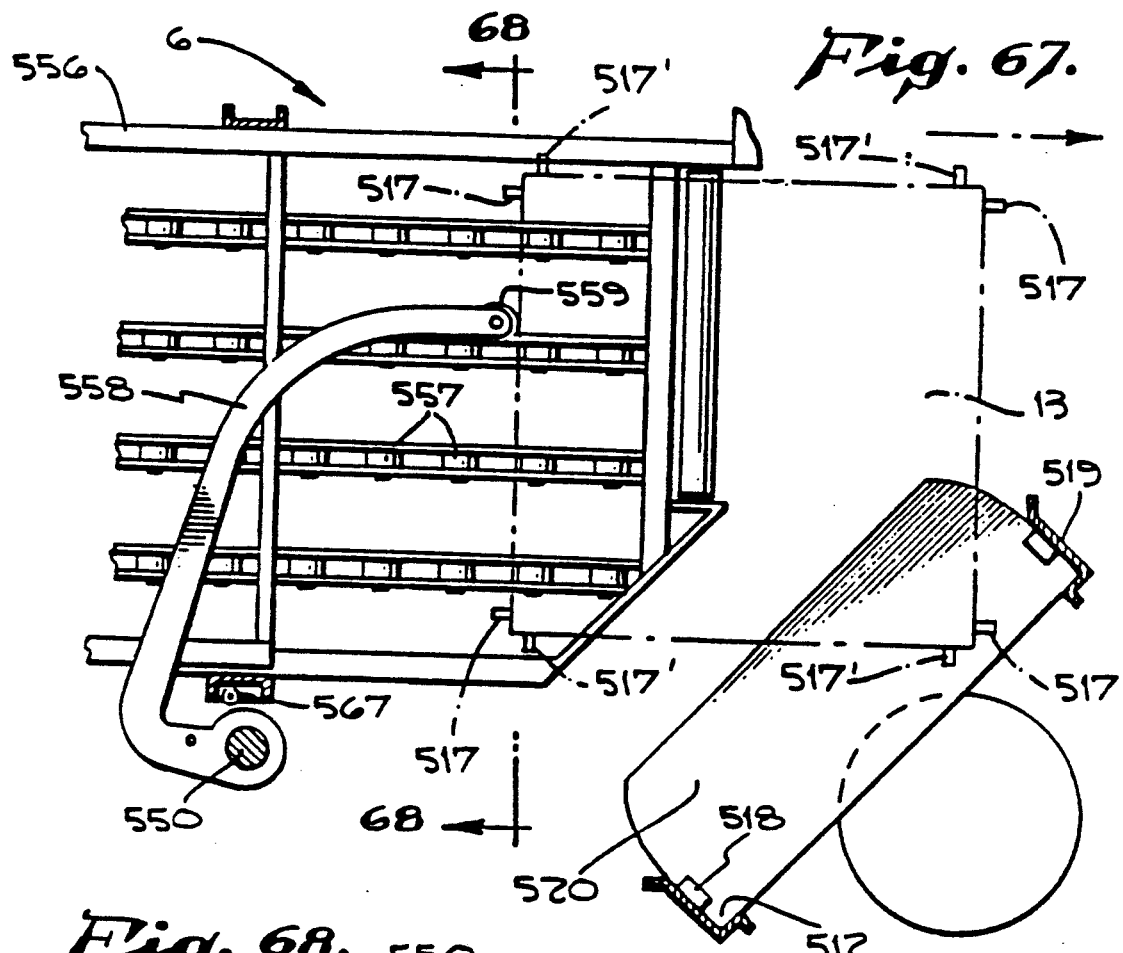
FIG. 67 is a fragmentary plan view, similar to FIG. 62, but showing a successive step in the loading operation.
Figure 68:
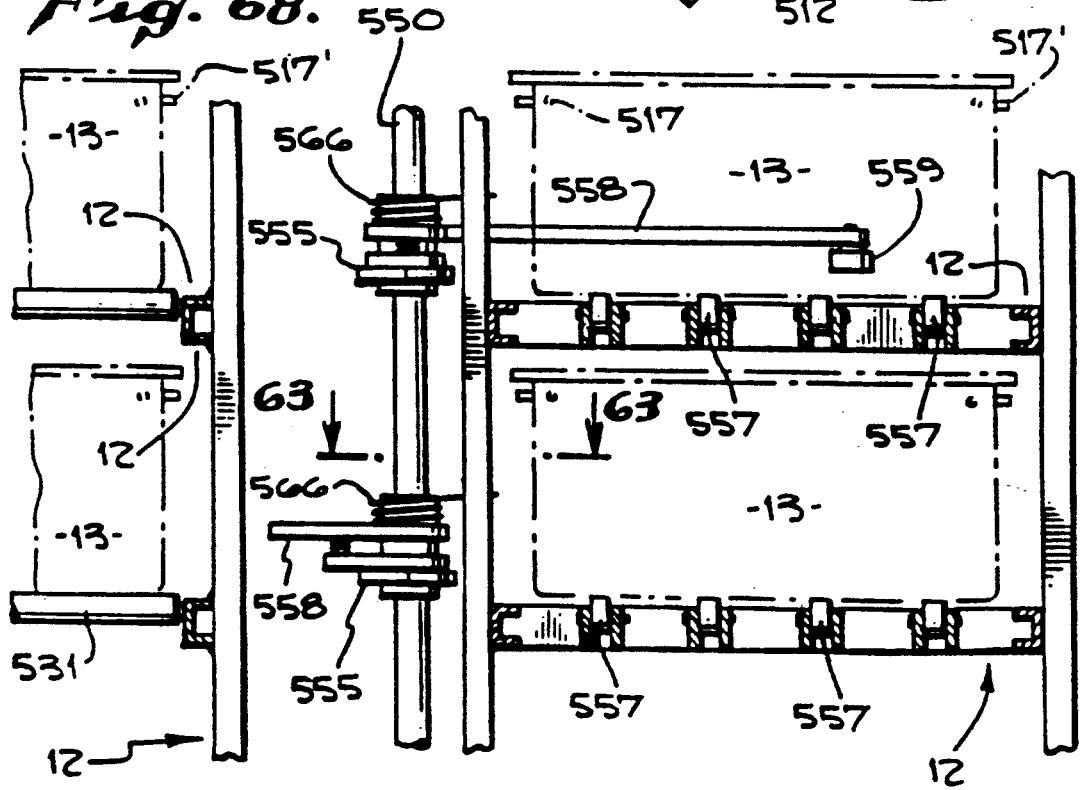
FIG. 68 is a cross-sectional view on the line 68—68 of FIG. 67.

To be certain that each container in turn reaches the loading position with respect to the conveyor rack at a proper time, there is provided an impeller arm 558 in response to rotation of the shaft 550. In order to have the impeller arm act at a proper time interval, there is provided an intermittently actuated clutch 555, the details of which are shown in FIGS. 63-66. Containers 13 are placed upon an approach conveyor 556 where, riding on idler rollers 557, the container passes within reach of the impeller arm 558 mounted on the shaft 550. By properly timing manipulation of the clutch 555, the impeller arm 558 rotates in a clockwise direction, as viewed in FIGS. 62, 67 and 69, to advance the container 13 into the loading position of FIG. 69. During this movement a caster 559 at the free end of the impeller arm 558 moves to a position of engagement with the trailing wall of the container 13, as shown in FIG. 67, ultimately moving the container to the loading position of FIG. 69.

As an alternative expedient, by way of example, a belt type conveyor could be used instead of the idler rollers 557 to move the container into the proper position.

The shaft 550, as previously described, is gear timed in synchronized rotation with respect to travel of the carousel 2 by means of rotation of the shaft 538. As can be observed in FIG. 61, rotation of the shaft 550 may be made at a rate slower than the rate of travel of container stations on the conveyor rack. Once the impeller arm 558 is set in motion by action of the clutch, it will advance the container at the desired speed to synchronize its arrival at the loading station of FIG. 69 with arrival of the empty rack, exemplified by the shelf 520.

To actuate the clutch, there is provided, as shown in FIGS. 63 and 65, a solenoid 560, a plunger 561 of which is projected into engagement with one arm 562 of a dog 563 so as to move the arm 562 from the clear position of FIG. 63 to engaged position of FIG. 65 with a cam 564. In that the dog 563 has its stub shaft 565 in engagement with the impeller arm 558, the cam 564, being non-rotatably anchored to the continuously rotating shaft 550, causes the impeller arm to be moved in a clockwise direction, as heretofore described. Motion of the impeller arm 558 acts to build up energy in a torsion return spring 566.

At the end of angular movement of the impeller shaft 558, as shown in FIG. 69, a camming roller 567, showing FIGS. 63 and 66, acting on an arm 568 at the opposite end of the dog 563, serves to disengage the arm 562 from the cam 564. Released as described, the return spring 566 acts to return the impeller arm 558 from the extended position of FIG. 69 to the initial position of FIG. 63. Once the dog has been returned to disengaged position by action of the camming roller 567, a second smaller torsion spring 569 serves to hold the arm 562 out of engagement with the cam 564 until it is again depressed by action of the solenoid 560.

The synchronization between the carousel 2 and the inserter assembly 6, together with the extractor assembly 8, is assured, in the chosen embodiment, by the endless chain structure which joins the sundry container racks of the carousel exemplified by the shelves 520. As can be observed in FIGS. 61 and 70, for example, links 575 are pivotally connected to adjacent shelves 520 on opposite ends by pins 576. As a result there will always be a station on the conveyor at the end of the loading side opposite a comparable station at the end of the unloading side, separated by a station facing endwardly toward the unloading and loading assemblies. The correct positioning can be assured by the synchronized timing heretofore made reference to.

Once the container 13 has reached the loading position, as shown in FIGS. 69, 70 and 71, a transversely acting mechanism 577 forming part of the inserter assembly 6 is called upon to place the container in position on the appropriate carousel rack 12.

As the container, after traveling along the approach conveyor 556, reaches approximately the phantom position of FIG. 67, the empty station, exemplified by the shelf 520, will have reached approximately the position shown in FIG. 67. In this position, the inside corner of the leading edge of the container will commence to closely approach the empty rack 12. As the container continues to be pushed into the loading position by action of the impeller arm 558, the shelf 520 will continue turning until it reaches the position of FIG. 69. At the same time, the container 13 will have been pushed into the position shown in phantom by pressure of the caster 559 of the impeller arm 558, but the peg 517 at the inside corners of the container will not have as yet engaged with the flanges 518 of the carousel rack. Engagement is accomplished by action of the transversely acting mechanism 577.

Essential portions of the mechanism 577, shown in plan view in FIGS. 69 and 70 and in substantially a sectional view in FIG. 71, are embodied in a power cylinder 578 pivotally mounted on a horizontal beam member 587, a plunger 579 of which is secured to a bracket 580 attached to a loading bar 581. The loading bar is provided with a loading tray 582 adapted to slide under the outside of the container 13 to make certain that it can be lifted to the proper position for ultimate loading at the selected station. To provide for accurate movement of the loading tray 582, there are provided two linkages, on respectively opposite sides of the power cylinder 578. On the left side, a central link 583 is attached by a short link 585 to the loading bar 581 and by another short link 586 to a stationary horizontal beam member 587. Similarly, on the right side, as viewed in FIG. 69, a central link 584 is attached by means of a short link 588 to the loading bar 581 and by a second short link 589 to the horizontal beam member 587. The parallelogram effect of the two sets of links maintains the loading bar 581 and loading tray 582 in a proper position of alignment as the loading bar and loading tray are pushed from the position of FIG. 60 to the position of FIGS . 70 and 71. Further, by reason of tilting the transversely acting mechanism 577 obliquely upwardly, as shown in FIG. 71, the outside edge of the container 13 is lifted from the broken line position of the loading tray 582 to the solid line position of the same tray 582, thus providing an upward tilt for the outside edge of the container 13.

As the outside edge is being lifted in the manner shown, the container at the same time is being moved in a direction from left to right, as viewed in FIG. 71, from the broken line position to the solid line position. Movement as described causes the pegs 517 to first engage a camming slope 590 of the respective flange 518 so that the pegs will ride over the camming slope and lodge behind the flange 518 in each case in the manner shown in FIG. 71. Once behind the flange, the container can drop to a position of engagement with a ledge 595 where it is positioned by a stop 596.

By the procedure just described, the container 13 is hung in proper position on the empty carousel rack. The loading tray 582 is then withdrawn by reverse action of the power cylinder 578 so as to be receptive of the next container 13 which becomes moved to loading position for a succeeding empty rack.

In the chosen embodiment of the invention pegs 517 and flanges 518 have been relied upon as a simple effective expedient for attaching the container to the rack at the proper location. It should be appreciated that what is important to the invention is to have the attachment a releasable attachment, irrespective of the expedient chosen. Various alternative may be preferred as, for example, making use of a spring actuated flange, or instead a spring activated peg. Another alternative is one in which a movable hook may be employed on the rack to releasably engage an appropriate hole in a rim of the container, as previously described, or other comparable structure on the container.

It should be borne in mind in connection with the operation for loading just described that the shelf 520 is continuously moving, first around the end of the conveyor rack to the loading position, and thereafter immediately in a direction from left to right along the corresponding leg of the rack. The container arrives at the loading position in advance of arrival of the empty station by a sufficiently brief time span to make certain that there is proper alignment when the power cylinder 578 is triggered to push the container into the station and engage the peg 517 with the flange 518. It should be appreciated in this context that when the container arrives at the loading position, the inside edge of the container is only a short distance from the conveyor rack so that the distance can be immediately closed and engagement accomplished in a very brief span of time.

As an additional assurance that the entry will be timely, there may be provided tapered edge section 591 and 592 at the ends of the shelf 520 for guidance.

Control System

Referring next to FIG. 3, a control system suitable for substantially automatically directing the described storage structure will be described. The control architecture includes a plurality of pyramided local area networks (LANs) intended to distribute responsibility towards the lowest level. As shown in FIG. 3, the control system chosen for the purpose of illustration includes a storage facility controller 370 that communicates with one or more carousel controllers 380, 381, and a conveyor controller 384 over a local area network (LAN) 385. Each storage carousel 2, is associated with a particular carousel controller 380, 381 etc. which coordinates the mechanical activities of the carousel and its associated inserter, extractor and lift assemblies. The carousel controllers 380, 381 may be substantially identical and therefore the architecture described below in relation to carousel controller 380 is equally applicable to the other carousel controllers. Carousel controller 380 directs a plurality of programmable (PAL) boards 390 which communicate over a second local area network 387. The PAL boards in turn directly control the motors, rams and other mechanisms that drive the described components of the storage system. Additionally, the PAL boards receive the information provided by presence scanners 20 and other components to determine whether a particular request made by the carousel controller can be safely carried out.

The storage facility controller 370 coordinates communications with exterior computers or controllers that periodically request the delivery of specific containers or other information. Co-pending Application Ser. No. 158,310, filed Feb. 22, 1988 discloses a warehousing and/or distribution system that includes such external controllers. As described therein, the container requests would typically be generated in the form of an extended list of desired containers, together with an indication of the number of containers to be provided at any given time. Alternatively, the storage facility controller could be ultimately responsible for the entire warehousing system and/or directly receive order requests.

The storage facility controller also integrates the activities of the various carousels if more than one carousel is present. By way of example, in the consumer products application previously described, there may be six or more carousels each having 8 or more tiers. The storage facility controller is also responsible for remembering the identity of the containers that are within its possession and the actual storage position of each container (by carousel, tier and rack number). The storage facility controller 370 may take the form of an integrated computer that includes a terminal suitable for entering orders or otherwise allowing an operator to perform specific tasks and/or check the status of the machine. By way of example, conventional personal computers, such as an IBM AT or a similar machine work well.

In operation, the storage facility controller 370 maintains a storage inventory record which records the actual position at which each specific container within its possession is located. As previously indicated, each container has a distinct identifying indicia. The storage record includes a data field for each container within its possession. The data field includes an indication of the storage carousel on which the container is stored (or an indication that it is presently on the conveyor network 14) along with an indication of its specific storage position within that storage carousel (by tier and rack array number).

In the described embodiment, the rack arrays 10 are each assigned sequential numbers. An identifying indicia indicative of the rack arrays number is affixed to each rack array at consistent relative positions. The identifying indicia may take the form of bar coded labels that are readable by an identification scanner as previously described. A plurality of vertically aligned identification scanners 22 in communication with carousel controller 380 are positioned two or three rack positions behind the inserter assemblies 6. Each carousel tier has an associated identification scanner. Additionally, an identifying scanner is provided to read the rack array's identifying indicia. Thus, each time a rack array passes the column of identification scanners, the carousel controller is informed of both the identity of the approaching rack array and the contents it holds. This information is transmitted to the storage facility controller which uses the information for several purposes. Initially, the storage record is updated to insure that it has the latest information about the storage positions of the identified containers. Additionally, the storage facility controller makes decisions about the impending extraction and insertion activities. Therefore, by knowing which rack arrays are approaching the extractor assemblies, the storage facility controller can survey the storage record to determine which of a plurality of requested containers will arrive first at the extractor assemblies and extraction requests can be made accordingly. Further, such knowledge of the approaching rack arrays allows the storage facility controller to determine the locations of upcoming empty racks onto which newly received containers may be stored. With such knowledge containers can be directed to the inserter assemblies in a manner that optimizes overall insertion efficiency.

When a container request is made, the storage facility controller surveys its storage record to determine whether the requested container(s) are within its possession. Assuming by way of example that a container request comes in the form of an extended list of desired containers, together with an indication of the number of containers to be provided, the storage facility controller would determine which of the requested containers are within its possession. Using an optimization routine which may be widely varied and using as its base a knowledge of how far each rack array is from the extractor assembly, as well as the status of the lift, the extractor holding sections, and the pending extraction requirements, the storage facility controller will determine which of the requested containers will be provided. At this point, the storage facility controller 370 sends the carousel controller a message to extract the desired container. The message only needs to identify the particular rack (by rack array and tier number) from which a container is to be extracted. The carousel controller then orchestrates the mechanics of disengaging the container from its rack and delivering the container to the takeaway conveyor 16. After the designated rack array passes, the carousel controller reports to the storage facility controller whether it successfully extracted the requested container.

Each carousel controller 380 orchestrates the activities of a particular carousel. Referring specifically to FIG. 73, the carousel controller directs the activities of a plurality of logic boards 390 which in turn directly control the motors, rams, and other mechanisms that drive the storage system. In essence, the logic boards monitor the status of the particular components they control and execute a particular command (such as transfer a container from the supply conveyor to the lift). The logic boards may take the form of programmable array logic chips that are programed to activate and deactivate the required motors, rams etc to accomplish the designated task in responce to the carousel controllers specific commands. They also monitor the sensors necessary to insure that the system is clear to perform their designated functions before the requested task is started. In the event that the system is not clear to perform a requested task, they will override the request.

Although conventional computers and conventional LANs may readily be adapted to drive the system described, to maximize efficiency and reduce costs, a novel LAN architecture is described that minimizes or even eliminates the need for priority interrupts. In the embodiment described a microprocessor having internal memory such as an INTEL 8032 or 8052 is used as the CPU for the carousel controller 380. The logic boards are each formed of a single programmable array logic chip such as the 20L8.

The logic boards 390 include a carousel PAL board 402, a supply conveyor PAL board 403, a lift PAL board 404, a lift sensors PAL board 405, a plurality of inserter PAL boards 406, a plurality of extractor PAL boards 408, a takeaway conveyor PAL board 410 and a safety PAL board 414. Each inserter assembly 6 has an associated inserter PAL board 406 and each extractor assembly 8 has an associated extractor PAL board 408.

Carousel PAL board 402 controls the plurality of motors 130 which drives the carousel. A variable frequency controller is provided to power the motors 130 which are preferably all driven simultaneously. This allows the carousel to be driven at a wide variety of different speeds depending upon the needs of the system. If demand is relatively heavy, the carousel can be slowed down since at high speeds requested containers will approach the extraction assemblies at a rate faster than they can be carried away by lift 4. By way of example, the motors may be adapted to drive the carousel at in the range of 0–50 feet per minute with the preferred operating range being in the range of 25–50 feet per minute. As a general rule it is preferable to operate the system at lower speeds in order to reduce both wear on the system and energy consumption. The variable frequency controller has the additional benefit of causing the motors to gradually start and stop the carousel. The carousel controller directs the carousel PAL board 402 to operate the carousel at a specific speed and the carousel PAL board then directs the variable frequency controller which controls the operation of the motors.

As discussed above, there are a number of sensors and breakaway bars disposed at strategic points throughout the system to detect major malfunctions. Each of these is connected directly to the carousel PAL board 402. In the event that any of these devices detect a major malfunction, the carousel is immediately shut down thereby preventing or at least containing major accidents.

Supply conveyor PAL board 403 controls supply conveyor 15, and the belt conveyor assembly 90 that transfers containers from supply conveyor 15 to the lift 4. When a container arrives at the supply conveyor it is carried to the empty holding station 18 that is closest to the lift 4. A presence sensor S10 is provided for each holding station 18 to detect the presence of a container therein. Anytime a holding station has a container therein and the next holding station has an opening, the supply conveyor PAL energizes the appropriate traction rollers to move the container to the next holding station in a conventional manner. When a container is present in the last holding station 18, it is held until the lift 4 is prepared to receive the container. When an appropriate transfer signal is received form the carousel controller 380 the supply PAL board 403 activates motor 95 and actuates pneumatic cylinder 103 which lowers the articulated barrier 101. A presence detector S11 (see FIG. 2) located adjacent the belt conveyor assembly monitors the position of the container and informs the PAL board when a container passes onto the lift, at which time the motor 95 is turned off and the articulated barrier 101 is raised. The supply PAL board will not deliver another container to the lift until specifically instructed to do so by the carousel controller.

Lift PAL board 404 controls the movements of the lift 4, while lift sensor PAL board 405 monitors the sensors which insure that the lift is clear to increment a step. Therefore, an appropriate signal must be provided by the sensor PAL board before the lift board 404 actuates the lift. From the time a container is delivered from supply conveyor 15, the lift PAL board 404 controls its delivery to the appropriate inserter assembly. Similarly, the lift PAL board is responsible for containers received from any one of the extractor assemblies until it is delivered to the takeaway conveyor 16. To accomplish this, the lift PAL board controls the movements of the platforms 29, transfer assemblies 107 & 111, and unloading belt conveyor 250.

To rotate the platforms, the motor 51 for drive unit 50 which is mechanically coupled to the driver 60 is actuated as previously described. There are several conditions that must be met before motor 51 is activated to step the lift up a notch. Specifically, all loading operations from supply conveyor 15 and extractor assemblies 8, as well as all unloading operations onto inserter assemblies 6 and takeaway conveyor 16 designated by the carousel controller for a particular stop must be completed before the lift is advanced. Specifically, the lift PAL board 404 will not increment the platform unless it receives an enable signal from the lift sensor board. To insure that all such transfers are complete, lift sensor board 405 receives inputs from presence sensors that monitor each of the entrances to and exits from the lift. Additionally, presence sensors are provided to check the lowermost platform on the lift's down travel reach and the uppermost platform on the lift's up travel reach to insure that they are not carrying any containers. This prevents the lift from dropping a container by attempting to carry it over the top of the lift or below the bottom of the lift. Any time lift sensor board detects the presence of a container in any of the monitored locations, it will not transmit the enable signal to the lift PAL board 404. In the event that a container is positioned such that it is about to be carried about one of the ends of the lift, the lift sensor board simultaneously instructs the appropriate transfer assembly to transfer the obstructing container off of the lift.

After each incremental step of the lift, the carousel controller directs the lift PAL board to perform any transfers that are desired for that particular stop. If no transfers are desired at a particular step and at least one container is carried by the lift, then the lift is instructed to increment another step. This sequence is continued until all containers are removed from the lift.

To transfer a container from the lift platform upon which it rests to an adjacent inserter assembly, the lift PAL board directs the appropriate transfer assembly to move the container. In the system described, the transfer assembly on the same level as supply conveyor 15 takes the form of belt conveyor 107 while the remaining transfer assemblies take the form of articulated transfer assembly 111. Belt conveyor 107 is actuated by turning on its associated motor. The belt conveyor is turned off when presence sensor S1, mounted adjacent the inserter assembly as shown in FIG. 2, detects the presence of the container. Presence sensor S1 is positioned such that it will detect the leading edge of the container at a point where it is clear of the lift. Transfers to the upper inserter assemblies are accomplished by dropping the appropriate detainer 119 and actuating the pneumatic ram 116 associated with the appropriate articulated transfer assembly 111. Before any transfer is made, the lift PAL board 404 will check the status of presence sensor S1 as described below to insure that the holding section of the designated inserter assembly is not full. If the inserter assembly is full and therefore does not have room to receive an additional container, the lift PAL board will ignore the transfer request and inform the carousel controller of its decision.

Transfers from the lift's down travel reach to takeaway conveyor 16 are accomplished independently of instructions from the carousel controller by actuating the motor associated with belt conveyor 250 anytime a container is present on the lift platform adjacent the takeaway conveyor 16. The presence sensor mounted to monitor whether a container is so disposed controls the actuation of the belt conveyor 250. It should be appreciated that this is the same presence scanner that acts as one of the inputs to lift sensor PAL board 405. A presence sensor mounted adjacent the takeaway conveyor confirms when a container has been carried clear of the lift platform. The belt conveyor motor is turned off in response to such a signal. After the appropriate transfers have been accomplished, the lift PAL board informs the carousel controller that it has accomplished its designated tasks and, when appropriate, the identity of any transfer requests that have not been carried out. It then waits for further instructions from the carousel controller 380. When the carousel controller contacts the lift PAL board it provides instruction to increment a step and the transfers that are to be performed after stepping. In the event of an ignored transfer request, the carousel controller may instruct the carousel to remain in place and attempt to perform the transfer again.

In the event that a container remains on the platform adjacent the highest inserter assembly, lift sensor PAL board 405 will not permit the lift to increment until the container has been removed. Therefore if the presence sensor adapted to monitor the uppermost lift platform on an up travel reach detects the presence of a container, the lift PAL board will continue to attempt to transfer the container to its adjacent inserter assembly.

Each inserter PAL board 406 is responsible for integrating insertions onto the carousel. Thus, it controls the motor 142 that drives the power activated rollers of both the approach section and the holding section and, detainer 119. When a container is received from the lift, the traction rollers of the holding section are activated by a high speed controller that it is intended to move the container clear of the lift as soon as possible. In the electronically synchronized embodiment described, presence sensor S1 (FIG. 2) that monitors the inserter holding section is positioned to monitor the arrival of the leading edge of a container at the point where it is just clear of the lift 4. When presence sensor S1 detects the arrival of a container, the traction rollers of the holding section are shut down. Thus, the containers will be stopped within the holding section without striking the detainer 119. Stopping the containers short of the detainer saves wear and tear on the detainer. Anytime the inserter PAL board detects a container within the holding section it looks for the next empty rack. Presence sensor S2 disposed adjacent the extractor assembly as shown in FIG. 2, informs the PAL board of the arrival of an empty rack. When an empty rack is detected, all of the rollers in the inserter assembly are activated under the control of the variable frequency controller that drives the carousel motors 130. Thus, the inserter rollers are driven at a speed a fixed ratio faster than the carousel is traveling. Although the actual proportional relationship between the carousel and inserter speeds may be widely varied, by way of example, driving the inserter assembly rollers approximately 50% faster than the carousel has been found to work well.

Once the rollers have been activated, the container is carried into contact with the detainer 119. When the empty rack reaches a predetermined point the detainer 119 is dropped and the container is carried into engagement with the rack. It should be appreciated that the precise point at which the container is released must be determined such that the container will not interfere with any container on the preceding rack and will not get ahead of the leading column of the empty rack yet will catch up with the leading column before the training column completes its rotation about the end of the carousel. Sensor S3 is aligned as shown in FIG. 2 to detect a precise carousel position at which the detainer 118 should be dropped. When the proper position is detected, a pulse is sent to the inserter PAL board which is triggered to drop detainer 119. At substantially the same time, a verification signal is sent to the carousel controller to inform it that an insertion has occurred. Since the rollers are driven in a fixed proportional relationship with respect to the carousel, the container accelerates and is carried into engagement with the empty rack as previously described. It should be appreciated that with the described controller, the inserter PAL board does not look for a specific rack to place its container on and it does not need to know the identity of the containers it will be handling. Further, the inserter PAL board does not need to be informed in advance of the impending arrival of another container. Rather, when the holding section is full (as detected by presence sensor S1) the inserter PAL board merely informs the carousel controller of the full status and disables its associated lift transfer assembly 107 or 111. Simultaneously, it proceeds to look for the next available empty rack onto which it may insert the container.

A plurality of vertically aligned identification scanners 22 (FIG. 1) are disposed adjacent the carousel just downstream of the inserter assemblies with one identification scanner being provided for each tier. The identification scanners read the identifying indicia on the containers as they pass by and directly inform the carousel controller of the identity of each of the containers on each passing rack array. This information is then passed on to the storage facility controller which uses such information to update the storage inventory record.

When an order comes in for a particular container, the storage facility controller informs the carousel controller that the container at a particular location should be extracted. When the rack array carrying the desired container approaches, the extract PAL board associated with the appropriate tier is instructed to extract the next container. Upon receiving an extract command, the extract PAL board checks to make sure that the extract holding section 25 is clear. If the holding section is clear, a signal is sent to actuate reciprocating cylinder 188 thereby extending acutator pin 189. The extension of actuator pin 189 couples lift arms 162, the unlatching mechanism and the kick bar 165 to reciprocating rod 181 as previously described, thereby causing the disengagement of the container from its associated rack. In the electronically synchronized embodiment of the invention described above, the variable frequency controller runs motor 249 at a fixed proportion speed in relation to the carousel, thereby drawing the released container clear of the travel of containers on adjacent racks. A presence detector 20 is provided to detect when the released container has been withdrawn to a position that is clear of the attached containers. Once the container is clear, the extractor PAL board switches the motor 249 to a fixed high speed to carry the released container to the extractor holding section. As with the inserter holding section, rather than banging the container against detainer 247, a presence detector S4 as seen in FIG. 2 detects the arrival of the container onto the extract holding section and shuts down the variable frequency controller until directed to transfer the container to a lift platform. When an empty platform is positioned adjacent the extract holding section the carousel controller will instruct the extract PAL board to transfer the container. At that point, motor 249 is turned back on and detainer 247 is dropped and the container is carried onto the lift platform.

Communications between the carousel controller 38 and its associated PAL boards may be accomplished through the use of a wide variety of conventional computers and communication networks. However, in order to reduce the total computing power required as well as to reduce costs and maximize efficiency, a novel LAN architecture has been developed to facilitate communications between the carousel controller and the PAL boards.

One of the overriding goals of the described architecture is that it minimizes or even eliminates the need for priority interrupts. It has been our experience that with the volume of data that must be transferred between the PAL's and the carousel controller, a logic based upon priority interrupts is needlessly complicated and inefficient. Therefore, referring specifically to FIG. 73, a plurality of interface boards 395 are provided to act as buffers for communications between the PAL's and the carousel controller. The interface boards may be formed of 8-bit I/O regusters, that temporarily store received data. In effect each of the PAL boards may send messages to the carousel controller at any time. The messages are received by an interface board associated with the particular PAL board and saved in a temporary buffer. Therefore, the carousel controller can go about its business in an orderly fashion without having to deal with an interrupt. As the carousel controller performs its designated tasks, it periodically checks the various interface boards to determine whether the PAL boards have sent messages since the last inquiry. It will be appreciated that the frequency with which the status of particular PAL boards will be checked will vary dependant upon the nature of the particular tasks being performed by the carousel controller.

By way of example the carousel controller may take the form of a microprocessor having internal memory such as an INTEL 8032 or 8052. The interface boards may take the form of 8-bit I/O registers and the PAL boards may be formed of 20L8 chips.

Although only a few embodiments of the present invention have been described herein, it should be understood that the present invention may be embodied in many other specific forms without departing from the spirit or scope of the invention. Particularly, it should be noted that the specific mechanisms described herein may be widely varied to accomplish the same functions in accordance with the invention. Further, control architecture could be widely varied in accordance with various aspects of the invention. Therefore, the present examples and embodiments are to be considered as illustrative and not restrictive, and the invention is not to be limited to the details given herein, but may be modified within the scope of the appended claims.

We claim:

1. An organizer system for a rotary storage carousel having a plurality of evenly spaced tiers, each tier having a multiplicity of container racks having means for supporting containers adapted to carry material goods, the organizer system comprising:
   a lift including a vertically traveling endless loop having an up travel reach and a down travel reach, a plurality of uniformly spaced platforms disposed about the endless loop for supporting said containers, the spacing between said platforms being substantially equivalent to the spacing between said carousel tiers, and power means for driving said loop to carry the containers in a vertical direction;
   a plurality of inserter assemblies having inserter means for placing said containers onto the container racks while the container racks remain in continuous motion, each said carousel tier having an associated inserter assembly;
   a holding section having a plurality of vertically spaced holding shelves, the spacing between the holding shelves being substantially equivalent to the spacing between said lift platforms, each holding shelf being adapted to receive containers from the lift, temporarily hold the received containers and transfer the received container to an associated inserter assembly;
   means for delivering containers to said lift platforms; and
   means for transferring containers from any particular lift platform on its up travel reach to the holding shelf disposed adjacent the particular platform.

* * * * *

UNITED STATES PATENT AND TRADEMARK OFFICE
CERTIFICATE OF CORRECTION

PATENT NO. : 5,238,351

DATED : August 24, 1993

INVENTOR(S) : Robert Lichti, Sr., et al.

Page 1 of 2

It is certified that error appears in the above-indentified patent and that said Letters Patent is hereby corrected as shown below:

On the title page item [56],

Change "844,808" to --844,806--.
Change "1,889,497" to --1,669,497--.
Change "3,088,987" to --3,068,987--.
Change "3,288,055" to --3,268,055--.
Change "3,368,888" to --3,368,688--.
Change "3,534,880" to --3,534,850--.
Change "4,422,884" to --4,422,554--.
Change "4,505,378" to --4,505,375--.

UNITED STATES PATENT AND TRADEMARK OFFICE
CERTIFICATE OF CORRECTION

PATENT NO. : 5,238,351

DATED : August 24, 1993

INVENTOR(S) : Robert Lichti, Sr., et al.

It is certified that error appears in the above-indentified patent and that said Letters Patent is hereby corrected as shown below:

Column 1, line 21, replace "Jan. 3, 1986" by --Jan. 2, 1986--.
Column 3, line 61, replace "board" by --boards--.
Column 4, line 2, replace "arrd" by --end--.
Column 6, line 51, replace "motor" by --motors--.
Column 11, line 66, replace "FIG" by --FIGS--.
Column 12, line 22, delete "75".
Column 15, line 12, replace "821,257 filed Jan. 20, 1986" by --824,718 filed Jan. 31, 1986--.
Column 15, line 24, replace "4,752,195" by --4,752,175--.
Column 21, line 44, replace "interconnection" by --interconnecting--.
Column 22, line 18, delete "236".
Column 22, line 24, replace "use" by --used--.
Column 27, line 33, replace "andtherefore" by --and therefore--.
Column 29, line 23, replace "responce" by --response--.
Column 32, line 52, replace "118" by --119--.
Column 33, line 51, replace "38" by --380--.
Column 34, line 2, replace "regusters" by --registers--.

Signed and Sealed this

Twenty-ninth Day of November, 1994

Attest:

BRUCE LEHMAN

*Attesting Officer*     *Commissioner of Patents and Trademarks*